(12) United States Patent
Kobayashi

(10) Patent No.: US 11,714,021 B2
(45) Date of Patent: Aug. 1, 2023

(54) MEASUREMENT METHOD, MEASUREMENT DEVICE, MEASUREMENT SYSTEM, AND MEASUREMENT PROGRAM

(71) Applicant: Seiko Epson Corporation, Toyko (JP)

(72) Inventor: Yoshihiro Kobayashi, Komagane (JP)

(73) Assignee: SEIKO EPSON CORPORATION

( * ) Notice: Subject to any disclaimer, the term of this patent is extended or adjusted under 35 U.S.C. 154(b) by 18 days.

(21) Appl. No.: 17/204,064

(22) Filed: Mar. 17, 2021

(65) Prior Publication Data

US 2021/0293657 A1 Sep. 23, 2021

(30) Foreign Application Priority Data

Mar. 18, 2020 (JP) .................. 2020-047308

(51) Int. Cl.
*G01M 5/00* (2006.01)
*E01D 1/00* (2006.01)

(52) U.S. Cl.
CPC ............. *G01M 5/0008* (2013.01); *E01D 1/00* (2013.01); *G01M 5/0041* (2013.01)

(58) Field of Classification Search
CPC ...... G01M 5/0008; G01M 5/0041; E01D 1/00
See application file for complete search history.

(56) References Cited

U.S. PATENT DOCUMENTS 4,958,306 A  9/1990 Powell et al.
7,668,692 B2 2/2010 Tatom et al.
(Continued)

FOREIGN PATENT DOCUMENTS

JP  2009-237805 A  10/2009
JP  2017-003556 A   1/2017
(Continued)

OTHER PUBLICATIONS

Mar. 17, 2021, Measurement Method, Measurement Device, Measurement System, and Measurement Program, Yoshihiro Kobayashi.
(Continued)

*Primary Examiner* — Arleen M Vazquez
*Assistant Examiner* — Lyudmila Zaykova-Feldman
(74) *Attorney, Agent, or Firm* — Harness, Dickey & Pierce, P.L.C.

(57) ABSTRACT

A measurement method includes: a step of acquiring first observation point information including a time point when each part of an m-th moving object passes a first observation point and a physical quantity which is a response to an action; a step of acquiring second observation point information including a time point when the each part passes a second observation point and a physical quantity which is a response to an action; a step of calculating a deflection waveform of a structure generated by the each part; a step of adding the deflection waveforms to calculate an m-th moving object deflection waveform; a step of calculating a displacement waveform at the third observation point; and a step of calculating first to M-th amplitude coefficients by assuming that a waveform obtained by multiplying an m-th amplitude coefficient by the m-th moving object deflection waveform is an m-th amplitude adjusted deflection waveform, and that a sum of first to M-th amplitude adjusted deflection waveforms is approximated to the displacement waveform.

15 Claims, 23 Drawing Sheets

(56) References Cited

U.S. PATENT DOCUMENTS

| | | |
|---|---|---|
| 8,094,922 B2 | 1/2012 | Lee et al. |
| 10,139,308 B2 | 11/2018 | Kobayashi |
| 10,198,640 B2 | 2/2019 | Kobayashi |
| 10,620,085 B2 | 4/2020 | Zhang et al. |
| 10,768,145 B2 | 9/2020 | Kobayashi |
| 10,788,320 B2 | 9/2020 | Takada |
| 10,830,652 B2 | 11/2020 | Irie |
| 2006/0137914 A1 | 6/2006 | Hodac |
| 2009/0024336 A1 | 1/2009 | Tatom et al. |
| 2009/0303469 A1 | 12/2009 | Lee et al. |
| 2012/0173171 A1* | 7/2012 | Bajwa ................ G08G 1/015 702/56 |
| 2016/0171309 A1 | 6/2016 | Hay |
| 2017/0038307 A1* | 2/2017 | Ohta .................. G01N 21/88 |
| 2017/0097278 A1 | 4/2017 | Kobayashi |
| 2017/0098127 A1* | 4/2017 | Kobayashi .......... G06F 18/254 |
| 2017/0184471 A1 | 6/2017 | Kobayashi |
| 2017/0184550 A1 | 6/2017 | Kobayashi |
| 2018/0067637 A1* | 3/2018 | Hay .................... A61B 5/0816 |
| 2018/0149554 A1 | 5/2018 | Kim et al. |
| 2018/0224352 A1* | 8/2018 | Zhang ................. G01M 7/08 |
| 2018/0348064 A1 | 12/2018 | Irie et al. |
| 2019/0025813 A1* | 1/2019 | Celia ................. G01M 13/045 |
| 2019/0121348 A1 | 4/2019 | Celia et al. |
| 2019/0212141 A1 | 7/2019 | Takada |
| 2019/0212223 A1 | 7/2019 | Kusaka et al. |
| 2020/0247392 A1 | 8/2020 | Omori |
| 2021/0293604 A1 | 9/2021 | Kobayashi |
| 2021/0293605 A1 | 9/2021 | Kobayashi |
| 2021/0293657 A1 | 9/2021 | Kobayashi |
| 2021/0302222 A1 | 9/2021 | Kobayashi |
| 2021/0304597 A1 | 9/2021 | Kobayashi |
| 2022/0136927 A1* | 5/2022 | Takada ................ G01M 5/005 702/34 |
| 2022/0261511 A1 | 8/2022 | Umekawa et al. |
| 2022/0291078 A1 | 9/2022 | Kobayashi |

FOREIGN PATENT DOCUMENTS

| | | |
|---|---|---|
| JP | 2017-020796 A | 1/2017 |
| JP | 2018-031187 A | 3/2018 |
| JP | 2018-066637 A | 4/2018 |
| JP | 2019-049095 A | 3/2019 |
| JP | 6809691 B2 | 1/2021 |
| KR | 101163764 B1 | 7/2012 |
| WO | 2020-194539 A1 | 10/2020 |

OTHER PUBLICATIONS

Xiang-rong Yuan "Acceleration Integration Method for Calculating Dynamic Deflection of Bridge"; Article Code 1671-4229 (2007) 01-0052-04; vol. 6, No. 1; Published by School of Civil Engineering, Guangzhou University, Guangzhou 510006, China; dated Feb. 2007 (total 16 pages).

* cited by examiner

| VEHICLE NUMBER | LANE NUMBER | AXLE NUMBER | ENTRY TIME POINT | ACCELERATION INTENSITY AT ENTRY TIME POINT | EXIT TIME POINT | ACCELERATION INTENSITY AT EXIT TIME POINT |
|---|---|---|---|---|---|---|
| 1 | 2 | 1 | ti11 | pai11 | to11 | pao11 |
| 1 | 2 | 2 | ti12 | pai12 | to12 | pao12 |
| 1 | 2 | 3 | ti13 | pai13 | to13 | pao13 |
| 1 | 2 | 4 | ti14 | pai14 | to14 | pao14 |
| 2 | 1 | 1 | ti21 | pai21 | to21 | pao21 |
| 2 | 1 | 2 | ti22 | pai22 | to22 | pao22 |
| 3 | 1 | 1 | ti31 | pai31 | to31 | pao31 |
| 3 | 1 | 2 | ti32 | pai32 | to32 | pao32 |

MEASUREMENT METHOD, MEASUREMENT DEVICE, MEASUREMENT SYSTEM, AND MEASUREMENT PROGRAM

The present application is based on, and claims priority from JP Application Serial Number 2020-047308, filed Mar. 18, 2020, the disclosure of which is hereby incorporated by reference herein in its entirety.

BACKGROUND

1. Technical Field

The present disclosure relates to a measurement method, a measurement device, a measurement system, and a measurement program.

2. Related Art

In maintaining and managing a bridge, an axle load of a large vehicle passing through the bridge is important information for predicting damage to the bridge. For axle load measurement, JP-A-2009-237805 proposes weight in motion, which is a method of continuously measuring a strain value when the vehicle passes from a strain gauge installed on a main girder of the bridge and calculating the axle load. JP-A-2009-237805 discloses a bridge-passing vehicle monitoring system that measures a vehicle weight of a vehicle passing through a bridge based on a strain waveform measured by a strain gauge arranged on a main girder of the bridge.

Specifically, in the bridge-passing vehicle monitoring system, the strain gauge is arranged, a passage timing of the axle is detected based on the strain waveform measured by the strain gauge, an inter-axle ratio of the vehicle is calculated, the calculated inter-axle ratio is compared with an inter-axle ratio calculated based on an inter-axle distance registered in an inter-axle distance database, and the inter-axle distance, a vehicle speed, and a vehicle type of the vehicle are identified. The bridge-passing vehicle monitoring system generates a strain waveform in which a reference axle load strain waveform is arranged on a time axis according to the passage timing of the axle, and calculates the axle load of each axle by comparing the reference axle load strain waveform with a strain waveform measured by the strain gauge. Then, the bridge-passing vehicle monitoring system calculates the vehicle weight by summing the axle loads of axes.

However, in the system described in PTL 1, although by using the strain waveform and the inter-axis distance database, the vehicle weight of the vehicle can be measured without measuring a displacement of the bridge, the displacements of the structure generated by the plurality of moving objects that move consecutively cannot be calculated separately.

SUMMARY

A measurement method according to a first aspect of the present disclosure includes: a first observation point information acquisition step of acquiring, based on observation information obtained by an observation device that observes, among a first observation point, a second observation point, and a third observation point between the first observation point and the second observation point of a structure which are arranged along a first direction in which first to M-th moving objects moves consecutively along a path of the structure, the first observation point, first observation point information including a time point when each of a plurality of parts of an m-th moving object passes the first observation point and a physical quantity which is a response to an action of each of the plurality of parts on the first observation point, M being an integer of 2 or more and m being an integer of 1 or more and M or less; a second observation point information acquisition step of acquiring, based on observation information obtained by an observation device that observes the second observation point, second observation point information including a time point when each of the plurality of parts of the m-th moving object passes the second observation point and a physical quantity which is a response to an action of each of the plurality of parts on the second observation point; a deflection waveform calculation step of calculating, based on the first observation point information, the second observation point information, a predetermined coefficient, and an approximate expression of deflection of the structure, a deflection waveform of the structure generated by each of the plurality of parts of the m-th moving object; a moving object deflection waveform calculation step of adding the deflection waveforms of the structure generated by the plurality of parts of the m-th moving object which are calculated in the deflection waveform calculation step, and calculating an m-th moving object deflection waveform which is a deflection waveform of the structure generated by the m-th moving object; a displacement waveform calculation step of calculating, based on observation information obtained by an observation device that observes the third observation point, a displacement waveform at the third observation point; and an amplitude coefficient calculation step of calculating first to M-th amplitude coefficients by assuming that a waveform, obtained by multiplying an m-th amplitude coefficient by the m-th moving object deflection waveform, is an m-th amplitude adjusted deflection waveform, and that a sum of first to M-th amplitude adjusted deflection waveforms is approximated to the displacement waveform.

In the measurement method according to the first aspect, in the amplitude coefficient calculation step, when at an i-th time point when an amplitude of an i-th moving object deflection waveform has a maximum value for all integers i of 1 or more and M or less, amplitudes of all moving object deflection waveforms among first to M-th moving object deflection waveforms excluding the i-th moving object deflection waveform are zero, the sum of the first to the M-th amplitude adjusted deflection waveforms may be approximated to the displacement waveform at the i-th time point.

In the measurement method according to the first aspect, in the amplitude coefficient calculation step, when at an i-th time point when an amplitude of an i-th moving object deflection waveform has a maximum value for at least one integer i of 1 or more and M or less, an amplitude of at least one moving object deflection waveform among first to M-th moving object deflection waveforms excluding the i-th moving object deflection waveform is not zero, the sum of the first to the M-th amplitude adjusted deflection waveforms may be approximated to the displacement waveform at a time point when the amplitude of the i-th moving object deflection waveform is not zero, and amplitudes of all moving object deflection waveforms among the first to the M-th moving object deflection waveforms excluding the i-th moving object deflection waveform are zero.

In the measurement method according to the first aspect, in the amplitude coefficient calculation step, the sum of the first to the M-th amplitude adjusted deflection waveforms may be approximated to the displacement waveform at M time points when at least one of amplitudes of first to M-th moving object deflection waveforms is not zero.

In the measurement method according to the first aspect, in the amplitude coefficient calculation step, the first to the M-th amplitude coefficients may be calculated by a least square method such that a difference between the sum of the first to the M-th amplitude adjusted deflection waveforms and the displacement waveform is minimized.

In the measurement method according to the first aspect, in the amplitude coefficient calculation step, when a first condition that noise superimposed on the displacement waveform is equal to or greater than a threshold value is met, the first to the M-th amplitude coefficients may be calculated by a least square method such that a difference between the sum of the first to the M-th amplitude adjusted deflection waveforms and the displacement waveform is minimized, when the first condition is not met, and a second condition that, at an i-th time point when an amplitude of an i-th moving object deflection waveform has a maximum value for all integers i of 1 or more and M or less, amplitudes of all moving object deflection waveforms among first to M-th moving object deflection waveforms excluding the i-th moving object deflection waveform are zero, is met, the first to the M-th amplitude coefficients may be calculated at which the sum of the first to the M-th amplitude adjusted deflection waveforms is equal to the displacement waveform at the i-th time point, when the first condition and the second condition are not met, and a third condition that, at an i-th time point for at least one integer i of 1 or more and M or less, an amplitude of at least one moving object deflection waveform among the first to the M-th moving object deflection waveforms excluding the i-th moving object deflection waveform is not zero, is met, the first to the M-th amplitude coefficients may be calculated at which the sum of the first to the M-th amplitude adjusted deflection waveforms is equal to the displacement waveform at a time point when the amplitude of the i-th moving object deflection waveform is not zero, and the amplitudes of all moving object deflection waveforms among the first to the M-th moving object deflection waveforms excluding the i-th moving object deflection waveform are zero, and when the first condition, the second condition, and the third condition are not met, the first to the M-th amplitude coefficients may be calculated at which the sum of the first to the M-th amplitude adjusted deflection waveforms is equal to the displacement waveform at M time points when at least one of amplitudes of the first to the M-th moving object deflection waveforms is not zero.

In the measurement method according to the first aspect, an approximate expression of deflection of the structure may be an expression based on a structural model of the structure.

In the measurement method according to the first aspect, the structural model may be a simple beam whose both ends are supported.

In the measurement method according to the first aspect, an approximate expression of deflection of the structure may be an expression normalized by a maximum amplitude of deflection at a central position between the first observation point and the second observation point.

In the measurement method according to the first aspect, an approximate expression of deflection of the structure may be an expression of a sinusoidal half-wave waveform.

In the measurement method according to the first aspect, the structure may be a superstructure of a bridge, the superstructure may be a structure across any one of a bridge abutment and a bridge pier adjacent to each other, two adjacent bridge abutments, or two adjacent bridge piers, both end portions of the superstructure may be located at positions of the bridge abutment and the bridge pier adjacent to each other, at positions of the two adjacent bridge abutments, or at positions of the two adjacent bridge piers, and the bridge may be a road bridge or a railway bridge.

In the measurement method according to the first aspect, the first observation point may be set at a first end portion of the structure, and the second observation point may be set at a second end portion of the structure which is different from the first end portion.

In the measurement method according to the first aspect, the moving object may be a railway vehicle, an automobile, a tram, a construction vehicle, or a military vehicle, and each of the plurality of parts may be an axle or a wheel.

In the measurement method according to the first aspect, the observation device that observes the first observation point, the observation device that observes the second observation point, and the observation device that observes the third observation point may be acceleration sensors.

In the measurement method according to the first aspect, the observation device that observes the third observation point may be a contact displacement meter, a ring displacement meter, a laser displacement meter, a pressure sensor, a displacement measurement device based on image processing, or a displacement measurement device based on an optical fiber.

In the measurement method according to the first aspect, the observation device that observes the first observation point, and the observation device that observes the second observation point may be impact sensors, microphones, strain gauges, or load cells.

In the measurement method according to the first aspect, the structure may be a structure in which bridge weigh in motion (BWIM) functions.

A measurement device according to a second aspect of the present disclosure includes: a first observation point information acquisition unit that acquires, based on observation information obtained by an observation device that observes, among a first observation point, a second observation point, and a third observation point between the first observation point and the second observation point of a structure which are arranged along a first direction in which first to M-th moving objects moves consecutively along a path of the structure, the first observation point, first observation point information including a time point when each of a plurality of parts of an m-th moving object passes the first observation point and a physical quantity which is a response to an action of each of the plurality of parts on the first observation point, M being an integer of 2 or more and m being an integer of 1 or more and M or less; a second observation point information acquisition unit that acquires, based on observation information obtained by an observation device that observes the second observation point, second observation point information including a time point when each of the plurality of parts of the m-th moving object passes the second observation point and a physical quantity which is a response to an action of each of the plurality of parts on the second observation point; a deflection waveform calculation unit that calculates, based on the first observation point information, the second observation point information, a predetermined coefficient, and an approximate expression of deflection of the structure, a deflection waveform of the structure generated by each of the plurality of parts of the m-th moving object; a moving object deflection waveform calculation unit that adds the deflection waveforms of the structure generated by the plurality of parts of the m-th moving object which are calculated by the deflection waveform calculation unit, and calculates an m-th moving object deflection waveform which is a deflection waveform of the structure generated by the m-th moving object; a displacement waveform calculation unit that calculates, based on observation information obtained by an observation device that observes the third observation point, a displacement waveform at the third observation point; and an amplitude coefficient calculation unit that calculates first to M-th amplitude coefficients by assuming that a waveform, obtained by multiplying an m-th amplitude coefficient by the m-th moving object deflection waveform, is an m-th amplitude adjusted deflection waveform, and that a sum of first to M-th amplitude adjusted deflection waveforms is approximated to the displacement waveform.

A measurement system according to a third aspect of the present disclosure includes: the measurement device according to the second aspect; the observation device that observes the first observation point; the observation device that observes the second observation point, and the observation device that observes the third observation point.

A non-transitory computer-readable storage medium storing a measurement program according to a fourth aspect of the present disclosure causes a computer to execute: a first observation point information acquisition step of acquiring, based on observation information obtained by an observation device that observes, among a first observation point, a second observation point, and a third observation point between the first observation point and the second observation point of a structure which are arranged along a first direction in which first to M-th moving objects moves consecutively along a path of the structure, the first observation point, first observation point information including a time point when each of a plurality of parts of an m-th moving object passes the first observation point and a physical quantity which is a response to an action of each of the plurality of parts on the first observation point, M being an integer of 2 or more and m being an integer of 1 or more and M or less; a second observation point information acquisition step of acquiring, based on observation information obtained by an observation device that observes the second observation point, second observation point information including a time point when each of the plurality of parts of the m-th moving object passes the second observation point and a physical quantity which is a response to an action of each of the plurality of parts on the second observation point; a deflection waveform calculation step of calculating, based on the first observation point information, the second observation point information, a predetermined coefficient, and an approximate expression of deflection of the structure, a deflection waveform of the structure generated by each of the plurality of parts of the m-th moving object; a moving object deflection waveform calculation step of adding the deflection waveforms of the structure generated by the plurality of parts of the m-th moving object which are calculated in the deflection waveform calculation step, and calculating an m-th moving object deflection waveform which is a deflection waveform of the structure generated by the m-th moving object; a displacement waveform calculation step of calculating, based on observation information obtained by an observation device that observes the third observation point, a displacement waveform at the third observation point; and an amplitude coefficient calculation step of calculating first to M-th amplitude coefficients by assuming that a waveform, obtained by multiplying an m-th amplitude coefficient by the m-th moving object deflection waveform, is an m-th amplitude adjusted deflection waveform, and that a sum of first to M-th amplitude adjusted deflection waveforms is approximated to the displacement waveform.

DESCRIPTION OF EXEMPLARY EMBODIMENTS

Hereinafter, embodiments of the present disclosure will be described in detail with reference to the drawings. The embodiments described below do not in any way limit contents of the present disclosure described in the appended claims. Not all configurations described below are necessarily essential components of the present disclosure.

1. First Embodiment 1-1 Measurement System

Hereinafter, a measurement system for implementing a measurement method according to the present embodiment will be described by taking a case where a structure is a superstructure of a bridge and a moving object is a vehicle as an example. The vehicle passing through the bridge according to the present embodiment is a vehicle having a large weight such as a railroad vehicle, an automobile, a tram, a construction vehicle, or a military vehicle, and can be measured by bridge weigh in motion (BWIM). The BWIM is a technology that uses a bridge as a "scale" and that measures the weight and the number of axles of the vehicle passing through the bridge by measuring deformation of the bridge. The superstructure of the bridge, which enables analysis of the weight of the vehicle passing by based on a response such as deformation and strain, is a structure in which the BWIM functions. A BWIM system, which applies a physical process between an action on the superstructure of the bridge and the response, enables the measurement of the weight of the vehicle passing by.

Figure 1:
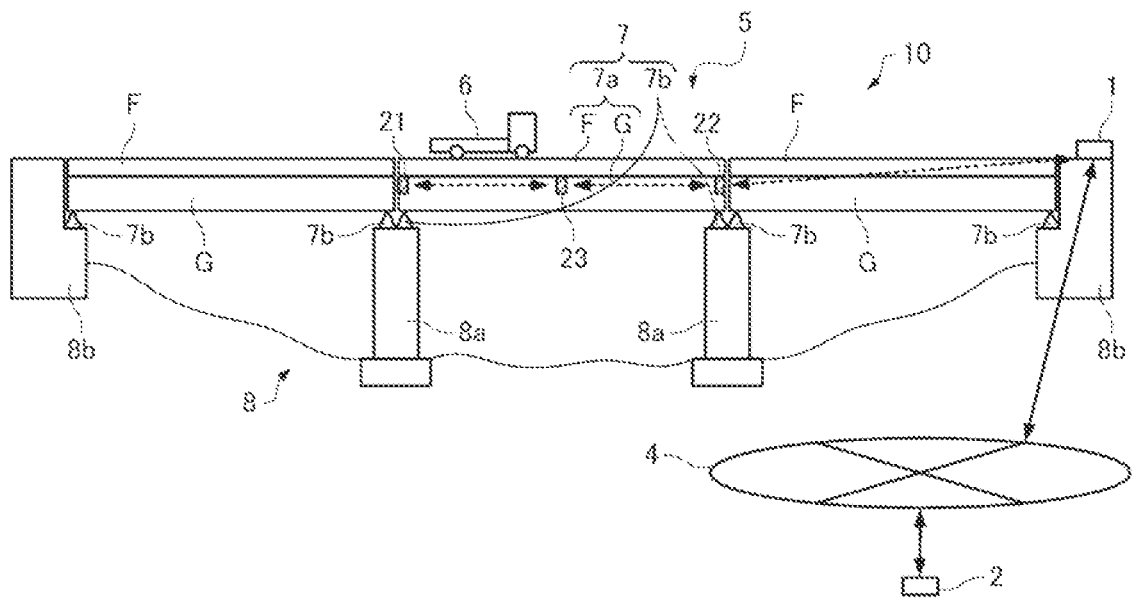
FIG. 1 is a diagram showing a configuration example of a measurement system.

FIG. 1 is a diagram showing an example of a measurement system according to the present embodiment. As shown in FIG. 1, a measurement system 10 according to the present embodiment includes a measurement device 1, at least one sensor 21, at least one sensor 22, and at least one sensor 23 which are provided on a superstructure 7 of a bridge 5. The measurement system 10 may further include a server 2.

The bridge 5 is formed of the superstructure 7 and a substructure 8. The superstructure 7 includes a bridge floor 7a formed of a floor plate F, a main girder G, and a cross girder which is not shown, and bearings 7b. The substructure 8 includes bridge piers 8a and bridge abutments 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

The measurement device 1 and the sensors 21, 22, and 23 are coupled by, for example, a cable which is not shown and communicate with one another via a communication network such as a controller area network (CAN). Alternatively, the measurement device 1 and the sensors 21, 22, and 23 may communicate with one another via a wireless network.

For example, each sensor 21 outputs data representing an impact caused by entry of the vehicle 6 which is a moving object to the superstructure 7. Each sensor 22 outputs data representing an impact caused by exit of the vehicle 6 from the superstructure 7. For example, each sensor 23 outputs data for calculating a displacement of the superstructure 7 due to the movement of the vehicle 6 which is the moving object. In the present embodiment, each of the sensors 21, 22, and 23 is an acceleration sensor, and may be, for example, a crystal acceleration sensor or a micro electro mechanical systems (MEMS) acceleration sensor.

In the present embodiment, each sensor 21 is installed at a first end portion of the superstructure 7 in a longitudinal direction. Each sensor 22 is installed at a second end portion of the superstructure 7 which is different from the first end portion in the longitudinal direction.

Each sensor 21 detects an acceleration of the superstructure 7 generated when the vehicle 6 enters the superstructure 7. Each sensor 22 detects the acceleration of the superstructure 7 generated when the vehicle 6 exits the superstructure 7. That is, in the present embodiment, each sensor 21 is an acceleration sensor that detects the entry of the vehicle 6 to the superstructure 7. Each sensor 22 is an acceleration sensor that detects the exit of the vehicle 6 from the superstructure 7.

Each sensor 23 is installed at a central portion of the superstructure 7 in the longitudinal direction. However, each sensor 23 only needs to be able to detect the acceleration for calculating the displacement of the superstructure 7, and an installation position of each sensor 23 is not limited to the central portion of the superstructure 7.

The floor plate F, the main girder G, and the like of the superstructure 7 are bent downward in a vertical direction due to a load of the vehicle 6 traveling on the superstructure 7. Each sensor 23 detects the acceleration of the bending of the floor plate F and the main girder G due to the load of the vehicle 6 traveling on the superstructure 7.

The measurement device 1 calculates, based on acceleration data output from the sensors 21, 22, and 23, the displacement of the bending of the superstructure 7 due to the traveling of the vehicle 6.

The measurement device 1 and the server 2 can communicate with each other via, for example, a wireless network of a mobile phone and a communication network 4 such as the Internet. The measurement device 1 transmits, to the server 2, information such as a time point when the vehicle 6 travels on the superstructure 7 and the displacement of the superstructure 7 due to the traveling of the vehicle 6. The server 2 may store the information in a storage device which is not shown, and may perform, based on the information, processing such as monitoring of an overloaded vehicle or determination of an abnormality in the superstructure 7.

In the present embodiment, the bridge 5 is a road bridge, for example, a steel bridge, a girder bridge, or a reinforced-concrete (RC) bridge.

Figure 2:
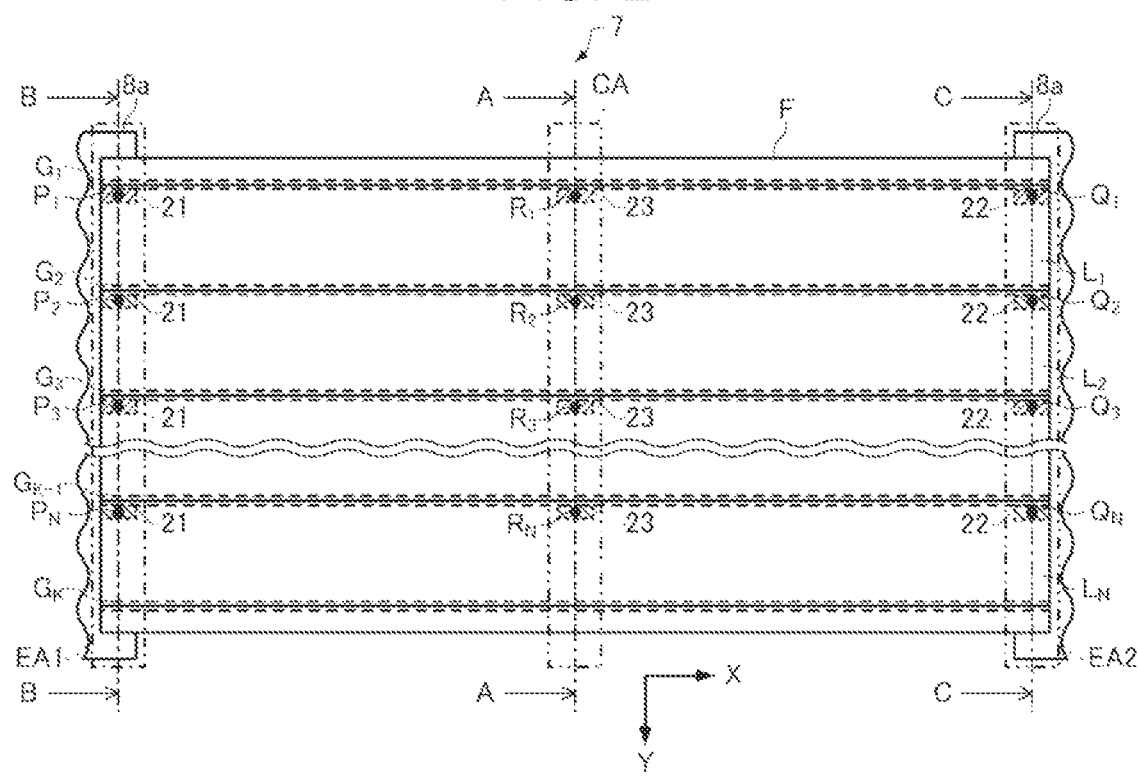
FIG. 2 is a diagram showing an arrangement example of sensors and observation points.
Figure 3:
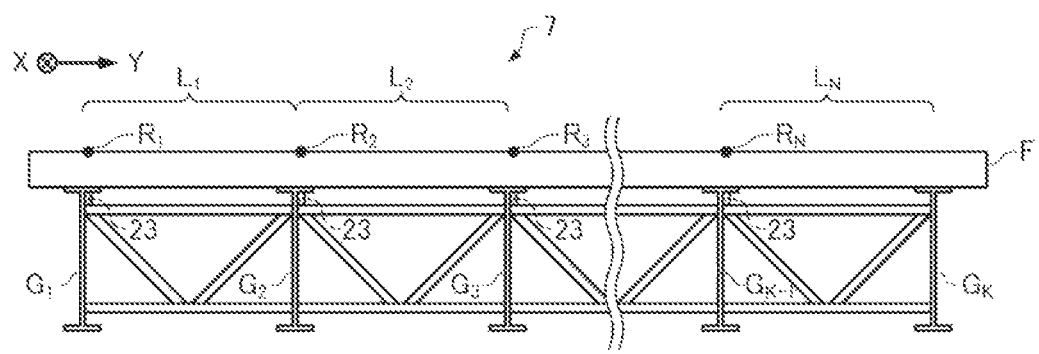
FIG. 3 is a diagram showing an arrangement example of the sensors and the observation points.
Figure 4:
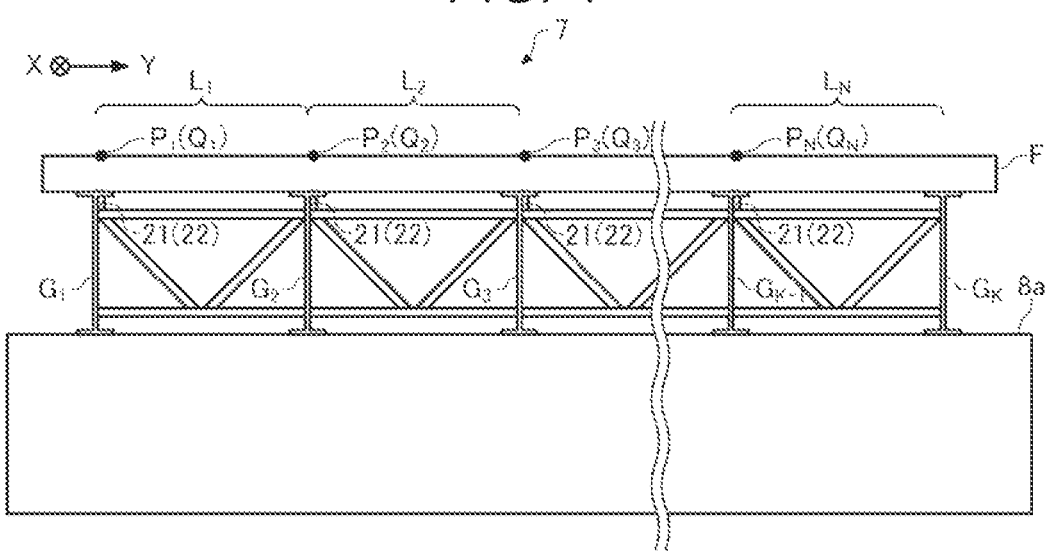
FIG. 4 is a diagram showing an arrangement example of the sensors and the observation points.

FIGS. 2, 3, and 4 are diagrams showing installation examples of the sensors 21, 22, and 23 on the superstructure 7. FIG. 2 is a diagram of the superstructure 7 as viewed from above. FIG. 3 is a cross-sectional view of FIG. 2 cut along a line A-A. FIG. 4 is a cross-sectional view of FIG. 2 cut along a line B-B or a line C-C.

As shown in FIGS. 2, 3, and 4, the superstructure 7 has N lanes $L_1$ to $L_N$ and K main girders $G_1$ to $G_K$ as first to N-th paths through which the vehicle 6, which is the moving object, can move. Here, N and K are integers of 1 or more. In examples shown in FIGS. 2, 3, and 4, each position of the main girders $G_1$ to $G_K$ coincides with a position of each boundary between the lanes $L_1$ to $L_N$, and N=K−1. Alternatively, each position of the main girders $G_1$ to $G_K$ does not have to coincide with the position of each boundary between the lanes $L_1$ to $L_N$, and N≠K−1.

In the examples shown in FIGS. 2, 3, and 4, the sensor 21 is provided on each of the main girders $G_1$ to $G_{K-1}$ at a first end portion EA1 of the superstructure 7 in the longitudinal direction. The sensor 22 is provided on each of the main girders $G_1$ to $G_{K-1}$ at a second end portion EA2 of the superstructure 7 in the longitudinal direction. The sensor 23 is provided on each of the main girders $G_1$ to $G_{K-1}$ at a central portion CA of the superstructure 7 in the longitudinal direction. In the examples shown in FIGS. 2, 3, and 4, N=K−1, and the sensors 21, 22, and 23 are not provided on the main girder $G_K$. Alternatively, the sensors 21, 22, and 23 may be provided on the main girder $G_K$, and the sensors 21, 22, and 23 may not be provided on any one of the main girders $G_1$ to $G_{K-1}$. Alternatively, N=K, and the sensors 21, 22, and 23 may be provided on the main girders $G_1$ to $G_K$.

When the sensors 21, 22, and 23 are provided on the floor plate F of the superstructure 7, the sensors may be destroyed by a traveling vehicle, and measurement accuracy may be affected by local deformation of the bridge floor 7a. Therefore, in the examples shown in FIGS. 2, 3 and 4, the sensors 21, 22 and 23 are provided on the main girders $G_1$ to $G_{K-1}$ of the superstructure 7.

In the present embodiment, N observation points $P_1$ to $P_N$ are set in association with the N sensors 21. The observation points $P_1$ to $P_N$ are N observation points of the superstructure 7 arranged along a second direction intersecting a first direction in which the vehicle 6 moves on the superstructure 7. In the examples shown in FIGS. 2, 3 and 4, for each integer j of 1 or more and N or less, an observation point $P_j$ is set at a position on a surface of the floor plate F in a vertically upward direction of the sensor 21 provided on a main girder $G_j$ at the first end portion EA1. That is, the sensor 21 provided on the main girder $G_j$ is an observation device that observes the observation point $P_j$. The sensor 21 that observes the observation point $P_j$ may be provided at a position where the acceleration generated at the observation point $P_j$ due to the traveling of the vehicle 6 can be detected, and it is desirable that the sensor 21 is provided at a position close to the observation point $P_j$. In this way, the observation points $P_1$ to $P_N$ have a one-to-one relationship with the N sensors 21.

In the present embodiment, N observation points $Q_1$ to $Q_N$ are set in association with the N sensors 22. The observation points $Q_1$ to $Q_N$ are N observation points of the superstructure 7 arranged along a third direction intersecting the first direction in which the vehicle 6 moves on the superstructure 7. In the examples shown in FIGS. 2, 3 and 4, for each integer j or 1 more and N or less, an observation point $Q_j$ is set at a position on the surface of the floor plate F in a vertically upward direction of the sensor 22 provided on the main girder $G_j$ at the second end portion EA2. That is, the sensor 22 provided on the main girder $G_j$ is an observation device that observes the observation point $Q_j$. The sensor 22 that observes the observation point $Q_j$ may be provided at a position where the acceleration generated at the observation point $Q_j$ due to the traveling of the vehicle 6 can be detected, and it is desirable that the sensor 22 is provided at a position close to the observation point $Q_j$. In this way, the observation points $Q_1$ to $Q_N$ have a one-to-one relationship with the N sensors 22.

In the present embodiment, N observation points $R_1$ to $R_N$ are set in association with the N sensors 23. The observation points $R_1$ to $R_N$ are N observation points of the superstructure 7 arranged along a fourth direction intersecting the first direction in which the vehicle 6 moves on the superstructure 7. In the examples shown in FIGS. 2, 3 and 4, for each integer j of 1 or more and N or less, an observation point $R_j$ is set at a position on the surface of the floor plate F in a vertically upward direction of the sensor 23 provided on the main girder $G_j$ at the central portion CA. That is, the sensor 23 provided on the main girder $G_j$ is an observation device that observes the observation point $R_j$. The sensor 23 that observes the observation point $R_j$ may be provided at a position where the acceleration generated at the observation point $R_j$ due to the traveling of the vehicle 6 can be detected, and it is desirable that the sensor 23 is provided at a position close to the observation point $R_j$. In this way, the observation points $R_1$ to $R_N$ have a one-to-one relationship with the N sensors 23.

In the present embodiment, N observation points $P_1$ to $P_N$ are associated with the lanes $L_1$ to $L_N$, respectively. Similarly, the N observation points $Q_1$ to $Q_N$ are associated with the lanes $L_1$ to $L_N$, respectively. Similarly, the N observation points $R_1$ to $R_N$ are associated with the lanes $L_1$ to $L_N$, respectively. For each integer j of 1 or more and N or less, the observation point $P_j$, the observation point $Q_j$, and the observation point $R_j$ between the observation point $P_j$ and the observation point $Q_j$, which are set in association with the lane $L_j$, are arranged along the first direction in which the vehicle 6 moves along the lane $L_j$ of the superstructure 7. In the examples shown in FIGS. 2, 3 and 4, the first direction is an X direction along the lanes $L_1$ to $L_N$ of the superstructure 7, that is, the longitudinal direction of the superstructure 7. The second direction, the third direction, and the fourth direction are a Y direction orthogonal to the X direction in a plane of the superstructure 7 on which the vehicle 6 travels, that is, a width direction of the superstructure 7. However, when the lanes $L_1$ to $L_N$ are curved, the second direction, the third direction, and the fourth direction do not have to coincide with one another. The second direction, the third direction, and the fourth direction do not have to be orthogonal to the first direction. For example, a distance from an end of the superstructure 7 on a side where the vehicle 6 enters to the observation points $P_1$ to $P_N$ and a distance from an end of the superstructure 7 on a side where the vehicle 6 exits to the observation points $Q_1$ to $Q_N$ may be different. For example, distances from one end of the superstructure 7 to the observation points $R_1$ to $R_N$ may be different. For each integer j of 1 or more and N or less, the observation point $P_j$ is an example of a "first observation point", the observation point $Q_j$ is an example of a "second observation point", and the observation point $R_j$ is an example of a "third observation point".

The number and installation positions of the N sensors 21, 22 and 23 are not limited to the examples shown in FIGS. 2, 3 and 4, and various modifications can be made.

The measurement device 1 acquires, based on acceleration data output from each of the sensors 21, 22, and 23, an acceleration in a fifth direction which intersects the X direction, which is the first direction, and the Y direction, which is the second direction, the third direction, and the fourth direction. The observation points $P_1$ to $P_N$ and $Q_1$ to $Q_N$ are displaced by the impact in a direction orthogonal to the X and Y directions, and the observation points $R_1$ to $R_N$ bend in the direction orthogonal to the X and Y directions. Therefore, in order to accurately calculate a magnitude of the impact and a magnitude of the acceleration of the bending, it is desirable for the measurement device 1 to acquire the acceleration in the fifth direction orthogonal to the X and Y directions, that is, in a normal direction of the floor plate F.

Figure 5:
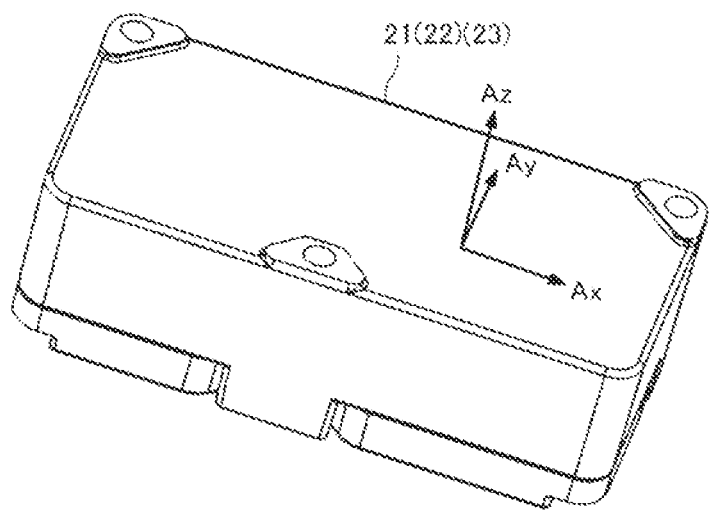
FIG. 5 is a diagram illustrating an acceleration detected by an acceleration sensor.

FIG. 5 is a diagram illustrating the acceleration detected by the sensors 21, 22, and 23. The sensors 21, 22, and 23 are acceleration sensors that detect the accelerations generated in the three axes orthogonal to one another.

In order to detect the impact applied to the observation points $P_1$ to $P_N$ due to the entry of the vehicle 6 to the superstructure 7, each sensor 21 is installed such that one of three detection axes, which are an x axis, a y axis, and a z axis, intersects the first direction and the second direction. Similarly, in order to detect the impact applied to the observation points $Q_1$ to $Q_N$ due to the exit of the vehicle 6 to the superstructure 7, each sensor 22 is installed such that one of three detection axes, which are the x axis, the y axis, and the z axis, intersects the first direction and the third direction. In order to detect the acceleration of the bending at the observation points $R_1$ to $R_N$ due to the traveling of the vehicle 6, each sensor 23 is installed such that one of the three detection axes, which are the x axis, the y axis, and the z axis, intersects the first direction and the fourth direction. In the examples shown in FIGS. 2, 3, and 4, since the first direction is the X direction, the second direction, the third direction, and the fourth direction are the Y direction, the sensors 21, 22, and 23 are installed such that one axis intersects the X direction and the Y direction. The observation points $P_1$ to $P_N$ and $Q_1$ to $Q_N$ are displaced by the impact in the direction orthogonal to the X direction and the Y direction. Therefore, in order to accurately detect the magnitude of the impact, ideally, the sensors 21 and 22 are installed such that one axis is in the direction orthogonal to the X direction and the Y direction, that is, the normal direction of the floor plate F. Further, the observation points $R_1$ to $R_N$ bend in the direction orthogonal to the X direction and the Y direction. Therefore, in order to accurately detect the acceleration of the bending, ideally, the sensors 23 are installed such that one axis is in the direction orthogonal to the X direction and the Y direction, that is, the normal direction of the floor plate F.

When the sensors 21, 22, and 23 are installed on the superstructure 7, an installation location may be inclined. In the measurement device 1, even if one of the three detection axes of each of the sensors 21, 22, and 23 is not installed in the normal direction of the floor plate F, since the direction is substantially oriented in the normal direction, an error is small and thus can be ignored. The measurement device 1 can correct a detection error due to the inclination of the sensors 21, 22, and 23 by a three-axis combined acceleration that combines the accelerations in the x axis, the y axis, and the z axis even if one of the three detection axes of each of the sensors 21, 22, and 23 is not installed in the normal direction of the floor plate F. Each of the sensors 21, 22 and 23 may be a one-axis acceleration sensor that detects the acceleration generated in a direction at least substantially parallel to the vertical direction or the acceleration in the normal direction of the floor plate F.

Hereinafter, details of the measurement method according to the present embodiment executed by the measurement device 1 will be described.

1-2 Generation of Axle Information

In the present embodiment, the measurement device 1 acquires, based on the acceleration data, which is observation information obtained by the N sensors 21 as the observation device, first observation point information including a time point when each of a plurality of parts of the vehicle 6 which is the moving object passes the observation point $P_j$ and a physical quantity which is a response to an action of each of the plurality of parts on the observation point $P_j$. Similarly, in the present embodiment, the measurement device 1 acquires, based on the acceleration data, which is observation information by the N sensors 22 as the observation device, second observation point information including a time point when each of the plurality of parts of the vehicle 6 passes the observation point $Q_j$ and a physical quantity which is a response to an action of each of the plurality of parts on the observation point $Q_j$. Here, j is an integer of 1 or more and N or less.

In the present embodiment, it is considered that the load generated by a plurality of axles or wheels of the vehicle 6 is applied to the superstructure 7. Accordingly, each of the plurality of parts for which the first observation point information and the second observation point information are to be acquired is an axle or a wheel. Hereinafter, in the present embodiment, it is assumed that each of the plurality of parts is an axle.

In the present embodiment, each sensor 21, which is the acceleration sensor, detects the acceleration due to the action of each of the plurality of axles on the observation point $P_j$. Similarly, each sensor 22, which is the acceleration sensor, detects the acceleration due to the action of each of the plurality of axles on the observation point $Q_j$.

In the present embodiment, as shown in FIG. 2, the observation points $P_1$ to $P_N$ are set at the first end portion EA1, and the observation points $Q_1$ to $Q_N$ are set at the second end portion EA2. Therefore, the time point when each of the plurality of axles of the vehicle 6 passes the observation point $P_j$ can be regarded as an entry time point of each axle to the superstructure 7 and, more specifically, an entry time point to the lane $L_j$. The time point when each of the plurality of axles of the vehicle 6 passes the observation point $Q_j$ can be regarded as an exit time point of each axle from the superstructure 7, and more specifically, an exit time point from the lane $L_j$.

Therefore, in the present embodiment, the first observation point information includes an entry time point of each axle of the vehicle 6 to the lane $L_j$ and acceleration intensity as a physical quantity that is the response to the action when each axle enters the lane $L_j$. The second observation point information includes an exit time point of each axle of the vehicle 6 from the lane $L_j$ and acceleration intensity as a physical quantity that is the response to the action when each axle exits the lane $L_j$.

Further, since the entry and the exit of each axle of the vehicle 6 correspond to each other, the first observation point information and the second observation point information can be stratified. The first observation point information, the second observation point information, and stratified information thereof are collectively referred to as axle information.

That is, in addition to the first observation point information and the second observation point information, the axle information includes correspondence information on the entry time point to the lane $L_j$ and the acceleration intensity at the time of entry, the exit time point from the lane $L_j$ and the acceleration intensity at the time of exit for each axle, and correspondence information between the vehicle 6 and the above corresponding information for each axle. Therefore, with the axle information, for each vehicle 6 passing through the superstructure 7, the time points when each axle passes the lane $L_j$ and the observation points $P_j$ and $Q_j$, and the acceleration intensities at the time of passing are identified.

Figures 6, 7:
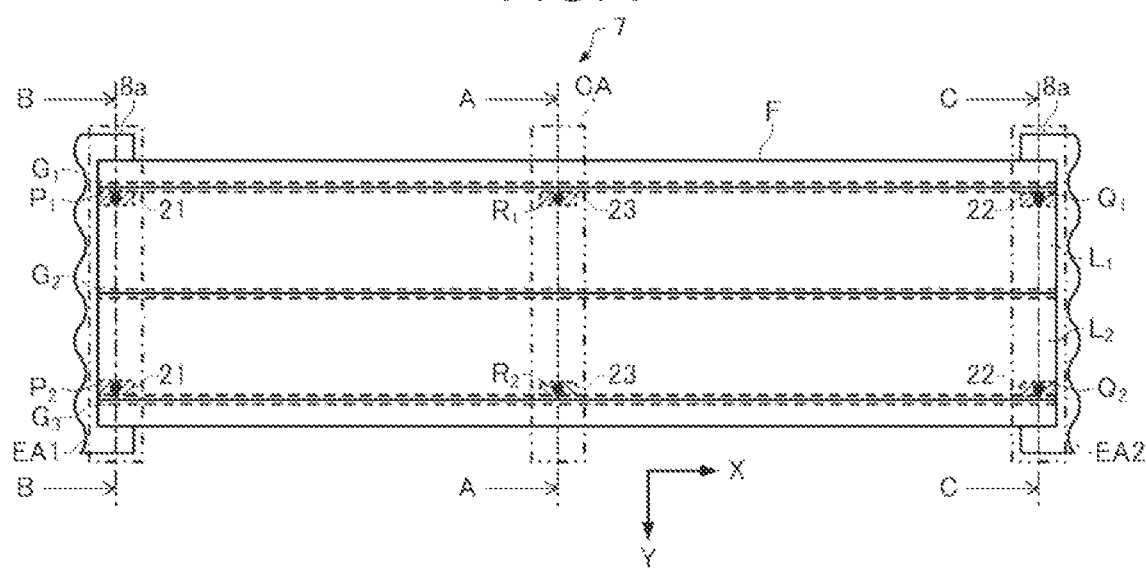
FIG. 6 is a diagram showing an example of axle information.
FIG. 7 is a diagram showing an arrangement example of the sensors and the observation points.
Figure 8:
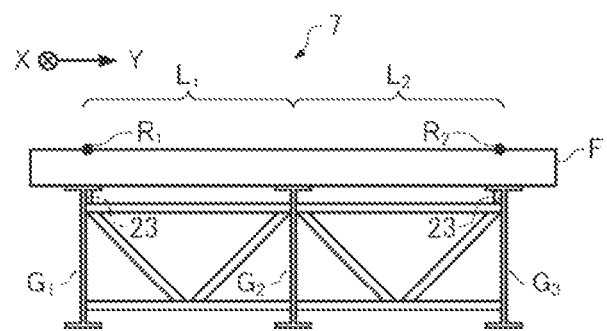
FIG. 8 is a diagram showing the arrangement example of the sensors and the observation points.

FIG. 6 shows an example of the axle information. In the example in FIG. 6, information in first to fourth rows is information related to the vehicle 6 whose vehicle number is 1. Information in the first row is information related to a leading axle whose axle number is 1. Information in the second row is information related to a second axle whose axle number is 2. Information in the third row is information related to a third axle whose axle number is 3. Information in the fourth row is information related to a fourth axle whose axle number is 4. For example, for the leading axle, whose axle number is 1, of the vehicle 6 whose vehicle number is 1, the correspondence information in the first row shows that the entry time point to the lane $L_2$ is ti11, the acceleration intensity at the time of the entry is pai11, the exit time point from the lane $L_2$ is to11, and the acceleration intensity at the time of the exit is pao11.

Information in fifth and sixth rows is information related to the vehicle 6 whose vehicle number is 2. The information in the fifth row is the correspondence information related to the leading axle whose axle number is 1. The information in the sixth row is the correspondence information related to the second axle whose axle number is 2. For example, for the leading axle, whose axle number is 1, of the vehicle 6 whose vehicle number is 2, the correspondence information in the fifth row shows that the entry time point to the lane $L_1$ is ti21, the acceleration intensity at the time of the entry is pai21, the exit time point from the lane $L_1$ is to21, and the acceleration intensity at the time of the exit is pao21.

Information in seventh and eighth rows is information related to the vehicle 6 whose vehicle number is 3. The information in the seventh row is the correspondence information related to the leading axle whose axle number is 1. The information in the eighth row is the correspondence information related to the second axle whose axle number is 2. For example, the correspondence information in the seventh row shows that, for the leading axle, whose axle number is 1, of the vehicle 6 whose vehicle number is 3, the entry time point to the lane $L_1$ is ti31, the acceleration intensity at the time of the entry is pai31, the exit time point from the lane $L_1$ is to31, and the acceleration intensity at the time of the exit is pao31.

Figure 9:
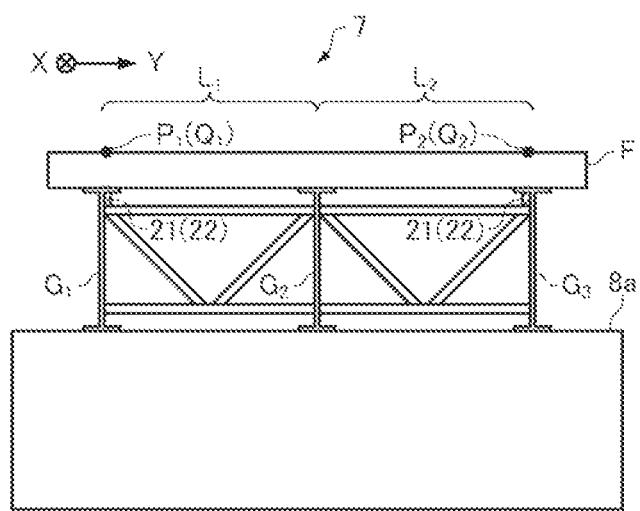
FIG. 9 is a diagram showing the arrangement example of the sensors and the observation points.

As an example, FIGS. 7 and 9 show arrangement examples of the sensors 21 and 22 and the observation points $P_1$, $P_2$, $Q_1$, and $Q_2$ when N=2. In the case of the arrangement example shown in FIGS. 7 and 9, a procedure for the measurement device 1 to generate the axle information will be described.

FIG. 7 is a diagram of the superstructure 7 as viewed from above. FIG. 9 is a cross-sectional view of FIG. 7 cut along a line A-A, a line B-B line or a line C-C. In the examples shown in FIGS. 7 and 9, one sensor 21 is provided on each of the main girders $G_1$ and $G_3$ at the first end portion EA1 of the superstructure 7. One sensor 22 is provided on each of the main girders $G_1$ and $G_3$ at the second end portion EA2 of the superstructure 7. Observation points $P_1$ and $Q_1$ corresponding to lane $L_1$ are set at positions on the surface of the floor plate F in the vertically upward direction of the sensors 21 and 22 provided on the main girder $G_1$, respectively. Observation points $P_2$ and $Q_2$ corresponding to lane $L_2$ are set at positions on the surface of the floor plate F in the vertically upward direction of the sensors 21 and 22 provided on the main girder $G_3$, respectively. The sensor 21 provided on the main girder $G_1$ observes the observation point $P_1$. The sensor 21 provided on the main girder $G_3$ observes the observation point $P_2$. The sensor 22 provided on the main girder $G_1$ observes the observation point $Q_1$. The sensor 22 provided on the main girder $G_3$ observes the observation point $Q_2$. One sensor 23 is provided on each of the main girders $G_1$ and $G_3$ at the central portion CA of the superstructure 7. The observation point $R_1$ corresponding to lane $L_1$ is set at a position on the surface of the floor plate F in the vertically upward direction of the sensor 23 provided on the main girder $G_1$. The observation point $R_2$ corresponding to lane $L_2$ is set at a position on the surface of the floor plate F in the vertically upward direction of the sensor 23 provided on the main girder $G_3$. The sensor 23 provided on the main girder $G_1$ observes the observation point $R_1$. The sensor 23 provided on the main girder $G_3$ observes the observation point $R_2$.

In order to generate the axle information, the measurement device 1 converts the acceleration at each time point detected by each of the sensors 21 and 22 into an amplitude, and acquires the acceleration intensity. The acceleration detected by each sensor 22 is not used for acquiring the axle information.

Figure 10:
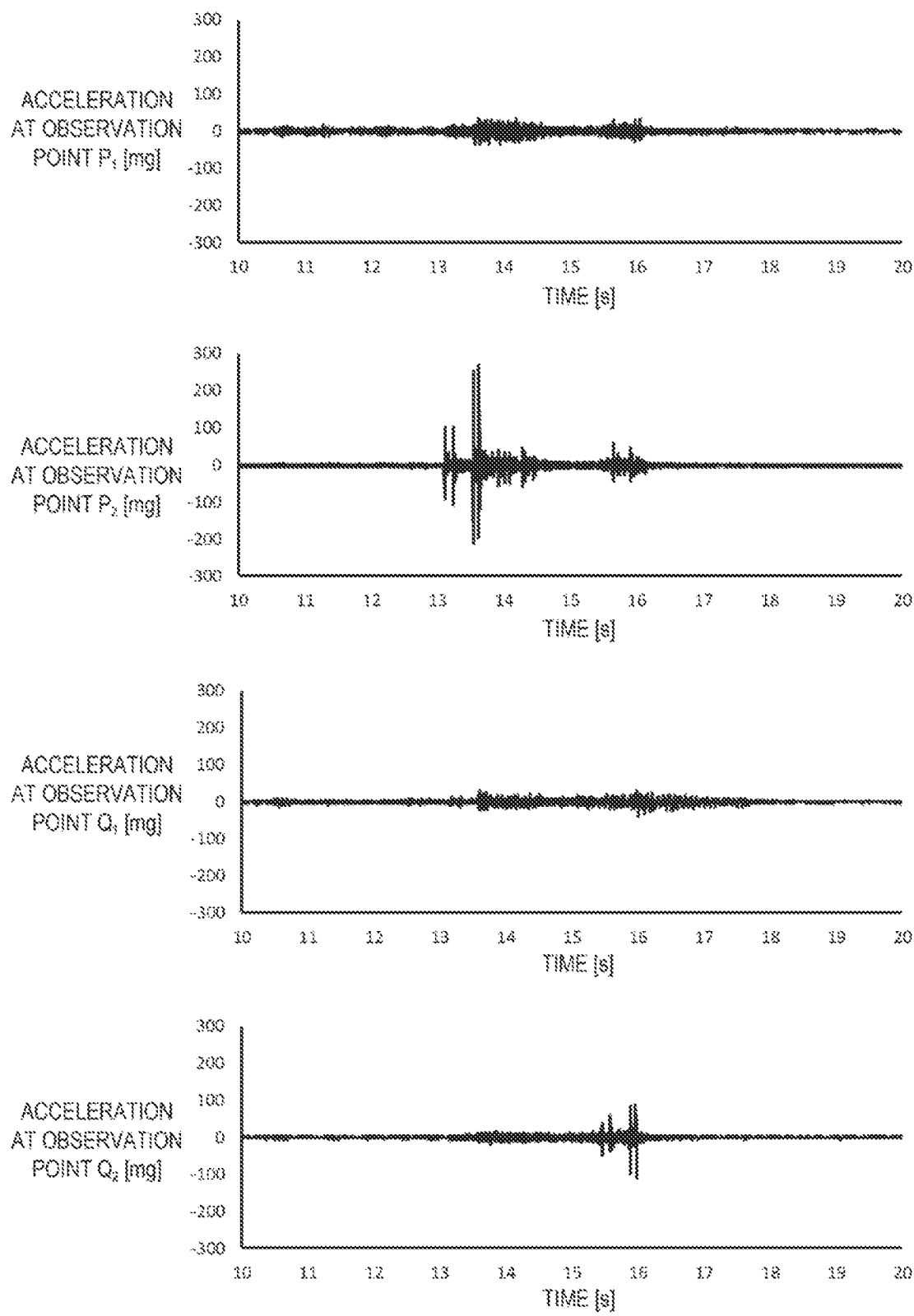
FIG. 10 shows diagrams showing examples of an acceleration detected with respect to an observation point.
Figure 11:
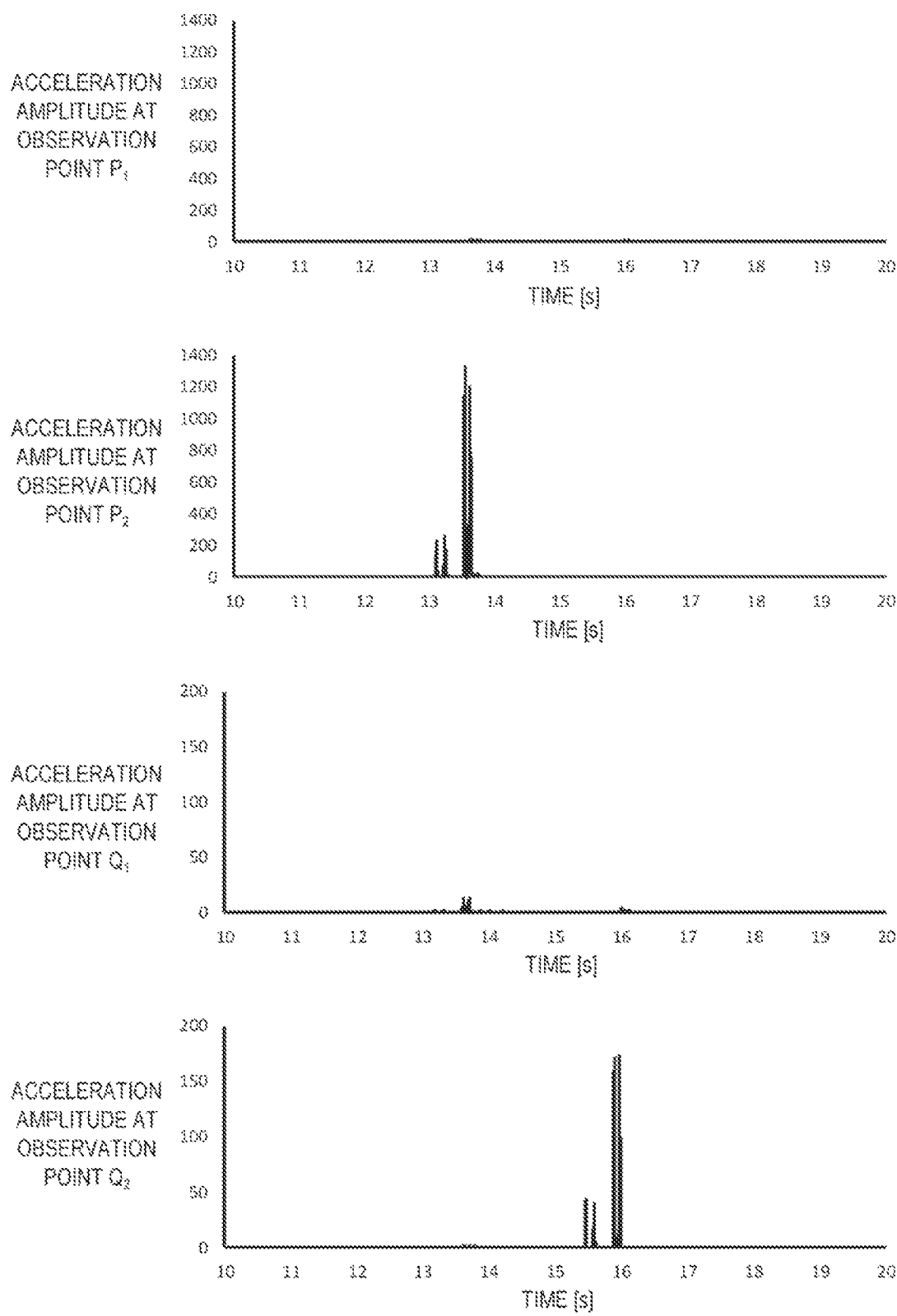
FIG. 11 shows diagrams in which an acceleration amplitude at each time point in FIG. 10 is converted into an acceleration intensity.

FIG. 10 is a diagram showing examples of the acceleration detected for the observation points $P_1$, $P_2$, $Q_1$ and $Q_2$ when the vehicle 6 having four axles travels on the lane $L_2$. FIG. 11 is a diagram in which the acceleration amplitude at each time point in FIG. 10 is converted into the acceleration intensity. In the examples in FIGS. 10 and 11, since the vehicle 6 is traveling on the lane $L_2$, a large acceleration intensity is acquired at the time point when each of the four axles of the vehicle 6 passes the observation points $P_2$ and $Q_2$. The acceleration intensity acquired at the time point when each of the four axles passes the observation point $P_2$ is included in the first observation point information. The acceleration intensity acquired at the time point when each of the four axles passes the observation point $Q_2$ is included in the second observation point information.

The measurement device 1 acquires a time point when the acquired acceleration intensity exceeds a predetermined threshold value as time points when the leading axle and subsequent axles successively pass the observation points $P_2$ and $Q_2$, that is, the entry time point of each axle to the lane $L_2$ and the exit time point of each axle from the lane $L_2$.

Figure 12:
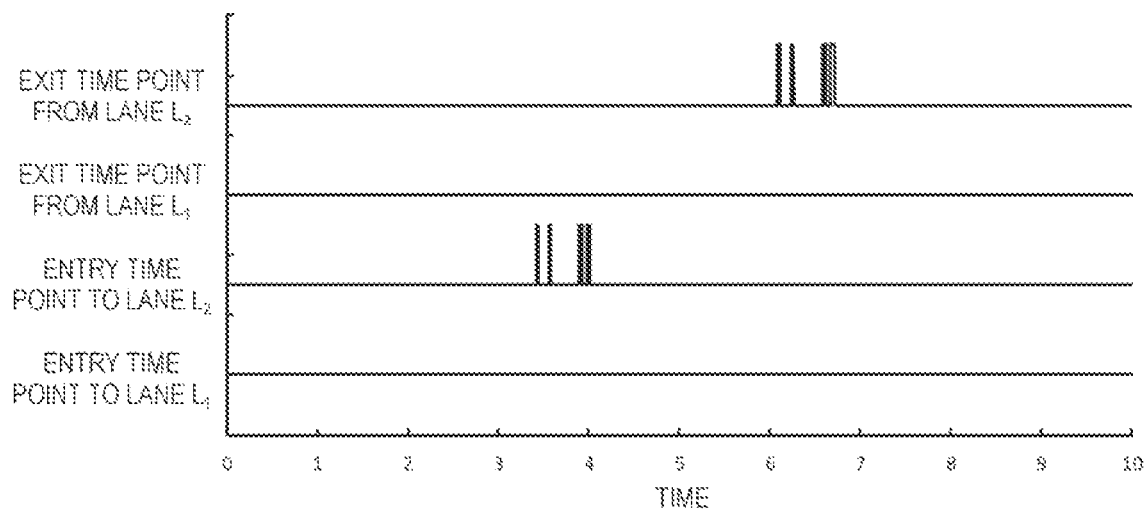
FIG. 12 is a diagram obtained by binarizing the acceleration intensity in FIG. 11 with a predetermined threshold value.

FIG. 12 is a diagram obtained by binarizing the acceleration intensities in FIG. 11 with the predetermined threshold value. In the example in FIG. 12, the entry time point of each of the four axles to the lane $L_2$ and the exit time point of each of the four axles from the lane $L_2$ are acquired. The entry time point of each of the four axles to the lane $L_2$ is included in the first observation point information. The exit time point of each of the four axles from the lane $L_2$ is included in the second observation point information.

Further, the measurement device 1 compares a pattern 1 of the entry time point of each of the four axles to the lane $L_2$ and a pattern 2 of the exit time point of each of the four axles from the lane $L_2$, and determines whether the two patterns are generated by the passage of the same vehicle 6. Since intervals among the four axles do not change, if the vehicle 6 travels on the superstructure 7 at a constant speed, the patterns 1 and 2 coincide with each other. For example, the measurement device 1 slides one of the time points of the patterns 1 and 2 so as to coincide the entry time point and the exit time point of the leading axle. When a difference between the entry time point and exit time point of each of the second to fourth axles is equal to or less than the predetermined threshold value, the measurement device 1 determines that the patterns 1 and 2 are generated by the passage of the same vehicle 6. When the difference is greater than the predetermined threshold value, the measurement device 1 determines that the patterns 1 and 2 are generated by passage of two vehicles 6. When two vehicles 6 continuously travel on one lane at the same speed, an erroneous determination that the plurality of axles of a preceding vehicle 6 and the plurality of axles of a rear vehicle 6 all belong to the axles of one vehicle 6 may occur. In order to avoid the erroneous determination, when an interval between the entry time point and the exit time point of two adjacent axles is a time difference more than or equal to a predetermined time, the measurement device 1 may distinguish that the entry time point and the exit time point of the two axles belong to two vehicles 6.

Figure 13:
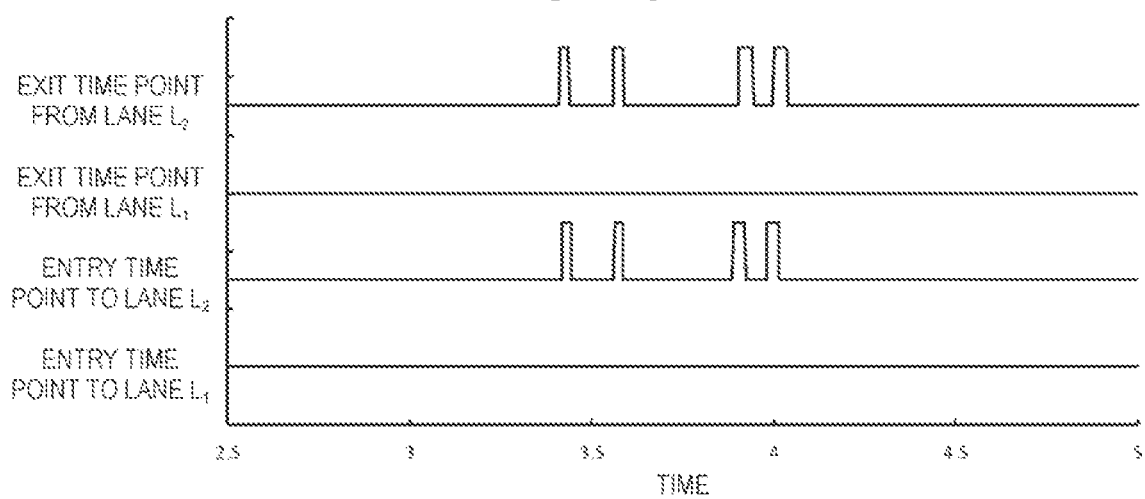
FIG. 13 is a diagram in which a pattern at an exit time point is slid with respect to FIG. 12.

FIG. 13 is a diagram in which the pattern 2 showing the exit time point of each of the four axles from the lane $L_2$ is slid so as to coincide with the entry time point and the exit time point of the leading axle with respect to FIG. 12. FIG. 13 is enlarged in a horizontal axis direction with respect to FIG. 12. In the example in FIG. 13, the pattern 1 showing the entry time point of each of the four axles to the lane $L_2$ and the pattern 2 showing the exit time point of each of the four axles from the lane $L_2$ are substantially the same. It is determined that the patterns 1 and 2 are generated by the passage of the same vehicle 6.

Then, by associating the four entry time points to the lane $L_2$ shown in FIG. 12 and peak values of the four acceleration intensities at the observation point $P_2$ shown in FIG. 11, the four exit time points from the lane $L_2$ shown in FIG. 12, and peak values of the four acceleration intensities at the observation point $Q_2$ shown in FIG. 11 with one another in order from the leading axle, the measurement device 1 acquires the correspondence information of the leading axle, the correspondence information of the second axle, the correspondence information of the third axle, and the correspondence information of the fourth axle. Further, the measurement device 1 acquires the correspondence information in which the vehicle 6 traveling on the lane $L_2$ and the correspondence information of the four axles are associated with each other. These pieces of information are included in the axle information together with the first observation point information and the second observation point information.

Based on the axle information, the measurement device 1 can identify, for any vehicle 6 passing through the lane $L_j$ of the superstructure 7, the entry time point of each axle of the vehicle 6 to the observation point $P_j$, the acceleration intensity at the observation point $P_j$ by each axle, the exit time point of each axle from the observation point $Q_j$, and the acceleration intensity at the observation point $Q_j$ by each axle.

1-3 Deflection Waveform Formation

Figure 14:
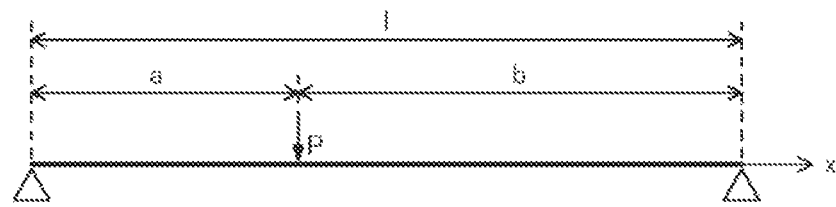
FIG. 14 is a diagram illustrating the structural model of the superstructure of the bridge.

In the present embodiment, considering that in the superstructure 7 of the bridge 5, one or more bridge floors 7a each constituted by the floor plate F and the main girders $G_1$ to $G_K$ are continuously arranged, the measurement device 1 calculates a displacement of one bridge floor 7a as the displacement at the central position in the longitudinal direction. The load applied to the superstructure 7 moves from one end to the other end of the superstructure 7. At this time, a position of the load on the superstructure 7 and a load amount can be used to express a deflection amount, which is the displacement at the central portion of the superstructure 7. In the present embodiment, in order to express, as a trajectory of the deflection amount due to the movement on a beam with a one-point load, the deflection deformation when the axles of the vehicle 6 move on the superstructure 7, a structural model shown in FIG. 14 is considered. In the structural model, the deflection amount at the central position is calculated. In FIG. 14, P is a load. a is a load position from an end of the superstructure 7 on a side where the vehicle 6 enters. b is a load position from an end of the superstructure 7 on a side where the vehicle 6 exits. l is a distance between both ends of the superstructure 7. The structural model shown in FIG. 14 is a simple beam whose both ends are supported with both ends as fulcrums.

In the structural model shown in FIG. 14, when the position of the end of the superstructure 7 on the side where the vehicle 6 enters is zero and the observation position for the deflection amount is x, a bending moment M of the simple beam is expressed by Equation (1).

$$M = \frac{b}{l}Px - PH_a(x-a) \tag{1}$$

In Equation (1), a function $H_a$ is defined as in Equation (2).

$$H_a = \begin{cases} 0 & (\text{if } x \le a) \\ 1 & (\text{if } x > a) \end{cases} \tag{2}$$

Equation (3) is obtained by transforming Equation (1).

$$-\frac{Ml}{P} = -bx + H_a l(x-a) \tag{3}$$

Meanwhile, the bending moment M is expressed by Equation (4). In Equation (4), θ is an angle, l is a secondary moment, and E is a Young's modulus.

$$-M = EI\frac{d\theta}{dx} \tag{4}$$

Equation (4) is substituted into Equation (3), and Equation (5) is obtained.

$$\frac{EIl}{P}\frac{d\theta}{dx} = -bx + H_a l(x-a) \tag{5}$$

Equation (6) is obtained by integrating Equation (5) with respect to the observation position x, and Equation (7) is obtained by calculating Equation (6). In Equation (7), $C_1$ is an integral constant.

$$\int \frac{EIl}{P}\frac{d\theta}{dx} = \int (-bx + H_a l(x-a))dx \tag{6}$$

$$\frac{EIl}{P}\theta = -\frac{bx^2}{2} + H_a \frac{l(x-a)^2}{2} + C_1 \tag{7}$$

Further, Equation (8) is obtained by integrating Equation (7) with respect to the observation position x, and Equation (9) is obtained by calculating Equation (8). In Equation (9), $C_2$ is an integral constant.

$$\int \frac{EIl}{P}\theta\,dx = \int \left\{-\frac{bx^2}{2} + H_a \frac{l(x-a)^2}{2} + C_1\right\}dx \tag{8}$$

$$\frac{EIl}{P}\theta x = -\frac{bx^3}{6} + H_a \frac{l(x-a)^3}{6} + C_1 x + C_2 \tag{9}$$

In Equation (9), $\theta x$ represents a deflection amount. Equation (10) is obtained by replacing $\theta x$ with a deflection amount w.

$$\frac{EIl}{P}w = -\frac{bx^3}{6} + H_a \frac{l(x-a)^3}{6} + C_1 x + C_2 \tag{10}$$

Based on FIG. 14, since b=l−a, Equation (10) is transformed into Equation (11).

$$\frac{EIl}{P}w = -\frac{(l-a)x^3}{6} + H_a \frac{l(x-a)^3}{6} + C_1 x + C_2 \tag{11}$$

Since the deflection amount w=0 when x=0, and $H_a$=0 based on x≤a, Equation (12) is obtained by substituting x=w=$H_a$=0 into Equation (11).

$$C_2 = 0 \tag{12}$$

Since the deflection amount w=0 when x=l, and $H_a$=1 based on x>a, Equation (13) is obtained by substituting x=l, w=0, and $H_a$=1 into Equation (11).

$$C_1 = \frac{a(l-a)(a+2(l-a))}{6} \tag{13}$$

Equation (14) is obtained by substituting b=l−a into Equation (13).

$$C_1 = \frac{ab(a+2b)}{6} \tag{14}$$

Equation (15) is obtained by substituting the integral constant $C_1$ in Equation (12) and the integral constant $C_2$ in Equation (13) into Equation (10).

$$\frac{EIl}{P}w = -\frac{bx^3}{6} + H_a \frac{l(x-a)^3}{6} + \frac{ab(a+2b)}{6}x \tag{15}$$

Equation (15) is transformed and the deflection amount w at the observation position x when the load P is applied to the position a is expressed by Equation (16).

$$w = \frac{P}{6EIl}\left\{-bx^3 + H_a l(x-a)^3 + ab(a+2b)x\right\} \tag{16}$$

Figure 15:
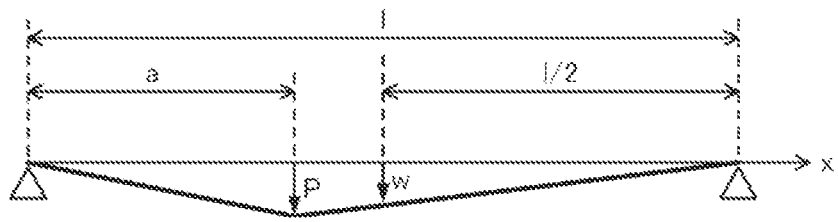
FIG. 15 is a diagram illustrating the structural model of the superstructure of the bridge.

FIG. 15 shows a state in which the load P moves from one end to the other end of the simple beam under a condition that the observation position x of the deflection amount is fixed at the central position of the simple beam, that is, when x=l/2.

When the load position a is on the left side of the observation position x=l/2, since $H_a$=1 due to x>a, Equation (17) is obtained by substituting x=l/2 and $H_a$=1 into Equation (16).

$$w = \frac{P}{6EIl}\left\{-b\left(\frac{l}{2}\right)^3 + 1l\left(\left(\frac{l}{2}\right)-a\right)^3 + ab(a+2b)\left(\frac{l}{2}\right)\right\} \tag{17}$$

Equation (18) is obtained by substituting l=a+b into Equation (17).

$$w = \frac{P}{48EI}a\left(-a^2 + 3((a+b)^2 - a^2)\right) \tag{18}$$

Substituting a+b=l into Equation (18), a deflection amount $w_L$ at the observation position x when the position of the load P is on the left side of the central observation position x=l/2 is as shown in Equation (19).

$$w_L = \frac{P}{48EI}\left(3al^2 - 4a^3\right) \tag{19}$$

On the other hand, when the load position a is on the right side of the observation position x=l/2, since $H_a$=0 due to x≤a, Equation (20) is obtained by substituting x=l/2 and $H_a$=0 into Equation (16).

$$w = \frac{P}{6EIl}\left\{-b\left(\frac{l}{2}\right)^3 + ab(a+2b)\left(\frac{l}{2}\right)\right\} \tag{20}$$

Substituting l=a+b into Equation (20), a deflection amount $w_R$ at the observation position x when the position of the load P is on the right side of the central observation position x=l/2 is as shown in Equation (21).

$$w_R = \frac{P}{48EI}\left\{3a^2b + 6ab^2 - b^3\right\} \tag{21}$$

On the other hand, when the load position a is the same as the observation position x=½, since $H_a=0$ based on x≤a, Equation (22) is obtained by substituting $H_a=0$ and a=b=½ into Equation (16).

$$w = \frac{P}{6EIl}2a^4 \tag{22}$$

Further, substituting a=½ into Equation (22), the deflection amount w at the observation position x when the position of the load P is the same as the central observation position is as shown in Equation (23).

$$w = \frac{P}{48EI}l^3 \tag{23}$$

In the simple beam with fulcrums at both ends, a maximum deflection displacement is obtained when the load P is in the center. Therefore, according to Equation (23), a maximum deflection amount $w_{max}$ is expressed by Equation (24).

$$w_{max} = w = \frac{P}{48EI}l^3 \tag{24}$$

When the deflection amount $w_L$ at the observation position x when the position of the load P is on the left side of the central observation position x=½ is divided by the maximum deflection amount $w_{max}$ and normalized by the maximum deflection amount $w_{max}$, Equation (25) is obtained based on Equation (19) and Equation (24).

$$\frac{w_L}{w_{max}} = \frac{\frac{P}{48EI}(3al^2 - 4a^3)}{\frac{P}{48EI}l^3} = \frac{3a}{l} - \frac{4a^3}{l^3} \tag{25}$$

Equation (26) is obtained by setting a/l=r in Equation (25).

$$\frac{w_L}{w_{max}} = 3r - 4r^3 \tag{26}$$

On the other hand, when the deflection amount $w_R$ at the observation position x when the position of the load P is on the right side of the central observation position x=½ is divided by the maximum deflection amount $w_{max}$ and normalized by the maximum deflection amount $w_{max}$, Equation (27) is obtained based on Equation (21) and Equation (24).

$$\frac{w_R}{w_{max}} = \frac{\frac{P}{48EI}(3a^2b + 6ab^2 - b^3)}{\frac{P}{48EI}l^3} = \frac{3b}{l} - \frac{4b^3}{l^3} \tag{27}$$

Here, by a/l=r, a+b=l, since b=l×(1−r), Equation (28) is obtained by substituting b=l×(1−r) into Equation (27).

$$\frac{w_R}{w_{max}} = 3(1-r) - 4(1-r)^3 \tag{28}$$

By summarizing Equation (25) and Equation (27), a normalized deflection amount $w_{std}$ normalized by the maximum deflection amount observed at the central portion when the load P moves on the simple beam is expressed by Equation (29).

$$w_{std} = \frac{w}{w_{max}} = \begin{cases} 3r - 4r^3 & \left(\text{if } a < \frac{l}{2}\right) \\ 3(1-r) - 4(1-r)^3 & \left(\text{if } \frac{l}{2} < a\right) \end{cases} \tag{29}$$

In Equation (29), r=a/l and 1−r=b/l indicate a ratio of the position of the load P to the distance l between the fulcrums of the simple beam, and a variable R is defined as shown in Equation (30).

$$R = \begin{cases} \frac{a}{l} & \left(\text{if } a < \frac{l}{2}\right) \\ \frac{b}{l} & \left(\text{if } \frac{l}{2} < a\right) \end{cases} \tag{30}$$

Equation (29) is replaced by Equation (31) using Equation (30).

$$w_{std} = 3R - 4R^3 \tag{31}$$

Equation (30) and Equation (31) indicate that, when the observation position is in the center of the simple beam, the deflection amount is symmetrical on the right side and the left side of the center of the position of the load P.

Figure 16:
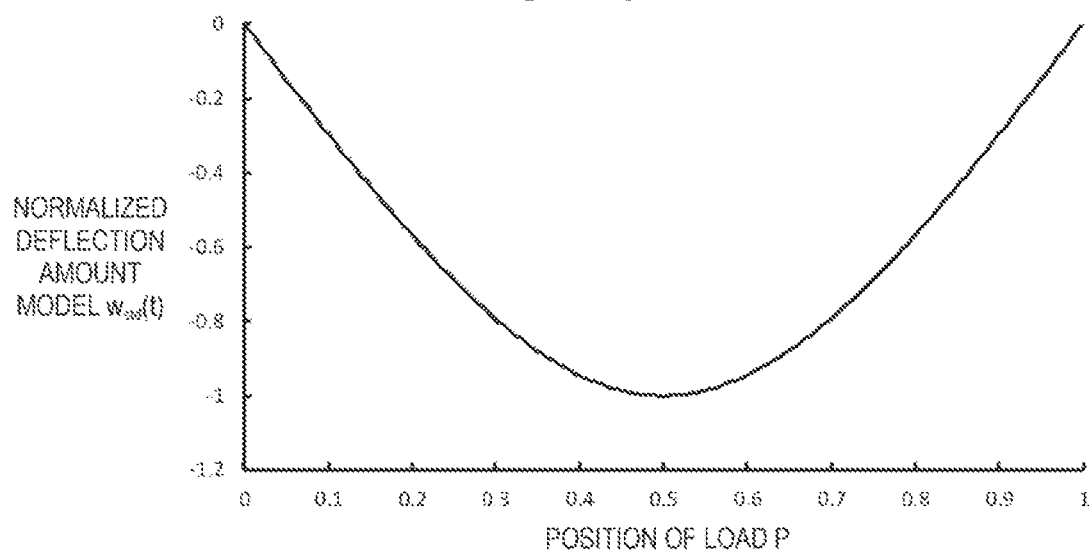
FIG. 16 is a diagram showing an example of a normalized deflection amount waveform.

FIG. 16 shows an example of a waveform of the normalized deflection amount $w_{std}$ in the case of the observation position x=½. In FIG. 16, the horizontal axis represents the position of the load P, and the vertical axis represents the normalized deflection amount $w_{std}$. In the example in FIG. 16, the distance l between the fulcrums of the simple beam is 1.

The above-described axle information includes the entry time point of each axle of the vehicle 6 to the lane $L_j$ and the exit time point of each axle of the vehicle 6 from the lane $L_j$, that is, the time points when the vehicle 6 passes the positions at both ends of the superstructure 7. Therefore, the positions at both ends of the superstructure 7 correspond to the entry time point and the exit time point of the axle, and the load positions a and b are replaced with time. It is assumed that the speed of the vehicle 6 is substantially constant and the position and the time point are substantially proportional.

When the load position at the left end of the superstructure 7 corresponds to an entry time point $t_i$, and the load position at the right end of the superstructure 7 corresponds to an exit time point $t_o$, the load position a from the left end is replaced with an elapsed time period $t_p$ from the entry time point $t_i$. The elapsed time period $t_p$ is expressed by Equation (32).

$$t_p = t - t_i \tag{32}$$

The distance l between the fulcrums is replaced by a time $t_s$ from the entry time point $t_i$ to the exit time point $t_o$. The time $t_s$ is expressed by Equation (33).

$$t_s = t_o - t_i \tag{33}$$

Since the speed of the vehicle 6 is constant, a time point $t_c$ when the load position a is in the center of the superstructure 7 is expressed by Equation (34).

$$t_c = \frac{t_i + t_o}{2} \tag{34}$$

By replacing the position with the time as described above, the position of the load P is expressed by Equation (35) and Equation (36).

$$\frac{a}{l} = r = \frac{t_p}{t_s} \tag{35}$$

$$1 - r = 1 - \frac{t_p}{t_s} \tag{36}$$

Substituting Equation (35) and Equation (36) into Equation (29), the normalized deflection amount $w_{std}$ replaced by time is expressed by Equation (37).

$$w_{std} = \begin{cases} 0 \text{ (if } t < t_i) \\ 3\frac{t_p}{t_s} - 4\left(\frac{t_p}{t_s}\right)^3 \left(\text{if } t_i < t < \frac{(t_o + t_i)}{2}\right) \\ 3\left(1 - \frac{t_p}{t_s}\right) - 4\left(1 - \frac{t_p}{t_s}\right)^3 \left(\text{if } \frac{(t_o + t_i)}{2} < t < t_o\right) \\ 0 \text{ (if } t > t_o) \end{cases} \tag{37}$$

Alternatively, according to Equation (30) and Equation (31), the normalized deflection amount $w_{std}$ normalized by the maximum amplitude is expressed by Equation (38) by substituting the variable R with time.

$$w_{std} = 3R - 4R^3, \tag{38}$$

$$R = \begin{cases} 0 \text{ (if } t < t_i) \\ \frac{t_p}{t_s} \left(\text{if } t_i < t < \frac{(t_o + t_i)}{2}\right) \\ 1 - \frac{t_p}{t_s} \left(\text{if } \frac{(t_o + t_i)}{2} < t < t_o\right) \\ 0 \text{ (if } t > t_o) \end{cases}$$

Considering that a relationship between the elapse of time and the normalized deflection amount is treated as observation data, the normalized deflection amount $w_{std}$ is replaced with a normalized deflection amount model $w_{std}(t)$ at the observation position at the center of the beam due to the movement of a single concentrated load on the simple beam with the fulcrums at both ends, and Equation (38) becomes Equation (39). Equation (39) is an approximate expression of deflection of the superstructure 7, which is the structure, and is an equation based on the structural model of the superstructure 7. Specifically, Equation (39) is an equation normalized by the maximum amplitude of deflection at the central position between the observation point $P_j$ and the observation point $Q_j$ in the lane $L_j$ where the vehicle 6 moves. The maximum value of the equation is 1.

$$w_{std}(t) = 3R - 4R^3, \tag{39}$$

$$R = \begin{cases} 0 \text{ (if } t < t_i) \\ \frac{t_p}{t_s} \left(\text{if } t_i < t < \frac{(t_o + t_i)}{2}\right) \\ 1 - \frac{t_p}{t_s} \left(\text{if } \frac{(t_o + t_i)}{2} < t < t_o\right) \\ 0 \text{ (if } t > t_o) \end{cases}$$

Time information required for the normalized deflection amount model $w_{std}(t)$ is obtained from the axle information described above. Since the normalized deflection amount model $w_{std}(t)$ has a maximum deflection amount $w_{max}$ at the central position of the superstructure 7, Equation (40) is obtained.

$$w_{max} = \max\{w_{std}(t)\} = w_{std}\left(t_i + \frac{1}{2}t_s\right) \tag{40}$$

The deflection amount w shown in the above Equation (23) is the deflection amount at the observation position $x = \frac{1}{2}$ when the position of the load P is the same as the central observation position. Since the deflection amount w coincides with the maximum deflection amount $w_{max}$, Equation (41) is obtained.

$$w_{max} = \frac{P}{48EI}l^3 \tag{41}$$

Figure 17:
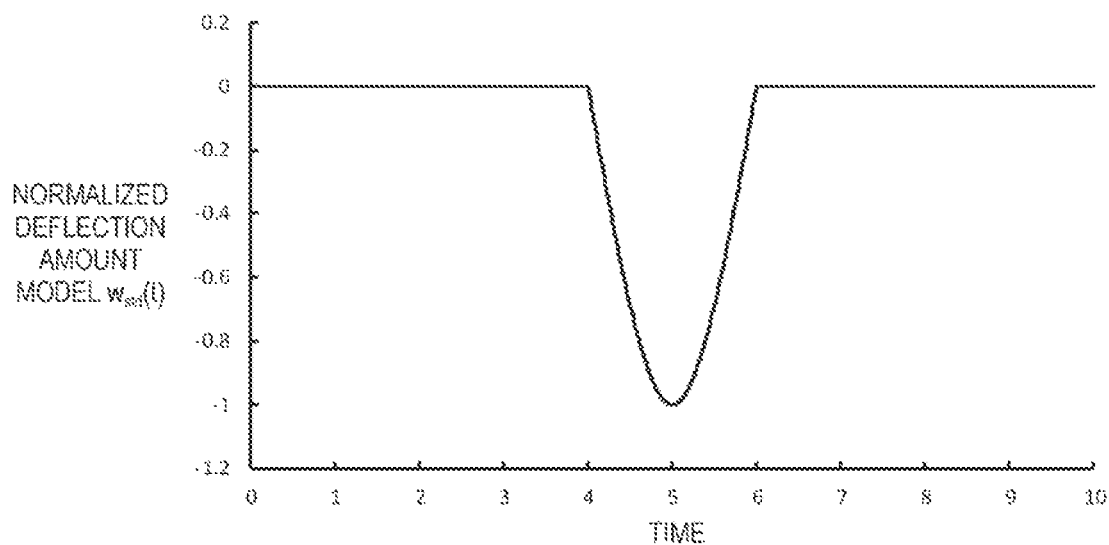
FIG. 17 is a diagram showing an example of the normalized deflection amount model.

FIG. 17 shows an example of the normalized deflection amount model $w_{std}(t)$. In the example in FIG. 17, at the time point $t_c = (t_i + t_o)/2 = 5$ in which the entry time point $t_i = 4$ and the exit time point $t_o = 6$, the normalized deflection amount model $w_{std}(t)$ has the maximum deflection amount $w_{max} = 1$ at the central position of the superstructure 7.

It is assumed that the superstructure 7 which is the structure functions as bridge weigh in motion (BWIM), and is considered to be deformed in a manner of resembling a simple beam with both ends as fulcrums. Since the vehicle 6, which is a moving object, passes through the superstructure 7 substantially at a constant speed from one end portion of the superstructure 7, and moves to the other end portion, and an intermediate portion of the superstructure 7 and the end portion of the superstructure 7 receive the same load. Therefore, it can be considered that the observed displacement of the superstructure 7 is approximately proportional to an acceleration intensity $a_p$ of the axle obtained from the axle information.

Assuming that a proportional coefficient is a product of the acceleration intensity $a_p$ of the axle obtained from the axle information and a predetermined coefficient p, a deflection waveform H(t) of the superstructure 7 generated by each axle is obtained based on Equation (42). The acceleration intensity $a_p$ may be the acceleration intensity at the time of entry, the acceleration intensity at the time of exit, which are included in the axle information, or a statistical value such as an average value of the acceleration intensity at the time of entry and the acceleration intensity at the time of exit.

$$H(t) = p a_p w_{std}(t) \tag{42}$$

Substituting Equation (39) into Equation (42), the deflection waveform H(t) is expressed by Equation (43).

$$H(t) = pa_p(3R - 4R^3),\qquad(43)$$

$$R = \begin{cases} 0 \text{ (if } t < t_i) \\ \dfrac{t_p}{t_s}\left(\text{if } t_i < t < \dfrac{(t_o + t_i)}{2}\right) \\ 1 - \dfrac{t_p}{t_s}\left(\text{if } \dfrac{(t_o + t_i)}{2} < t < t_o\right) \\ 0 \text{ (if } t > t_o) \end{cases}$$

Until now, it is assumed that the single load P is applied to the superstructure 7, but the load from each axle of the vehicle 6 is applied to the lane $L_j$ on which the vehicle 6 travels, so that Equation (43) is replaced by a deflection waveform $H_{jk}(t)$ as in Equation (44). In Equation (44), k is an integer indicating the axle number, and j is an integer indicating the lane number. As shown in Equation (44), the deflection waveform $H_{jk}(t)$ is proportional to the product of the predetermined coefficient p and an acceleration intensity $a_{pk}$.

$$H_{jk}(t) = pa_{p_{jk}} w_{std}(t) = pa_{p_{jk}}(3R - 4R^3),\qquad(44)$$

$$R = \begin{cases} 0 \text{ (if } t < t_i) \\ \dfrac{t_p}{t_s}\left(\text{if } t_i < t < \dfrac{(t_o + t_i)}{2}\right) \\ 1 - \dfrac{t_p}{t_s}\left(\text{if } \dfrac{(t_o + t_i)}{2} < t < t_o\right) \\ 0 \text{ (if } t > t_o) \end{cases}$$

Figure 18:
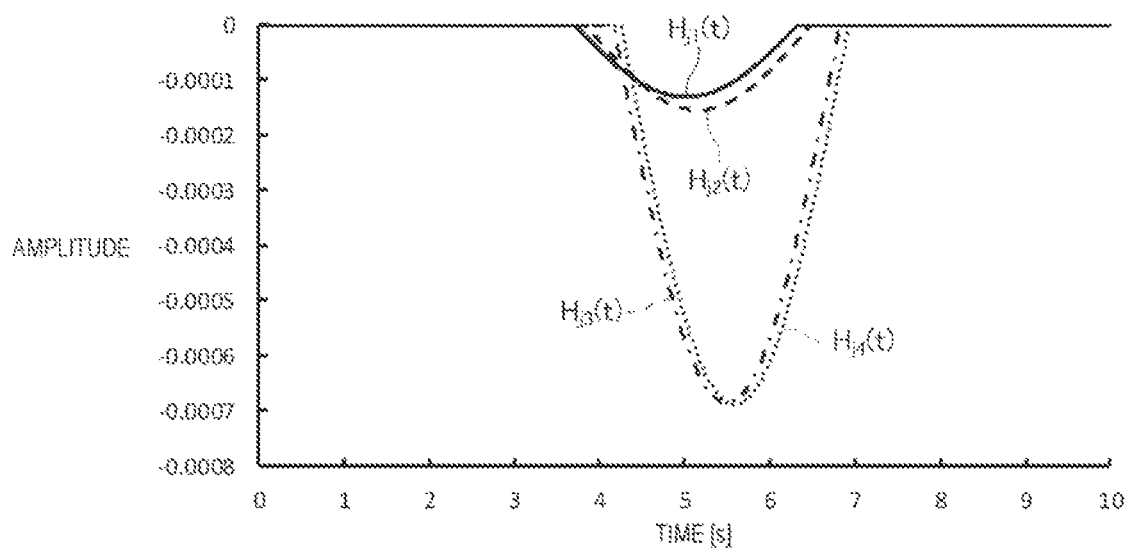
FIG. 18 is a diagram showing an example of a deflection waveform of the bridge generated by each axle.

FIG. 18 shows an example of the deflection waveform of the superstructure 7 generated by each axle included in the vehicle 6 traveling on the lane $L_j$. In the example in FIG. 18, the vehicle 6 is a four-axle vehicle, and four deflection waveforms $H_{j1}(t)$, $H_{j2}(t)$, $H_{j3}(t)$, and $H_{j4}(t)$ are shown. In the example in FIG. 18, since the loads generated by the leading and second axles are relatively small and the loads generated by the third and fourth axles are relatively large, maximum amplitudes of the deflection waveforms $H_{j1}(t)$ and $H_{j2}(t)$ are relatively small, and maximum amplitudes of the deflection waveforms $H_{j3}(t)$ and $H_{j4}(t)$ are relatively large.

As shown in Equation (45), a vehicle deflection waveform $CP_{jm}(t)$, which is the deflection waveform of the superstructure 7 generated by the vehicle 6 traveling on the lane $L_j$, is obtained by adding the deflection waveform $H_{jk}(t)$ of the superstructure 7 generated by each axle. In Equation (45), m is an integer indicating the vehicle number, k is an integer indicating the axle number, and j is an integer indicating the lane number.

$$CP_{jm}(t) = \sum_k H_{jk}(t)\qquad(45)$$

Figure 19:
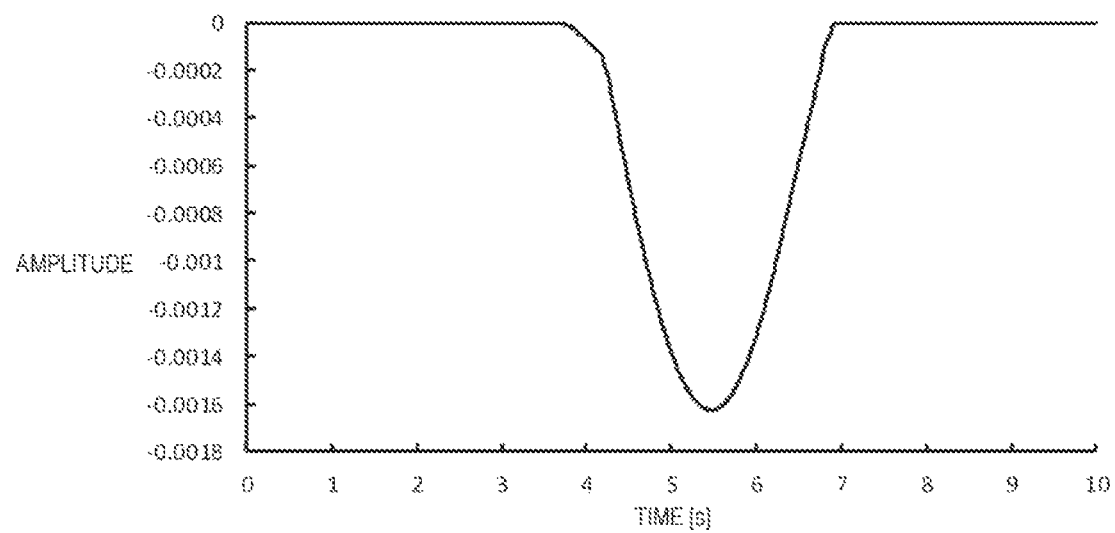
FIG. 19 is a diagram showing an example of a vehicle deflection waveform.

FIG. 19 shows a vehicle deflection waveform $C_{jm}(t)$ obtained by adding the four deflection waveforms $H_{j1}(t)$, $H_{j2}(t)$, $H_{j3}(t)$, and $H_{j4}(t)$ shown in FIG. 18.

1-4 Displacement Calculation for Each Vehicle

When M vehicles 6 move consecutively along a certain lane $L_j$ of the superstructure 7, in other words, the M vehicles 6 travel at different positions of the lane $L_j$ at the same time, it is assumed that a waveform obtained by multiplying a certain amplitude coefficient $h_{jm}$ and a vehicle deflection waveform $CP_{jm}(t)$ for a certain integer m of 1 or more and M or less is an amplitude adjusted deflection waveform $h_{jm}CP_{jm}(t)$, and as shown in Equation (46), a sum of the amplitude adjusted deflection waveforms $h_{j1}CP_{j1}(t)$ to $h_{jM}CP_{jM}(t)$ is approximated to a displacement waveform $x_j(t)$ at the observation point $R_j$. The displacement waveform $x_j(t)$ at the observation point $R_j$ is obtained, for example, by double-integrating the acceleration detected by the sensor 23 observing the observation point $R_j$. The M vehicles 6 that move consecutively along a certain lane $L_j$ of the superstructure 7 are examples of "first to M-th moving objects". The vehicle deflection waveforms $CP_{j1}(t)$ to $CP_{jM}(t)$ are examples of the "first to M-th moving object deflection waveforms". The amplitude adjusted deflection waveforms $h_{j1}CP_{j1}(t)$ to $h_{jM}CP_{jM}(t)$ are examples of the "first to M-th amplitude adjusted deflection waveforms". The amplitude coefficients $h_j1$ to $h_jM$ are examples of the "first to M-th amplitude coefficients".

$$x_j(t) \propto \sum_{m=1}^{M} h_{jm} CP_{jm}(t)\qquad(46)$$

If each amplitude coefficient $h_{jm}$ satisfying the Equation (46) can be calculated, the displacement waveform at the observation point $R_j$ generated by each vehicle 6 can be modeled as the amplitude adjusted deflection waveform $h_{jm}CP_{jm}(t)$, and thereby each amplitude coefficient $h_{jm}$ can be separated from one another.

In the present embodiment, first, the measurement device 1 determines whether a condition that, at a time point $t_{i\_max}$ when an amplitude of a vehicle deflection waveform $CP_{j1}(t)$ has the maximum value for all integers i of 1 or more and M or less, amplitudes of all the vehicle deflection waveforms among the vehicle deflection waveforms $CP_{j1}(t)$ to $CP_{jM}(t)$ excluding the vehicle deflection waveform $CP_{j1}(t)$ are zero is met.

Then, when the condition is met, the measurement device 1 calculates, according to Equation (47), the amplitude coefficients $h_{j1}$ to $h_{jM}$ at which the value of the amplitude adjusted deflection waveform $h_{jk}CP_{jk}(t)$ and the value of the displacement waveform $x_j(t)$ match each other at a time point $t_{k\_max}$ when the vehicle deflection waveform $CP_{jk}(t)$ having the largest amplitude among the vehicle deflection waveforms $CP_{j1}(t)$ to $CP_{jM}(t)$ has the maximum value.

$$h_{jk} = \frac{x_j(t_{k\_max})}{CP_{jk}(t_{k\_max})}\qquad(47)$$

Then, the measurement device 1 calculates an amplitude coefficient $h_{jk'}$ at which the value of the amplitude adjusted deflection waveform $h_{jk'}CP_{jk'}(t)$ and a value of the displacement waveform $x'_j(t)$ obtained by subtracting an amplitude adjusted deflection waveform $h_{jk}CP_{jk}(t)$ from the displacement waveform $x_j(t)$ match each other at a time point $t_{k'\_max}$ when the vehicle deflection waveform $CP_{jk'}(t)$ having the second largest amplitude among the vehicle deflection waveforms $CP_{j1}(t)$ to $CP_{jM}(t)$ has the maximum value. The measurement device 1 repeats the similar calculation to calculate all the amplitude coefficients $h_{j1}$ to $h_{jM}$.

As a result, for a certain integer i of 1 or more and M or less, at a time point $t_{i\_max}$, a sum of the amplitude adjusted deflection waveforms $h_{j1}CP_{j\_1}(t)$ to $h_{jM}CP_{jM}(t)$ are equal to the displacement waveform $x_j(t)$ at the observation point $R_j$ as shown in Equation (48). The time point $t_{i\_max}$ is an example of the "i-th time point".

$$x_j(t_{i\_max}) = \sum_{m=1}^{M} h_{jm} CP_{jm}(t_{i\_max}) \qquad (48)$$

As an example, in the case of the arrangement example shown in FIGS. 7 and 9, a procedure of calculating amplitude coefficients $h_{11}$ and $h_{12}$ by the measurement device 1 when two vehicles 6 move consecutively along the lane $L_1$ will be described.

Figure 20:
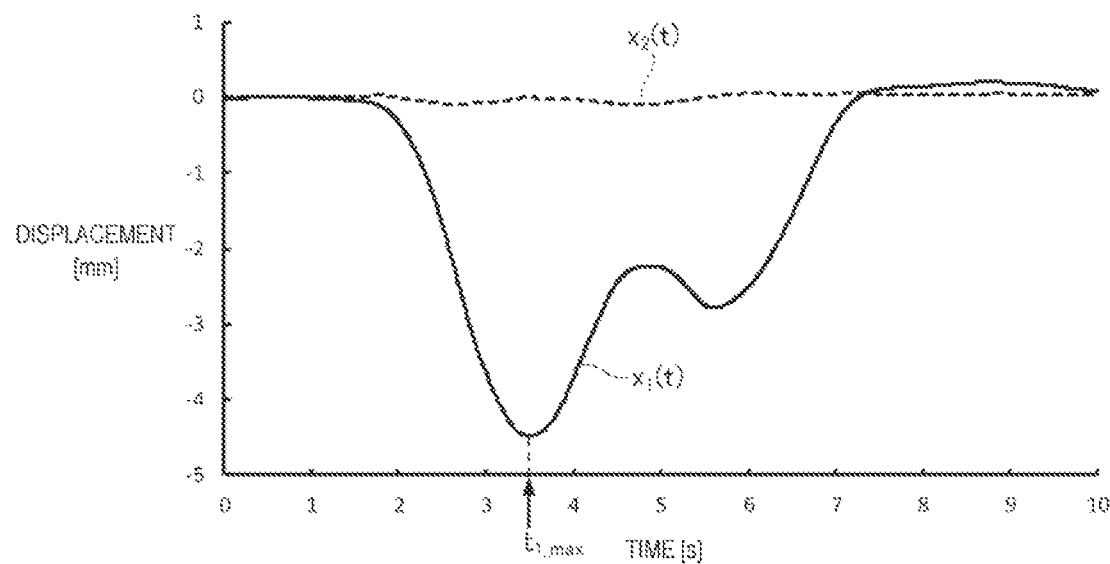
FIG. 20 is a diagram showing an example of a displacement waveform.

FIG. 20 shows an example of a displacement waveform $x_1(t)$ at the observation point $R_1$ and a displacement waveform $x_2(t)$ at the observation point $R_2$. In FIG. 20, the horizontal axis represents time and the vertical axis represents a displacement. A solid line shows the example of the displacement waveform $x_1(t)$ at the observation point $R_1$ and a broken line shows the displacement waveform $x_2(t)$ at the observation point $R_2$. In the example of FIG. 20, in the axle information described above, an entry time point of a leading axle of the vehicle 6 to the lane $L_1$ when m=2 is between an entry time point of a leading axle of the vehicle 6 when m=1 to the lane $L_1$ and an exit time point of a last axle from the lane $L_1$, so that the measurement device 1 determines that the displacement waveform $x_1(t)$ is a waveform obtained when the two vehicles 6 move consecutively along the lane $L_1$.

Figure 21:
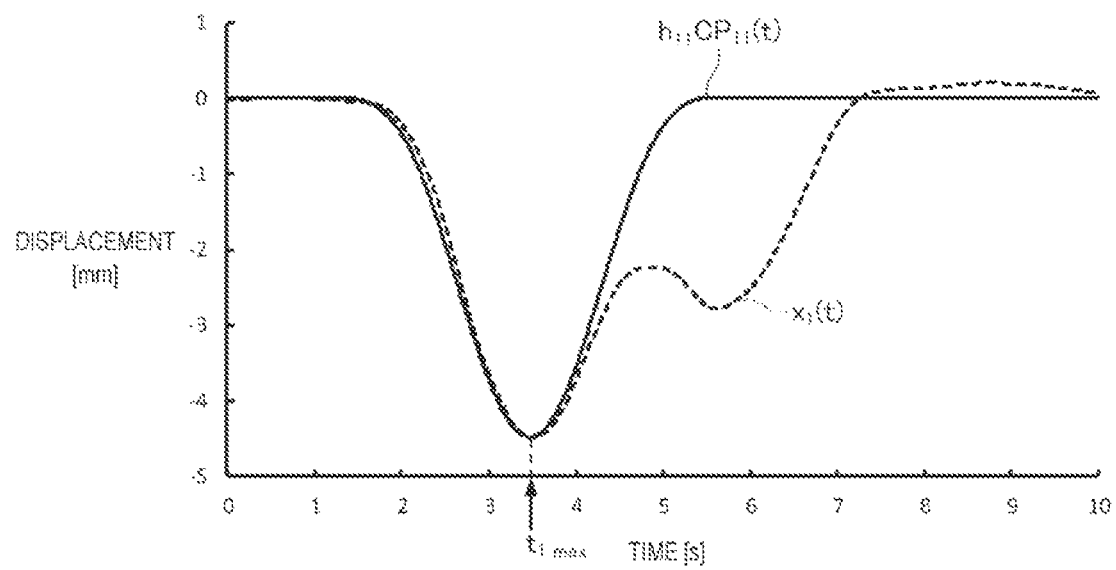
FIG. 21 is a diagram showing an example of an amplitude adjusted deflection waveform.

First, the measurement device 1 calculates an amplitude coefficient $h_{11}$ at which a value of an amplitude adjusted deflection waveform $h_{11}CP_{11}(t)$ and the value of the displacement waveform $x_1(t)$ match each other at a time point $t_{1\_max}$ when the vehicle deflection waveform $CP_{11}(t)$ having the largest amplitude in two vehicle deflection waveforms $CP_{11}(t)$ and $CP_{12}(t)$ has the maximum value. FIG. 21 shows, by a solid line, an example of the amplitude adjusted deflection waveform $h_{11}CP_{11}(t)$ obtained by multiplying the calculated amplitude coefficient $h_{11}$ and the vehicle deflection waveform $CP_{11}(t)$. In FIG. 21, the horizontal axis represents time and the vertical axis represents a displacement. In FIG. 21, the displacement waveform $x_1(t)$ is shown by a broken line.

Figure 22:
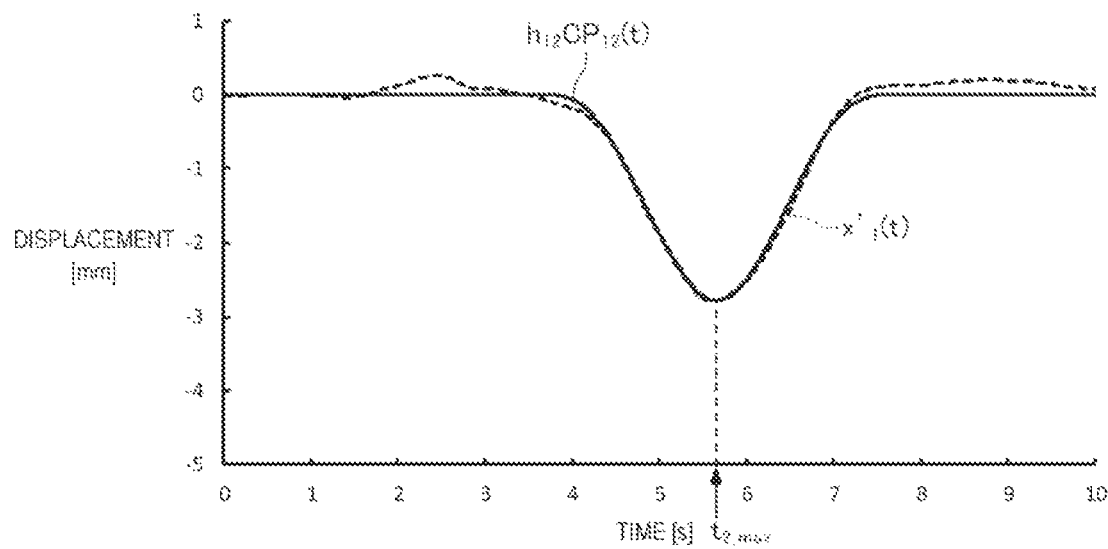
FIG. 22 is a diagram showing an example of an amplitude adjusted deflection waveform.

Next, the measurement device 1 calculates an amplitude coefficients $h_{12}$ at which a value of an amplitude adjusted deflection waveform $h_{12}CP_{12}(t)$ and a value of the displacement waveform $x'_1(t)$ obtained by subtracting an amplitude adjusted deflection waveform $h_{11}CP_{11}(t)$ from the displacement waveform $x_1(t)$ match each other at a time point $t_{2\_max}$ when a vehicle deflection waveform $CP_{12}(t)$ having the second largest amplitude in the vehicle deflection waveforms $CP_{11}(t)$ to $CP_{12}(t)$ has the maximum value. FIG. 22 shows, by a solid line, an example of the amplitude adjusted deflection waveform $h_{12}CP_{12}(t)$ obtained by multiplying the calculated amplitude coefficient $h_{12}$ and the vehicle deflection waveform $CP_{12}(t)$. In FIG. 22, the horizontal axis represents time and the vertical axis represents a displacement. In FIG. 22, the displacement waveform $x'_1(t)$ is shown by a broken line.

Figure 23:
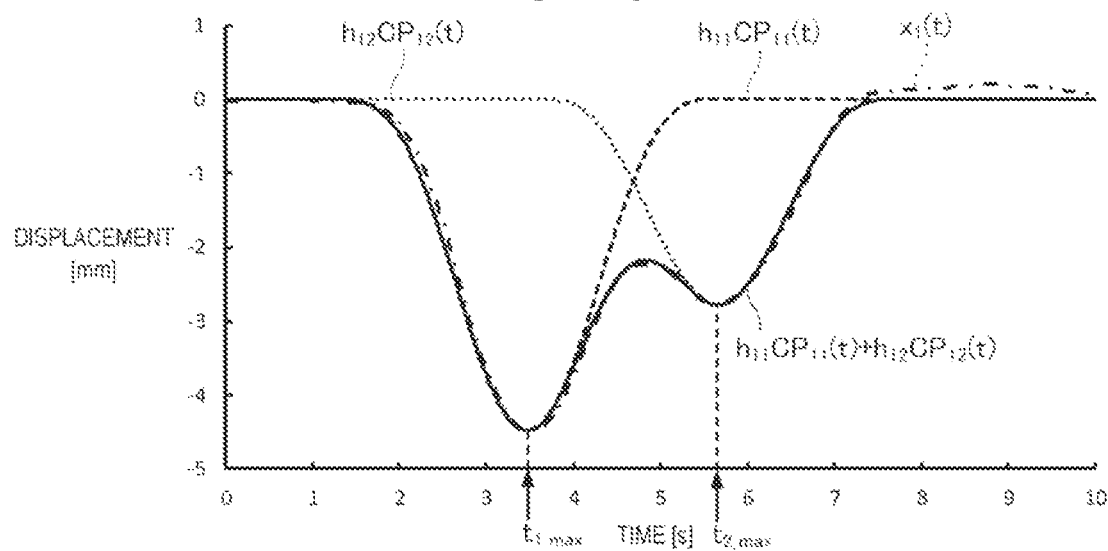
FIG. 23 is a diagram showing an example of a sum of two amplitude adjusted deflection waveforms.

In FIG. 23, a sum of the amplitude adjusted deflection waveform $h_{11}CP_{11}(t)$ and the amplitude adjusted deflection waveform $h_{12}CP_{12}(t)$ is shown by a solid line. In FIG. 23, the horizontal axis represents time and the vertical axis represents a displacement. In FIG. 23, the amplitude adjusted deflection waveform $h_{11}CP_{11}(t)$ is shown by a broken line, the amplitude adjusted deflection waveform $h_{12}CP_{12}(t)$ is shown by a dot line, and the displacement waveform $x_1(t)$ is shown by a one-dot chain line. As shown in FIG. 23, a sum of the amplitude adjusted deflection waveform $h_{11}CP_{11}(t)$ and the amplitude adjusted deflection waveform $h_{12}CP_{12}(t)$ and the displacement waveform $x_1(t)$ are well approximated, and Equation (46) is established. Therefore, it can be said that the displacement waveform at the observation point $R_1$ generated by the vehicle 6 when m=1 is modeled by the amplitude adjusted deflection waveform $h_{11}CP_{11}(t)$, and the displacement waveform at the observation point $R_1$ generated by the vehicle 6 when m=2 is modeled by the amplitude adjusted deflection waveform $h_{12}CP_{12}(t)$. As described above, the measurement device 1 can distinguishably calculate, according to the amplitude adjusted deflection waveforms $h_{11}CP_{11}(t)$ and $h_{12}CP_{12}(t)$, the displacements at the observation point $R_1$ due to traveling of the vehicles 6 along the lane $L_1$.

1-5 Measurement Method

Figure 24:
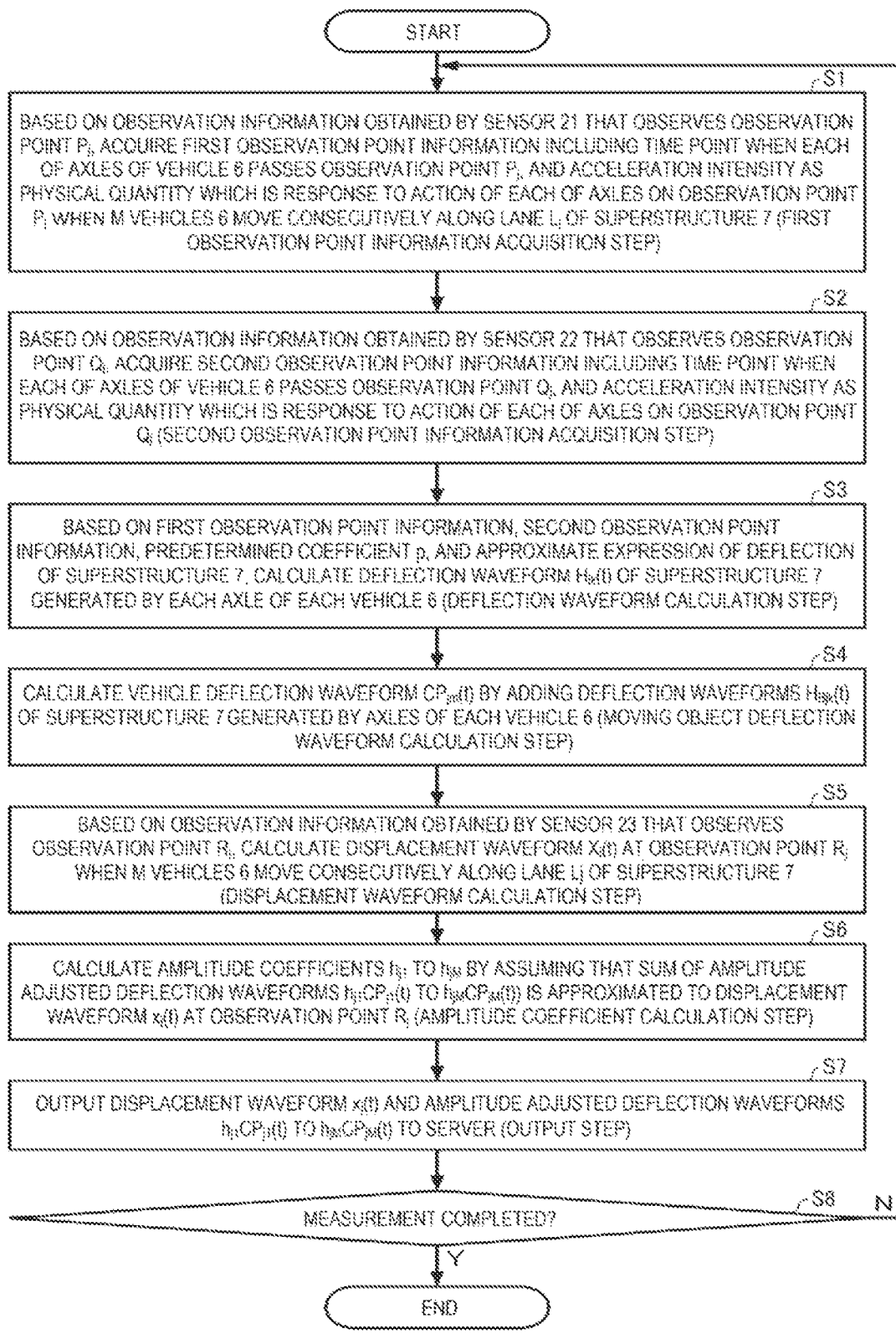
FIG. 24 is a flowchart showing an example of a procedure of a measurement method according to a first embodiment.

FIG. 24 is a flowchart showing an example of a procedure of the measurement method according to the first embodiment. In the present embodiment, the measurement device 1 executes the procedure shown in FIG. 24.

As shown in FIG. 24, first, for each integer j of 1 or more and N or less, and based on the observation information obtained by the sensor 21 that observes the observation point $P_j$, the measurement device 1 acquires first observation point information including a time point when each of a plurality of axles of each vehicle 6 passes the observation point $P_j$, and an acceleration intensity as a physical quantity which is a response to an action of each of the plurality of axles on the observation point $P_j$, when M vehicles 6 move consecutively along the lane $L_j$ of the superstructure 7 (step S1). As described above, the sensor 21 that observes the observation point $P_j$ is an acceleration sensor. The observation information obtained by the sensor 21 is detection information on the acceleration generated at the observation point $P_j$. The measurement device 1 acquires the first observation point information based on the acceleration detected by each of the sensors 21. The step S1 is a first observation point information acquisition step.

Next, based on the observation information obtained by the sensor 22 that observes the observation point $Q_j$, the measurement device 1 acquires second observation point information including a time point when each of the plurality of axles of the vehicle 6 passes the observation point $Q_j$, and an acceleration intensity as a physical quantity which is a response to an action of each of the plurality of axles on the observation point $Q_j$ (step S2). As described above, the sensor 22 that observes the observation point $Q_j$ is an acceleration sensor. The observation information obtained by the sensor 22 is detection information on the acceleration generated at the observation point $Q_j$. The measurement device 1 acquires the second observation point information based on the acceleration detected by each of the sensors 22. The step S2 is a second observation point information acquisition step.

Next, the measurement device 1 calculates the deflection waveform $H_{jk}(t)$ of the superstructure 7 generated by each of the plurality of axles of the vehicle 6 traveling on the lane $L_j$, based on the first observation point information acquired in step S1, the second observation point information acquired in step S2, a predetermined coefficient p, and the approximate expression of deflection of the superstructure 7 (step S3). Specifically, the measurement device 1 generates the above-described axle information using the first observation point information and the second observation point information, and calculates the deflection waveform $H_{jk}(t)$ of the superstructure 7 generated by each axle of each vehicle 6, according to the above Equation (44) and using the axle information and the predetermined coefficient p. The step S3 is a deflection waveform calculation step.

Next, the measurement device 1 calculates the vehicle deflection waveform $CP_{jm}(t)$ by adding the deflection waveform $H_{jk}(t)$ of the superstructure 7 generated by each of the plurality of axles of each vehicle 6 calculated in step S3 according to Equation (45) (step S4). The step S4 is a moving object deflection waveform calculation step.

Next, based on the observation information obtained by the sensor 23 that observes the observation point $R_j$, the measurement device 1 calculates the displacement waveform $X_j(t)$ at the observation point $R_j$ when M vehicles 6 move consecutively along the lane $L_j$ of the superstructure 7 (step S5). As described above, the sensor 23 that observes the observation point $R_j$ is an acceleration sensor. The observation information obtained by the sensor 23 is detection information on the acceleration generated at the observation point $R_j$. The measurement device 1 calculates the displacement waveform $X_j(t)$ by double-integrating the acceleration detected by the sensor 23. The step S5 is a displacement waveform calculation step.

Next, the measurement device 1 calculates the amplitude coefficients $h_{j1}$ to $h_{jM}$ by assuming that a waveform obtained by multiplying an amplitude coefficient $h_{jm}$ by the vehicle deflection waveform $CP_{jm}(t)$ calculated in step S4 is an amplitude adjusted deflection waveform $h_{jm}CP_{jm}(t)$, and that a sum of the amplitude adjusted deflection waveforms $h_{j1}CP_{j1}(t)$ to $h_{jM}CP_{jM}(t)$ is approximated to the displacement waveform $x_j(t)$ at the observation point $R_j$ calculated in step S5 (step S6). The step S6 is an amplitude coefficient calculation step.

Next, the measurement device 1 outputs the displacement waveform $X_j(t)$ calculated in step S5 and the amplitude adjusted deflection waveforms $h_{j1}CP_{j1}(t)$ to $h_{jM}CP_{jM}(t)$ calculated in step S6 to the server 2 (step S7). The step S7 is an output step.

The measurement device 1 repeats the processing in steps S1 to S7 until the measurement is completed (N in step S8).

Figure 25:
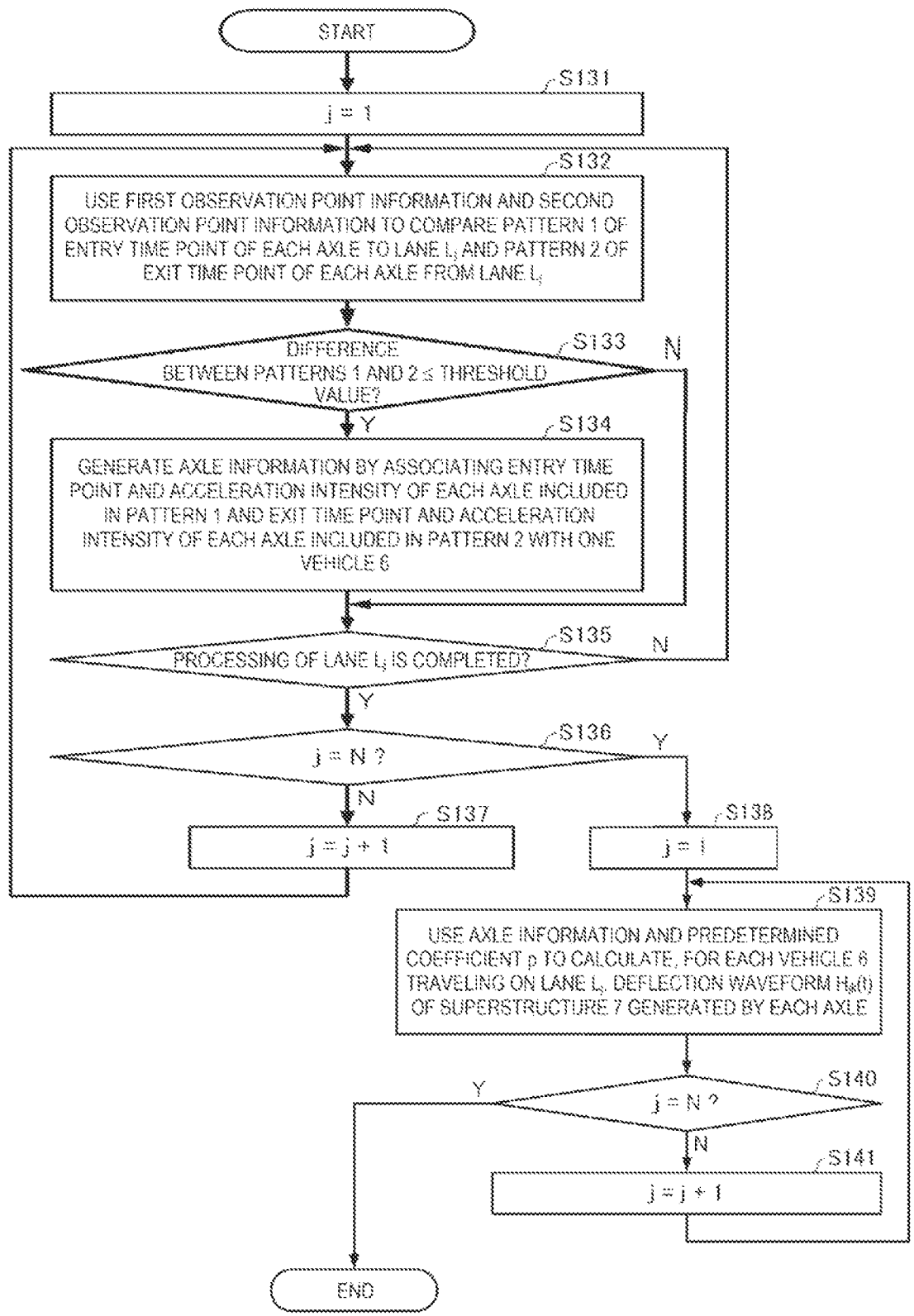
FIG. 25 is a flowchart showing an example of a procedure of a deflection waveform calculation step.

FIG. 25 is a flowchart showing an example of a procedure of the deflection waveform calculation step, which is step S3 in FIG. 25.

As shown in FIG. 25, first, the measurement device 1 sets the integer j to 1 (step S131), and uses the first observation point information and the second observation point information to compare a pattern 1 of the entry time point of each axle to the lane $L_j$ and a pattern 2 of the exit time point of each axle from the lane $L_j$ (step S132).

Then, when a difference between the entry time point of each axle included in the pattern 1 and the exit time point of each axle included in the pattern 2 is equal to or less than a threshold value (Y in step S133), the measurement device 1 generates the axle information by associating the entry time point and the acceleration intensity of each axle included in the pattern 1 and the exit time point and the acceleration intensity of each axle included in the pattern 2 with one vehicle 6 (step S134).

When the difference between the entry time point of each axle included in the pattern 1 and the exit time point of each axle included in the pattern 2 is greater than the threshold value (N in step S133), the measurement device 1 does not perform the processing in step S134.

The measurement device 1 repeats the processing in steps S132 to S134 until the processing of the lane $L_j$ is completed (N in step S135).

When the processing of the lane $L_j$ is completed (Y in step S135), but the integer j is not N (N in step S136), the measurement device 1 adds 1 to the integer j (step S137), and repeats the processing in steps S132 to S135.

Then, when the integer j is N (Y in step S136), the measurement device 1 sets the integer j to 1 (step S138), and uses the axle information generated in step S134 and the predetermined coefficient p to calculate, for each of the vehicles 6 traveling on the lane $L_j$, a deflection waveform $H_{jk}(t)$ of the superstructure 7 generated by each axle (step S139).

When the integer j is not N (N in step S140), the measurement device 1 adds 1 to the integer j (step S141), and repeats the processing in step S139.

Then, when the integer j is N (Y in step S140), the measurement device 1 ends the processing in the deflection waveform calculation step.

Figure 26:
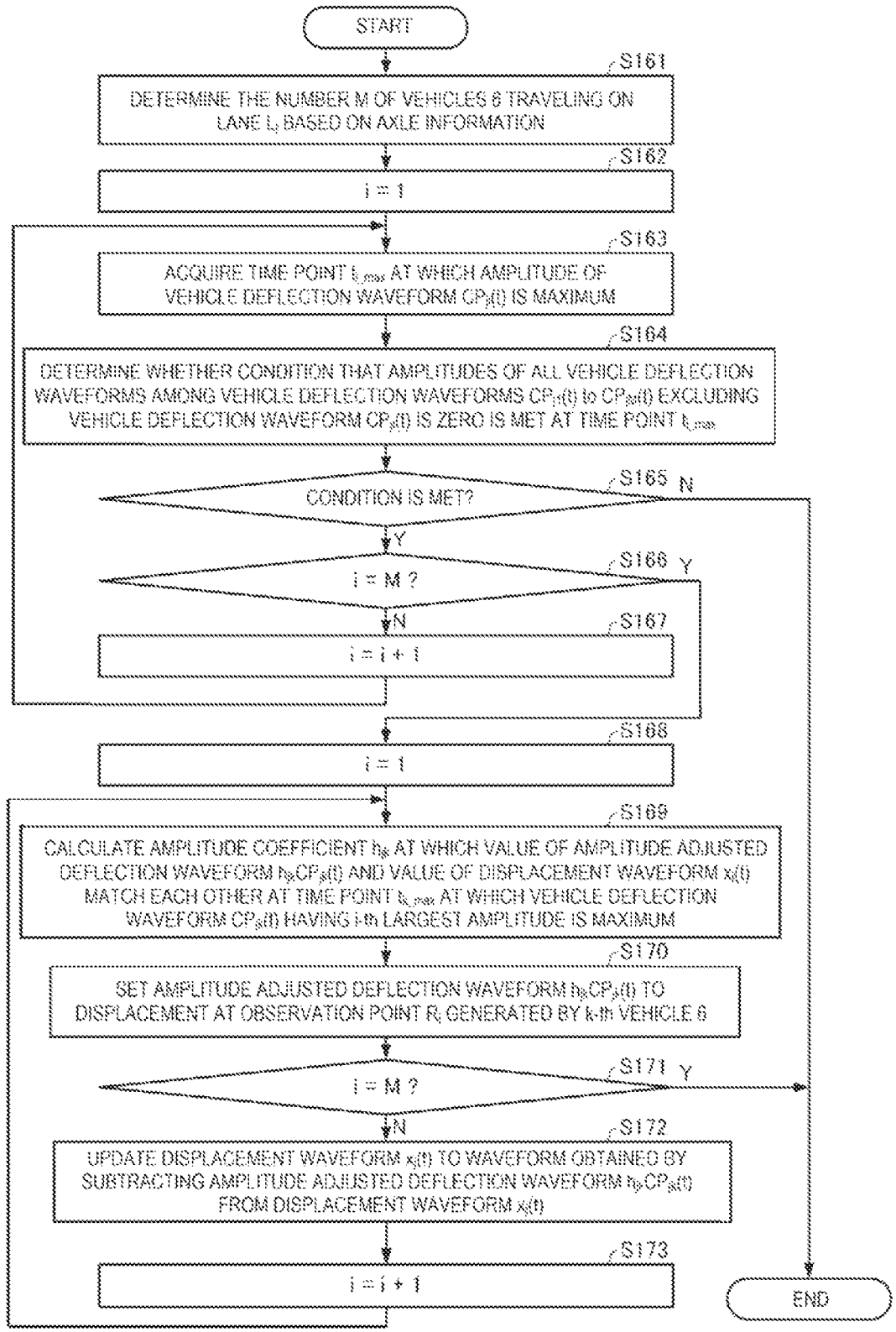
FIG. 26 is a flowchart showing an example of a procedure of an amplitude coefficient calculation step according to the first embodiment.

FIG. 26 is a flowchart showing an example of a procedure of the amplitude coefficient calculation step, which is step S6 in FIG. 24.

As shown in FIG. 26, first, the measurement device 1 determines the number M of the vehicle 6 traveling on the lane $L_j$ based on the axle information (step S161).

Next, the measurement device 1 sets the integer i to 1 (step S162), and acquires a time point $t_{i\_max}$ when the amplitude of the vehicle deflection waveform $CP_{ji}(t)$ is the maximum (step S163).

Next, the measurement device 1 determines whether a condition that amplitudes of all the vehicle deflection waveforms among the vehicle deflection waveforms $CP_{j1}(t)$ to $CP_{jM}(t)$ excluding the vehicle deflection waveform $CP_{ji}(t)$ are zero at the time point $t_{i\_max}$ is met (step S164).

When the measurement device 1 determines that the condition in step S164 is met (Y in step S165), but the integer i is not M (N in step S166), the measurement device 1 adds 1 to the integer i (step S167), and repeats the processing in steps S163 to S165.

Then, when the integer i is M (Y in step S166), the measurement device 1 sets the integer to 1 (step S168), and calculates the amplitude coefficient $h_{jk}$ at which the value of the amplitude adjusted deflection waveform $h_{jk}CP_{jk}(t)$ and the value of the displacement waveform $x_j(t)$ match each other at a time point $t_{k\_max}$ when a vehicle deflection waveform $CP_{jk}(t)$ having the i-th largest amplitude is maximum (step S169).

Next, the measurement device 1 sets the amplitude adjusted deflection waveform $h_{jk}CP_{jk}(t)$ to a displacement at the observation point $R_j$ generated by a k-th vehicle 6 (step S170).

Next, if the integer is not M (N in step S171), the measurement device 1 updates the displacement waveform $x_j(t)$ to a waveform obtained by subtracting the amplitude adjusted deflection waveform $h_{jk}CP_{jk}(t)$ from the displacement waveform $x_j(t)$ (step S172).

Next, the measurement device 1 adds 1 to the integer i (step S173), and repeats the processing in steps S169 to S172, and if the integer is M (N in step S171), the measurement device 1 ends the processing of the amplitude coefficient calculation step.

When the measurement device 1 determines that the condition in step S164 is not met (N in step S165), the measurement device 1 ends the processing of the amplitude coefficient calculation step without performing processing in step S166 and subsequent steps.

1-6 Configuration of Measurement Device

Figure 27:
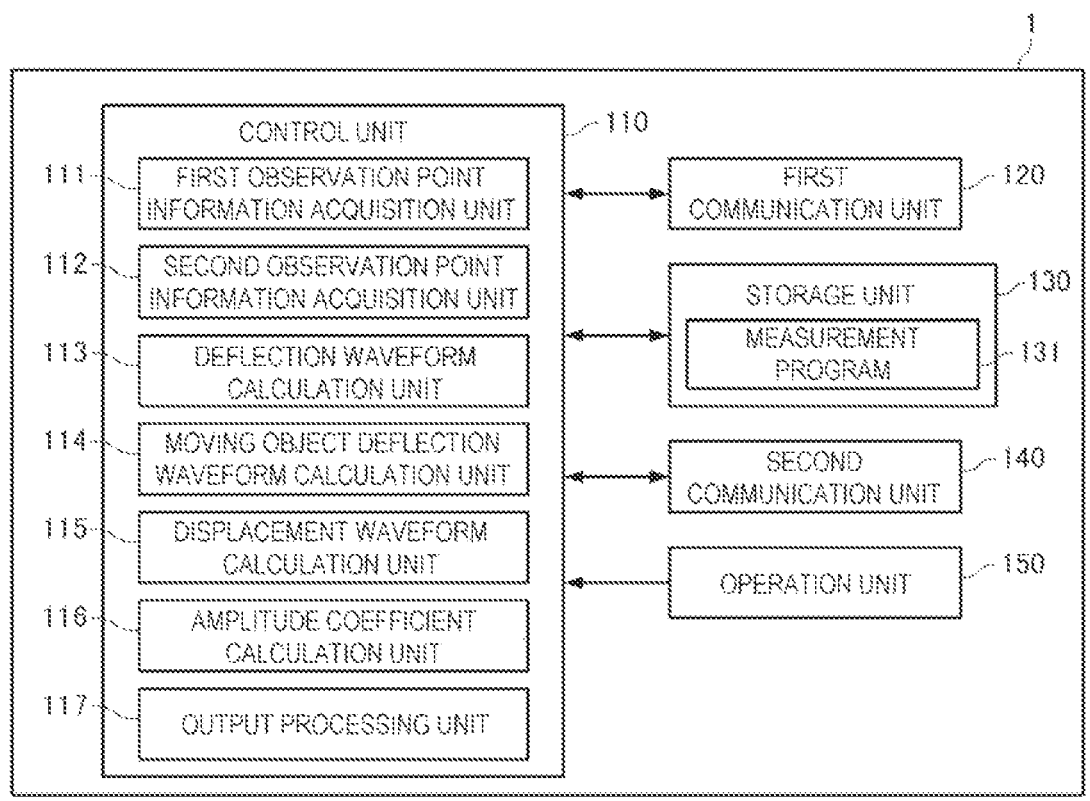
FIG. 27 is a diagram showing a configuration example of a measurement device.

FIG. 27 is a diagram showing a configuration example of the measurement device 1 according to the first embodiment. As shown in FIG. 27, the measurement device 1 includes a control unit 110, a first communication unit 120, a storage unit 130, a second communication unit 140, and an operation unit 150.

The control unit 110 calculates the time points when the vehicle 6 travels on the superstructure 7 or the displacement or the like of the superstructure 7 based on the acceleration data output from each of the sensors 21, 22 and 23 installed in the superstructure 7.

The first communication unit 120 receives the acceleration data from each of the sensors 21, 22, and 23. The acceleration data output from each of the sensors 21 and 22 is, for example, a digital signal. The first communication unit 120 outputs the acceleration data received from each of the sensors 21, 22, and 23 to the control unit 110.

The storage unit 130 is a memory that stores a program, data, and the like for the control unit 110 to perform calculation processing and control processing. In addition, the storage unit 130 stores a program, data, and the like for the control unit 110 to implement a predetermined application function. The storage unit 130 is constituted by, for example, various integrated circuit (IC) memories such as read only memory (ROM), flash ROM, and random access memory (RAM), and a recording medium such as a hard disk and a memory card.

The storage unit 130 includes a non-volatile information storage device that is a device or a medium that can be read by a computer. Various programs, data, and the like may be stored in the information storage device. The information storage device may be an optical disk such as an optical disk DVD or a CD, a hard disk drive, or various types of memory such as a card-type memory or a ROM. The control unit 110 may receive various programs, data, and the like via the communication network 4 and store the programs, the data, and the like in the storage unit 130.

The second communication unit 140 transmits information such as a calculation result of the control unit 110 to the server 2 via the communication network 4.

The operation unit 150 acquires operation data from the user and transmits the operation data to the control unit 110.

The control unit 110 includes a first observation point information acquisition unit 111, a second observation point information acquisition unit 112, a displacement waveform calculation unit 113, a moving object deflection waveform calculation unit 114, a displacement waveform calculation unit 115, an amplitude coefficient calculation unit 116, and an output processing unit 117.

For each integer j of 1 or more and N or less, and based on the observation information obtained by the sensor 21 that observes the observation point $P_j$, the first observation point information acquisition unit 111 performs processing of acquiring the first observation point information including the time point when each of the plurality of axles of each vehicle 6 passes the observation point $P_j$, and the acceleration intensity as the physical quantity which is the response to the action of each of the plurality of axles on the observation point $P_j$, when M vehicles 6 move consecutively along the lane $L_j$ of the superstructure 7. That is, the first observation point information acquisition unit 111 performs the processing of the first observation point information acquisition step in FIG. 24. The first observation point information acquired by the first observation point information acquisition unit 111 is stored in the storage unit 130.

Based on the observation information obtained by the sensor 22 that observes the observation point Q j, the second observation point information acquisition unit 112 performs processing of acquiring the second observation point information including the time point when each of the plurality of axles of the vehicle 6 passes the observation point $Q_j$, and the acceleration intensity as the physical quantity which is the response to the action of each of the plurality of axles on the observation point $Q_j$. That is, the second observation point information acquisition unit 112 performs the processing of the second observation point information acquisition step in FIG. 24. The second observation point information acquired by the second observation point information acquisition unit 112 is stored in the storage unit 130.

Based on the first observation point information acquired by the first observation point information acquisition unit 111, the second observation point information acquired by the second observation point information acquisition unit 112, the predetermined coefficient p, and the approximate expression of deflection of the superstructure 7 based on the structural model of the superstructure 7, the deflection waveform calculation unit 113 performs processing of calculating the deflection waveform $H_{jk}(t)$ of the superstructure 7 generated by each of the plurality of axles of the vehicle 6 traveling on the lane $L_j$. That is, the deflection waveform calculation unit 113 performs the processing of the deflection waveform calculation step in FIG. 24. The deflection waveforms $H_{jk}(t)$ calculated by the deflection waveform calculation unit 113 are stored in the storage unit 130. The predetermined coefficient p and the approximate expression of deflection of the superstructure 7 are stored in the storage unit 130 in advance.

The moving object deflection waveform calculation unit 114 performs processing of calculating the vehicle deflection waveform $CP_{jm}(t)$ by adding the deflection waveforms $H_{jk}(t)$ of the superstructure 7 generated by the plurality of axles of each vehicle 6, which are calculated by the deflection waveform calculation unit 113. That is, the moving object deflection waveform calculation unit 114 performs the processing of the moving object deflection waveform calculation step in FIG. 24. The vehicle deflection waveform $CP_{jm}(t)$ calculated by the moving object deflection waveform calculation unit 114 is stored in the storage unit 130.

Next, based on the observation information obtained by the sensor 23 that observes the observation point $R_j$, the displacement waveform calculation unit 115 performs processing of calculating the displacement waveform X (t) at the observation point $R_j$ when M vehicles 6 move consecutively along the lane $L_j$ of the superstructure 7. That is, the displacement waveform calculation unit 115 performs the processing of the displacement waveform calculation step in FIG. 24. The displacement waveform $x_j(t)$ calculated by the displacement waveform calculation unit 115 is stored in the storage unit 130.

The amplitude coefficient calculation unit 116 performs processing of calculating the amplitude coefficients $h_{j1}$ to $h_{jM}$ by assuming that the waveform obtained by multiplying the amplitude coefficient $h_{jm}$ by the vehicle deflection waveform $CP_{jm}(t)$ calculated by the moving object deflection waveform calculation unit 114 is the amplitude adjusted deflection waveform $h_{jm}CP_{jm}(t)$, and that the sum of the amplitude adjusted deflection waveforms $h_{j1}CP_{j1}(t)$ to $h_{jM}CP_{jM}(t)$ is approximated to the displacement waveform $x_j(t)$ at the observation point $R_j$ calculated by the displacement waveform calculation unit 115. That is, the amplitude coefficient calculation unit 116 performs the processing of the amplitude coefficient calculation step in FIG. 24. The amplitude coefficients $h_{j1}$ to $h_{jM}$ calculated by the amplitude coefficient calculation unit 116 are stored in the storage unit 130.

The output processing unit 117 performs processing of outputting, to the server 2 via the second communication unit 140, the displacement waveform $x_j(t)$ calculated by the displacement waveform calculation unit 115 and the amplitude adjusted deflection waveforms $h_{j1}CP_{j1}(t)$ to $h_{jM}CP_{jM}(t)$ calculated by the amplitude coefficient calculation unit 116. That is, the output processing unit 117 performs the processing of the output step in FIG. 24.

In the present embodiment, the control unit 110 is a processor that executes various programs stored in the storage unit 130. By executing a measurement program 131 stored in the storage unit 130, the control unit 110 implements each function of the first observation point information acquisition unit 111, the second observation point information acquisition unit 112, the deflection waveform calculation unit 113, the moving object deflection waveform calculation unit 114, the displacement waveform calculation unit 115, the amplitude coefficient calculation unit 116, and the output processing unit 117. In other words, the measurement program 131 is a program that causes the measurement device 1 which is a computer to execute the procedure in the flowchart shown in FIG. 24.

In the processor, for example, the function of each part may be implemented by individual hardware, or the functions of respective parts may be implemented by integrated hardware. For example, the processor may include hardware. The hardware may include at least one of a circuit for processing the digital signal and a circuit for processing an analog signal. The processor may be a central processing unit (CPU), a graphics processing unit (GPU), a digital signal processor (DSP), or the like. The control unit 110 is implemented as a custom integrated circuit (IC) such as an application specific integrated circuit (ASIC), and may implement the function of each part, or may implement the function of each part by the CPU and the ASIC.

1-7 Operation Effect

In the measurement method according to the first embodiment described above, the measurement device 1 acquires, based on the observation information obtained by each sensor 21 that observes the observation point P j, the first observation point information including the time point when each axle of the M vehicles 6 moving consecutively on the lane $L_j$ passes the observation point $P_j$ and the acceleration intensity. The measurement device 1 acquires, based on the observation information obtained by the sensor 22 that observes the observation point Q j, the second observation point information including the time point when each axle of the M vehicles 6 passes the observation point $Q_j$ and the acceleration intensity. Based on the first observation point information, the second observation point information, the predetermined coefficient p, and the approximate expression (39) of deflection of the superstructure 7 based on the structural model of the superstructure 7, the measurement device 1 calculates, according to Equation (44), the deflection waveform $H_{jk}(t)$ of the superstructure 7 generated by each axle of the M vehicles 6, and calculates the vehicle deflection waveform $CP_{jm}(t)$ by adding the deflection waveforms $H_{jk}(t)$. Next, based on observation information obtained by the sensor 23 that observes the observation point $R_j$, the measurement device 1 calculates the displacement waveform $x_j(t)$ at the observation point $R_j$. Then, the measurement device 1 calculates the amplitude coefficients $h_{j1}$ to $h_{jM}$ by assuming that the waveform obtained by multiplying the amplitude coefficient $h_{jm}$ by the vehicle deflection waveform $CP_{jm}(t)$ is the amplitude adjusted deflection waveform $h_{jm}CP_{jm}(t)$, and that the sum of the amplitude adjusted deflection waveforms $h_{j1}CP_{j1}(t)$ to $h_{jM}CP_{jM}(t)$ is approximated to the displacement waveform $x_j(t)$ at the observation point $R_j$. Therefore, the amplitude adjusted deflection waveform $h_{jm}CP_{jm}(t)$ is approximated to the displacement at the observation point $R_j$ generated by the m-th vehicle 6. According to the measurement method of the first embodiment, the measurement device 1 can separately calculate the displacements of the superstructure 7 generated by the plurality of vehicles 6 moving consecutively on the superstructure 7.

In the measurement method according to the first embodiment, when at a time point $t_{i\_max}$ when the amplitude of the vehicle deflection waveform $h_{ji}CP_{ji}(t)$ has the maximum value, the amplitudes of all the moving object deflection waveforms in the vehicle deflection waveforms $CP_{j1}(t)$ to $CP_{jM}(t)$ excluding the vehicle deflection waveform $h_{ji}CP_{ji}(t)$ are zero, the measurement device 1 calculates, according to Equation (47), amplitude coefficients $h_{j1}$ to $h_{jM}$ at which the amplitude adjusted deflection waveforms $h_{j1}CP_{j1}(t)$ to $h_{jM}CP_{jM}(t)$ are equal to the displacement waveform $x_j(t)$ at the time point $t_{i\_max}$. Therefore, according to the measurement method according to the first embodiment, since the measurement device 1 can calculate the amplitude coefficients $h_{j1}$ to $h_{jM}$ using the values of the vehicle deflection waveforms $CP_{j1}(t)$ to $CP_{jM}(t)$ and the displacement waveform $x_j(t)$ at the M time points $t_{i\_max}$ to $t_{M\_max}$, a required calculation amount is relatively small, and a processing load of the measurement device 1 is reduced.

According to the measurement method in the first embodiment, since the measurement device 1 can calculate the displacement of the superstructure 7 generated by the axle load of the vehicle 6 passing through the superstructure 7, sufficient information can be provided for maintenance and management of the bridge 5 to predict the damage of the superstructure 7.

2. Second Embodiment

A measurement method according to a second embodiment is different from the measurement method according to the first embodiment in processing of the amplitude coefficient calculation step executed by the measurement device 1. Hereinafter, the same components as those in the first embodiment will be denoted by the same reference numerals for the second embodiment, and the description repeated with the first embodiment will be omitted or simplified, and different contents from the first embodiment will be mainly described.

In the present embodiment, first, the measurement device 1 determines, at a time point $t_{i\_max}$ when the amplitude of the vehicle deflection waveform $CP_{ji}(t)$ has the maximum value for at least one integer i of 1 or more and M or less, whether a condition that an amplitude of at least one vehicle deflection waveform among all the vehicle deflection waveforms $CP_{j1}(t)$ to $CP_{jM}(t)$ excluding the vehicle deflection waveform $CP_{j1}(t)$ is zero is met.

Then, when the condition is met, the measurement device 1 calculates, according to Equation (49), the amplitude coefficients $h_{j1}$ to $h_{jM}$ at which the value of the amplitude adjusted deflection waveform $h_{j1}CP_{j1}(t)$ and the value of the displacement waveform $x_j(t)$ are approximated to each other at a time point $t_{i\_nz}$ when the amplitude of the vehicle deflection waveform $CP_{j1}(t)$ is not zero, and the amplitudes of all the vehicle deflection waveforms among the vehicle deflection waveforms $CP_{j1}(t)$ to $CP_{jM}(t)$ excluding the vehicle deflection waveform $CP_{j1}(t)$ are zero.

$$h_{ji} \approx \frac{x_j(t_{i\_nz})}{CP_{ji}(t_{i\_nz})} \tag{49}$$

Then, the measurement device 1 calculates, at a time point $t'_{i\_nz}$ when an amplitude of a vehicle deflection waveform $CP_{ji}(t)$ is not zero, and amplitudes of all the vehicle deflection waveforms among the vehicle deflection waveforms $CP_{j1}(t)$ to $CP_{jM}(t)$ excluding the vehicle deflection waveform $CP_{ji}(t)$ are zero, an amplitude coefficients $h_{j1}$ at which a value of an amplitude adjusted deflection waveform $h_{ji}CP_{ji}(t)$ and a value of a displacement waveform $x'_j(t)$ obtained by subtracting the amplitude adjusted deflection waveform $h_{ji}CP_{ji}(t)$ from the displacement waveform $x_j(t)$ are approximated to each other. The measurement device 1 repeats the similar calculation to calculate all the amplitude coefficients $h_{j1}$ to $h_{jM}$.

As a result, at the time point $t_{i\_nz}$, a sum of the amplitude adjusted deflection waveforms $h_{j1}CP_{j1}(t)$ to $h_{jM}CP_{jM}(t)$ are substantially equal to the displacement waveform $x_j(t)$ at the observation point $R_j$ for a certain integer i of 1 or more and M or less, as shown in Equation (50). The time point $t_{i\_max}$ is an example of the "i-th time point".

$$x_j(t_{i\_nz}) \approx \sum_{m=1}^{M} h_{jm}CP_{jm}(t_{i\_nz}) \tag{50}$$

In order to improve an approximation accuracy between the sum of the amplitude adjusted deflection waveforms $h_{j1}CP_{j1}(t)$ to $h_{jM}CP_{jM}(t)$ and the displacement waveform $x_j(t)$ at the observation point $R_j$, it is desirable that the time point $t_{i\_nz}$ is a time point when, in a period when amplitudes of all the vehicle deflection waveforms among the vehicle deflection waveforms $CP_{j1}(t)$ to $CP_{jM}(t)$ excluding the vehicle deflection waveform $CP_{j1}(t)$ are zero, the amplitude of the vehicle deflection waveform $CP_{j1}(t)$ is as large as possible. For example, the time point $t_{i\_nz}$ may be a time point when, in a period when amplitudes of all vehicle deflection waveforms excluding the vehicle deflection waveform $CP_{ji}(t)$ are zero, the amplitude of the vehicle deflection waveform $CP_{ji}(t)$ has the maximum value.

As an example, in the case of the arrangement example shown in FIGS. 7 and 9, a procedure of calculating the amplitude coefficients $h_{21}$ and $h_{22}$ by the measurement device 1 when two vehicles 6 move consecutively along the lane $L_2$ will be described.

Figure 28:
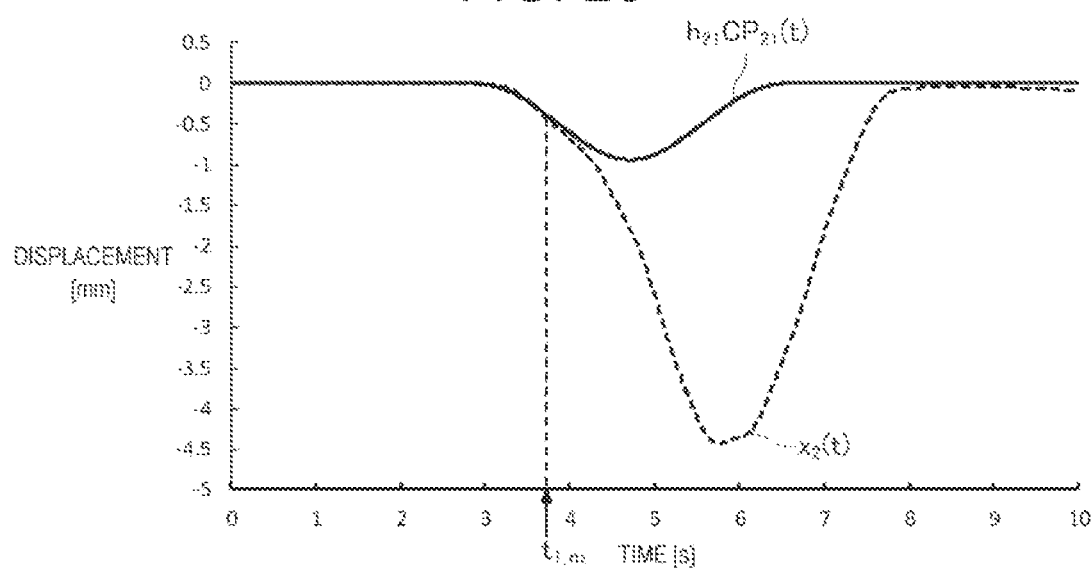
FIG. 28 is a diagram showing an example of an amplitude adjusted deflection waveform calculated according to a second embodiment.

First, the measurement device 1 calculates the amplitude coefficient $h_{21}$ at which the value of the amplitude adjusted deflection waveform $h_{21}CP_{21}(t)$ and the value of the displacement waveform $x_2(t)$ match each other at a time point $t_{1\_nz}$ when the amplitude of the vehicle deflection waveform $CP_{21}(t)$ is not zero, and the amplitude of the vehicle deflection waveform $CP_{22}(t)$ is zero. FIG. 28 shows, by a solid line, an example of the amplitude adjusted deflection waveform $h_{21}CP_{21}(t)$ obtained by multiplying the calculated amplitude coefficient $h_{21}$ and the vehicle deflection waveform $CP_{21}(t)$. In FIG. 28, a horizontal axis represents time and a vertical axis represents a displacement. In FIG. 28, the displacement waveform $x_2(t)$ is shown by a broken line.

Figure 29:
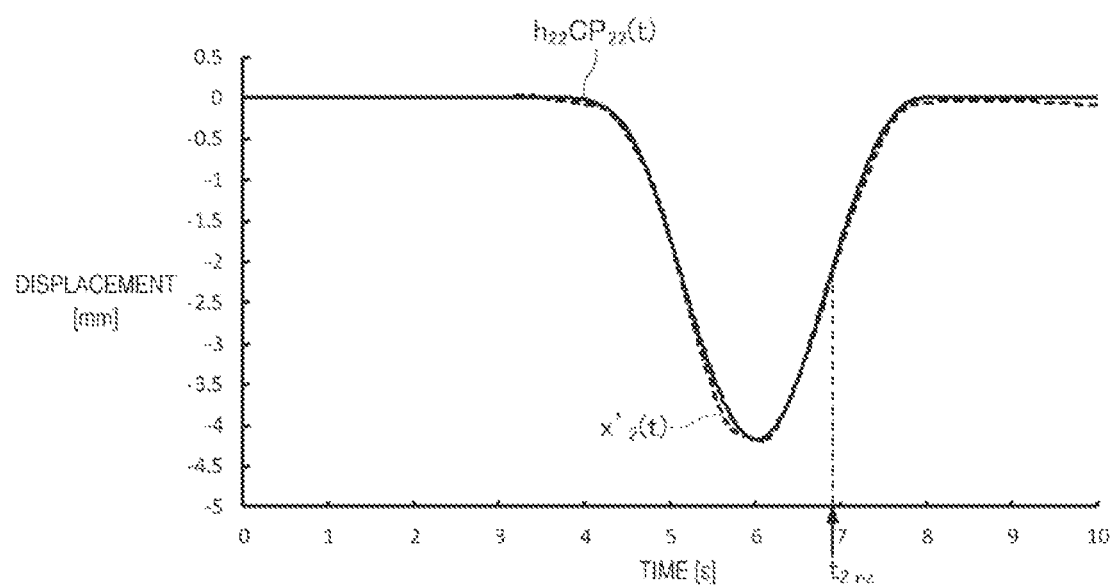
FIG. 29 is a diagram showing an example of an amplitude adjusted deflection waveform according to the second embodiment.

Then, the measurement device 1 calculates the amplitude coefficient $h_{22}$ at which the value of the amplitude adjusted deflection waveform $h_{22}CP_{22}(t)$ and a value of a displacement waveform $x'_2(t)$ obtained by subtracting the amplitude adjusted deflection waveform $h_{21}CP_{21}(t)$ from the displacement waveform $x_2(t)$ match each other at a time point $t_{2\_nz}$ when the amplitude of the vehicle deflection waveform $CP_{22}(t)$ is not zero, and the amplitude of the vehicle deflection waveform $CP_{21}(t)$ is zero. FIG. 29 shows, by a solid line, an example of the amplitude adjusted deflection waveform $h_{22}CP_{22}(t)$ obtained by multiplying the calculated amplitude coefficient $h_{22}$ and the vehicle deflection waveform $CP_{22}(t)$. In FIG. 29, a horizontal axis represents time and a vertical axis represents a displacement. In FIG. 29, the displacement waveform $x'_2(t)$ is shown by a broken line.

Figure 30:
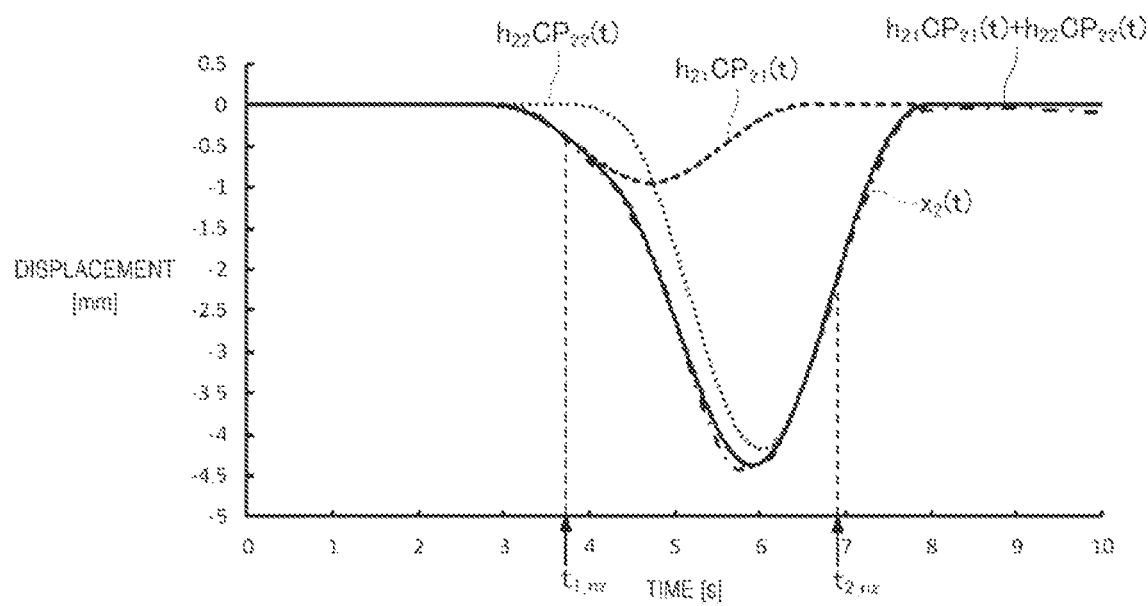
FIG. 30 is a diagram showing an example of a sum of two amplitude adjusted deflection waveforms.

In FIG. 30, a sum of the amplitude adjusted deflection waveform $h_{21}CP_{21}(t)$ and the amplitude adjusted deflection waveform $h_{22}CP_{22}(t)$ is shown by a solid line. In FIG. 30, a horizontal axis represents time and a vertical axis represents a displacement. In FIG. 30, the amplitude adjusted deflection waveform $h_{21}CP_{21}(t)$ is shown by a broken line, the amplitude adjusted deflection waveform $h_{22}CP_{22}(t)$ is shown by a dot line, and the displacement waveform $x_2(t)$ is shown by a one-dot chain line. As shown in FIG. 30, the sum of the amplitude adjusted deflection waveform $h_{21}CP_{21}(t)$ and the amplitude adjusted deflection waveform $h_{22}CP_{22}(t)$ and the displacement waveform $x_2(t)$ are well approximated, and Equation (46) is established. Therefore, it can be said that the displacement waveform at the observation point $R_2$ generated by the vehicle 6 when m=1 is modeled by the amplitude adjusted deflection waveform $h_{21}CP_{21}(t)$, and the displacement waveform at the observation point $R_2$ generated by the vehicle 6 when m=2 is modeled by the amplitude adjusted deflection waveform $h_{22}CP_{22}(t)$. As described above, the measurement device 1 can distinguishably calculate, according to the amplitude adjusted deflection waveforms $h_{21}CP_{21}(t)$ and $h_{22}CP_{22}(t)$, the displacements at the observation point $R_2$ due to traveling of the vehicles 6 along the lane $L_2$.

Figure 31:
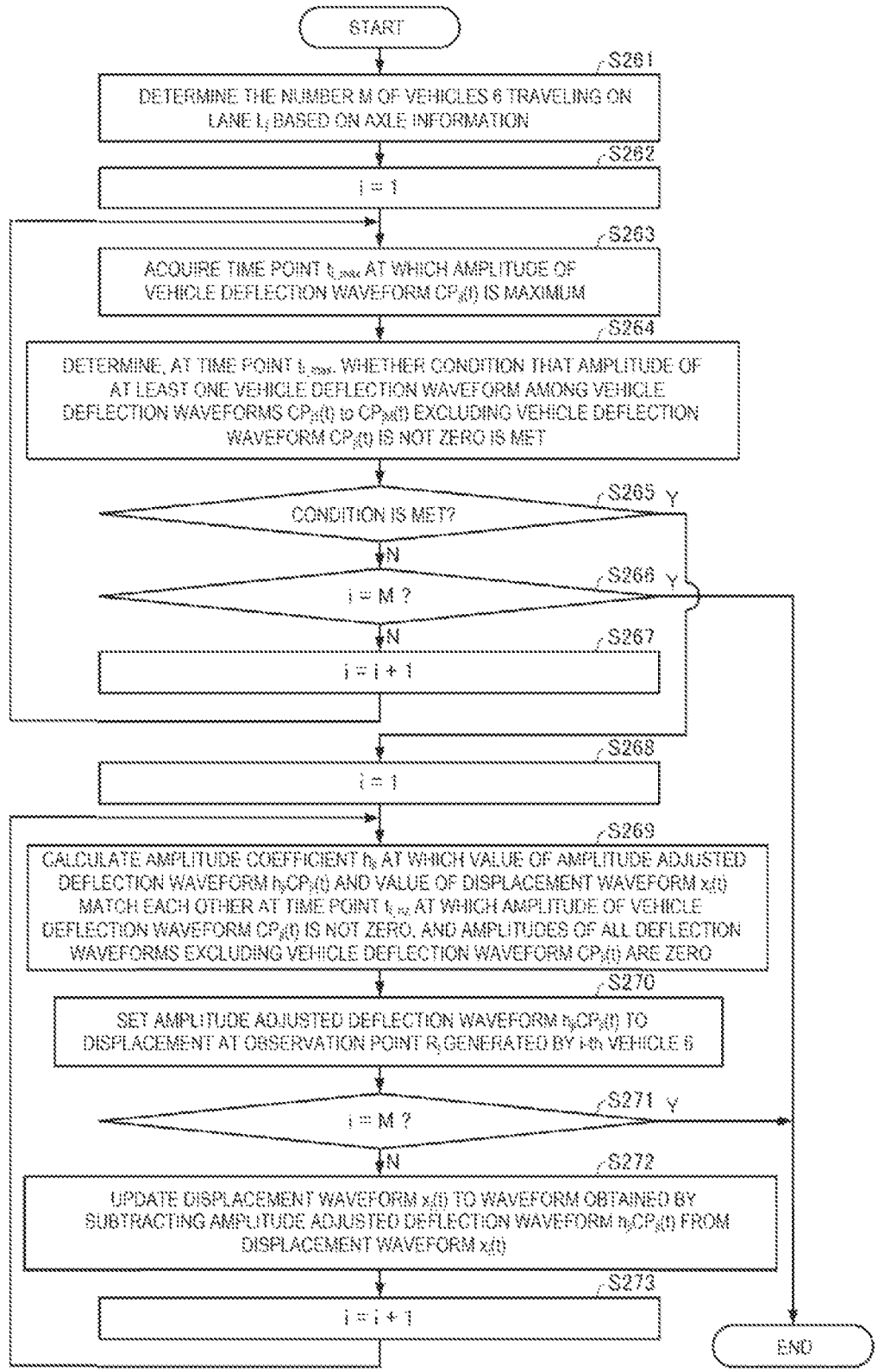
FIG. 31 is a flowchart showing an example of a procedure of an amplitude coefficient calculation step according to the second embodiment.

The measurement method according to the second embodiment is different from that according to the first embodiment in the procedure of the amplitude coefficient calculation step, which is step S6 in FIG. 24. FIG. 31 is a flowchart showing an example of a procedure of the amplitude coefficient calculation step, which is step S6 in FIG. 24.

As shown in FIG. 31, first, the measurement device 1 determines the number M of the vehicles 6 traveling on the lane $L_j$ based on the axle information (step S261).

Next, the measurement device 1 sets the integer i to 1 (step S262), and acquires a time point $t_{i\_max}$ when the amplitude of the vehicle deflection waveform $CP_{ji}(t)$ is the maximum (step S263).

Next, the measurement device 1 determines whether a condition that an amplitude of at least one vehicle deflection waveform among the vehicle deflection waveforms $CP_{j1}(t)$ to $CP_{jM}(t)$ excluding the vehicle deflection waveform $CP_{ji}(t)$ is not zero at the time point $t_{i\_max}$ is met (step S264).

When the measurement device 1 determines that the condition in step S164 is not met (N in step S265), and the integer i is not M (N in step S266), the measurement device 1 adds 1 to the integer i (step S267), and repeats the processing in steps S263 to S265.

Then, when the integer i is M (Y in step S266), the measurement device 1 ends the processing of the amplitude coefficient calculation step.

On the other hand, when it is determined that the condition in S164 is met (Y in step S265), the measurement device 1 sets the integer i to 1 (step S268), and calculates the amplitude coefficient $h_{ji}$ at which the value of the amplitude adjusted deflection waveform $h_{ji}CP_{ji}(t)$ and the value of the displacement waveform $x_j(t)$ match each other at a time point $t_{i\_nz}$ when the amplitude of the vehicle deflection waveform $CP_{ji}(t)$ is not zero, and the amplitudes of all deflection waveforms among the vehicle deflection waveforms $CP_{j1}(t)$ to $CP_{jN}(t)$ excluding the vehicle deflection waveform $CP_{ji}(t)$ are zero (step S269).

Next, the measurement device 1 sets the amplitude adjusted deflection waveform $h_{ji}CP_{ji}(t)$ to a displacement at the observation point $R_j$ generated by the i-th vehicle 6 (step S270).

Next, if the integer is not M (N in step S271), the measurement device 1 updates the displacement waveform $x_j(t)$ to a waveform obtained by subtracting the amplitude adjusted deflection waveform $h_{ji}CP_{ji}(t)$ from the displacement waveform $x_j(t)$ (step S272).

Next, the measurement device 1 adds 1 to the integer i (step S273), and repeats the processing in steps S269 to S272, and if the integer is M (Y in step S271), the measurement device 1 ends the processing of the amplitude coefficient calculation step.

According to the measurement method of the second embodiment described above, as in the first embodiment, the measurement device 1 can separately calculate the displacements of the superstructure 7 generated by the plurality of vehicles 6 moving consecutively on the superstructure 7.

In the measurement method according to the second embodiment, when at a time point $t_{i\_max}$ when the amplitude of the vehicle deflection waveform $CP_{ji}(t)$ is the maximum value, an amplitude of at least one vehicle deflection waveform among the vehicle deflection waveforms $CP_{j1}(t)$ to $CP_{jM}(t)$ excluding vehicle deflection waveform $CP_{ji}(t)$ is not zero, the measurement device 1 calculates, according to Equation (49), the amplitude coefficients $h_{j1}$ to $h_{jM}$ at which the value of the amplitude adjusted deflection waveform $h_{ji}CP_{ji}(t)$ and the value of the displacement waveform $x_j(t)$ match each other at the time $t_{i\_nz}$ when the amplitude of the vehicle deflection waveform $CP_{ji}(t)$ is not zero, and the amplitudes of all vehicle deflection waveforms among the vehicle deflection waveforms $CP_{j1}(t)$ to $CP_{jM}(t)$ excluding the vehicle deflection waveform $CP_{ji}(t)$ are zero. Therefore, according to the measurement method according to the second embodiment, since the amplitude coefficients $h_{j1}$ to $h_{jM}$ can be calculated by using the values of the vehicle deflection waveforms $CP_{j1}(t)$ to $CP_{jM}(t)$ and the displacement waveform $x_j(t)$ at the M time points $t_{i\_nz}$ to $t_{M\_nz}$, a required calculation amount is relatively small, and a processing load of the measurement device 1 is reduced.

3. Third Embodiment

A measurement method according to a third embodiment is different from the measurement method according to the first embodiment or the second embodiment in processing of the amplitude coefficient calculation step executed by the measurement device 1. Hereinafter, in the third embodiment, the same components as those in the first embodiment or the second embodiment will be denoted by the same reference numerals, repetitive description as that in the first embodiment or the second embodiment will be omitted or simplified, and contents different from those in the first embodiment and the second embodiment will be mainly described.

In the third embodiment, the measurement device 1 calculates the amplitude coefficients $h_{j1}$ to $h_{jM}$ at which a sum of the amplitude adjusted deflection waveforms $h_{j1}CP_{j1}(t)$ to $h_{jM}CP_{jM}(t)$ is substantially equal to the displacement waveform $x_j(t)$ at the observation point $R_j$ at M time points $t_1$ to $t_M$ at which at least one of the amplitudes of the vehicle deflection waveforms $CP_{j1}(t)$ to $CP_{jM}(t)$ relating to the M vehicles 6 traveling consecutively on the lane $L_j$ is not zero.

At the time points $t_i$ to $t_M$, since a sum of the amplitude adjusted deflection waveforms $h_{j1}CP_{j1}(t)$ to $h_{jM}CP_{jM}(t)$ are substantially equal to the displacement waveform $x_j(t)$ at the observation point $R_j$, Equation (51) is established.

$$\begin{pmatrix} x_j(t_1) \\ x_j(t_2) \\ \vdots \\ x_j(t_M) \end{pmatrix} = \begin{pmatrix} CP_{j1}(t_1) & CP_{j2}(t_1) & \cdots & CP_{jM}(t_1) \\ CP_{j1}(t_2) & CP_{j2}(t_2) & \cdots & CP_{jM}(t_2) \\ \vdots & \vdots & \ddots & \vdots \\ CP_{j1}(t_M) & CP_{j2}(t_M) & \cdots & CP_{jM}(t_M) \end{pmatrix} \begin{pmatrix} h_{j1} \\ h_{j2} \\ \vdots \\ h_{jM} \end{pmatrix} \quad (51)$$

The amplitude coefficients $h_{j1}$ to $h_jM$ are obtained by Equation (52) transformed from Equation (51).

$$\begin{pmatrix} h_{j1} \\ h_{j2} \\ \vdots \\ h_{jM} \end{pmatrix} = \begin{pmatrix} CP_{j1}(t_1) & CP_{j2}(t_1) & \cdots & CP_{jM}(t_1) \\ CP_{j1}(t_2) & CP_{j2}(t_2) & \cdots & CP_{jM}(t_2) \\ \vdots & \vdots & \ddots & \vdots \\ CP_{j1}(t_M) & CP_{j2}(t_M) & \cdots & CP_{jM}(t_M) \end{pmatrix}^{-1} \begin{pmatrix} x_j(t_1) \\ x_j(t_2) \\ \vdots \\ x_j(t_M) \end{pmatrix} \quad (52)$$

As an example, in the case of the arrangement example shown in FIGS. 7 and 9, the amplitude coefficients $h_{11}$ and $h_{12}$ are obtained according to Equation (53) when two vehicles 6 move consecutively along the lane $L_1$. The time points $t_1$ and $t_2$ are any two time points when both amplitudes of the vehicle deflection waveforms $CP_{11}(t)$ t and $CP_{12}(t)$ are not zero.

$$\begin{pmatrix} h_{11} \\ h_{12} \end{pmatrix} = \begin{pmatrix} CP_{11}(t_1) & CP_{12}(t_1) \\ CP_{11}(t_2) & CP_{12}(t_2) \end{pmatrix}^{-1} \begin{pmatrix} x_1(t_1) \\ x_1(t_2) \end{pmatrix} \quad (53)$$

According to Equation (53), the amplitude coefficients $h_{11}$ and $h_{12}$ are calculated according to Equation (54) and Equation (55), respectively.

$$h_{11} = \frac{CP_{12}(t_2)x_1(t_1) - CP_{12}(t_1)x_1(t_2)}{CP_{11}(t_1)CP_{12}(t_2) - CP_{12}(t_1)CP_{11}(t_2)} \quad (54)$$

$$h_{12} = \frac{-CP_{11}(t_2)x_1(t_1) + CP_{11}(t_1)x_1(t_2)}{CP_{11}(t_1)CP_{12}(t_2) - CP_{12}(t_1)CP_{11}(t_2)} \quad (55)$$

If $CP_{11}(t_i)=CP_{12}(t_i)=0$ or $CP_{11}(t_2)=CP_{12}(t_2)=0$, denominators of Equations (54) and (55) are both zero, and the calculation is impossible. Therefore, the selected time points $t_1$ and $t_2$ are time points when at least one of the amplitudes of the vehicle deflection waveforms $CP_{11}(t)$ and $CP_{12}(t)$ is not zero.

In order to reduce a calculation error of the amplitude coefficient $h_{j1}$ to $h_{jM}$ caused by Equation (52), and increase a similarity between the sum of the amplitude adjusted deflection waveforms $h_{j1}CP_{j1}(t)$ to $h_{jM}CP_{jM}(t)$ and the displacement waveform $x_j(t)$ at the observation point $R_j$, it is desirable to choose time points $t_1$ to $t_M$ when the amplitudes of the vehicle deflection waveforms $CP_{j1}(t)$ to $CP_{jM}(t)$ increase. For example, the measurement device 1 may select M time points when the amplitudes of the vehicle deflection waveforms $CP_{j1}(t)$ to $CP_{jM}(t)$ are maximum as the time points $t_1$ to $t_M$.

Figure 32:
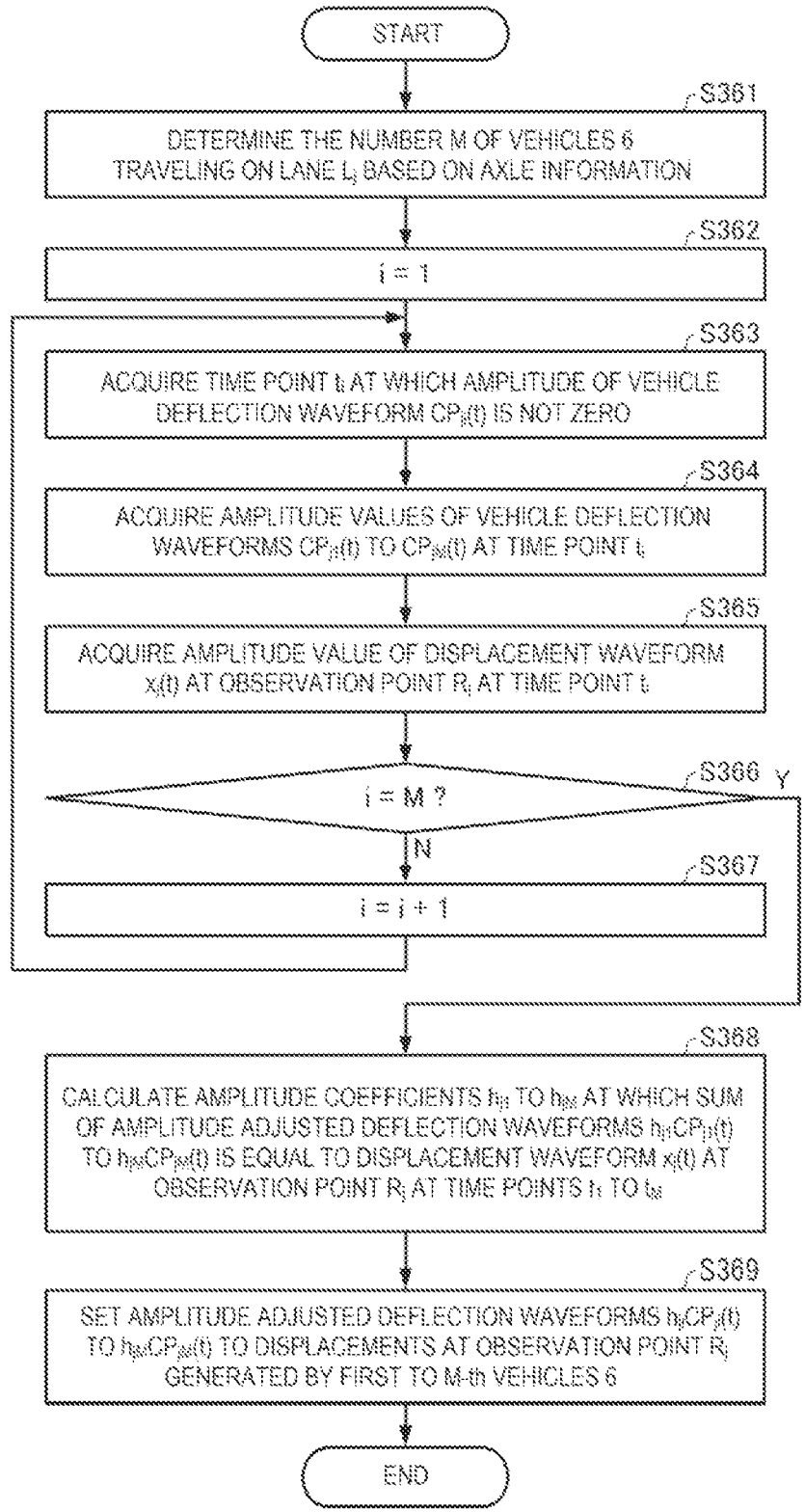
FIG. 32 is a flowchart showing an example of a procedure of an amplitude coefficient calculation step according to a third embodiment.

The measurement method according to the third embodiment is different from that according to the first embodiment or the second embodiment in the procedure of the amplitude coefficient calculation step, which is step S6 in FIG. 24. FIG. 32 is a flowchart showing an example of a procedure of the amplitude coefficient calculation step, which is step S6 in FIG. 24.

As shown in FIG. 32, first, the measurement device 1 determines the number M of the vehicles 6 traveling on the lane $L_j$ based on the axle information (step S361).

Next, the measurement device 1 sets the integer i to 1 (step S362), and acquires a time point $t_i$ when the amplitude of the vehicle deflection waveform $CP_{ji}(t)$ is not zero (step S363). For example, the time point $t_1$ is a time point when the amplitude of the vehicle deflection waveform $CP_{ji}(t)$ has the maximum.

Next, the measurement device 1 acquires amplitude values of the vehicle deflection waveforms $CP_{j1}(t)$ to $CP_{jM}(t)$ at the time point $t_1$ (step S364).

Next, the measurement device 1 acquires an amplitude value of the displacement waveform $x_j(t)$ at the observation point $R_j$ at the time point $t_1$ (step S365).

When the integer i is not M (N in step S366), the measurement device 1 adds 1 to the integer i (step S367), and repeats the processing in steps S363 to S365.

Then, when the integer i is M (Y in step S366), the measurement device 1 calculates the amplitude coefficients $h_{j1}$ to $h_{jM}$ at which the sum of the amplitude adjusted deflection waveforms $h_{j1}CP_{j1}(t)$ to $h_{jM}CP_{jM}(t)$ is equal to the displacement waveform $x_j(t)$ at the observation point $R_j$ at the time points $t_i$ to $t_M$ acquired in step S363 (step S368). Specifically, the measurement device 1 substitutes the amplitude values of the vehicle deflection waveforms $CP_{j1}(t)$ to $CP_{jM}(t)$ at each of the time points $t_i$ to $t_M$ acquired in step S364 and the amplitude value of the displacement waveform $x_j(t)$ at each of the time points $t_i$ to $t_M$ acquired in step S365 into Equation (52) to calculate the amplitude coefficients $h_{j1}$ to $h_{jM}$.

Finally, the measurement device 1 sets the amplitude adjusted deflection waveforms $h_{ji}CP_{ji}(t)$ to $h_{jM}CP_{jM}(t)$ to the displacements at the observation point $R_j$ generated by the first to M-th vehicles 6 (step S369), and ends the processing of the amplitude coefficient calculation step.

According to the measurement method of the third embodiment described above, as in the first embodiment, the measurement device 1 can separately calculate the displacements of the superstructure 7 generated by the plurality of vehicles 6 moving consecutively on the superstructure 7.

In the measurement method according to the third embodiment, the measurement device 1 calculates, according to Equation (52), the amplitude coefficients $h_{j1}$ to $h_jM$ when the sum of the amplitude adjusted deflection waveforms $h_{j1}CP_{j1}(t)$ to $h_{jM}CP_{jM}(t)$ is equal to the displacement waveform $x_j(t)$ at the observation point $R_j$ at M time points $t_i$ to $t_M$ at which at least one of the amplitudes of the vehicle deflection waveforms $CP_{j1}(t)$ to $CP_{jM}(t)$ is not zero. Therefore, according to the measurement method according to the third embodiment, since the amplitude coefficients $h_{j1}$ to $h_jM$ can be calculated by using the values of the vehicle deflection waveforms $CP_{j1}(t)$ to $CP_{jM}(t)$ and the displacement waveform $x_j(t)$ at the M time points $t_{1z}$ to $t_M$, a required calculation amount is relatively small, and a processing load of the measurement device 1 is reduced. Further, according to the measurement method according to the third embodiment, since a degree of freedom in selecting M time points $t_{1z}$ to $t_M$ by the measurement device 1 is high, the amplitude coefficients $h_{j1}$ to $h_{jM}$ can be calculated without being affected by a traveling interval of the M vehicles 6.

4. Fourth Embodiment

A measurement method according to a fourth embodiment is different from the measurement method according to the first embodiment, the second embodiment or the third embodiment in processing of the amplitude coefficient calculation step executed by the measurement device 1. Hereinafter, in the fourth embodiment, the same components as those in the first embodiment, the second embodiment or the third embodiment will be denoted by the same reference numerals, repetitive description as that in the first embodiment, the second embodiment or the third embodiment will be omitted or simplified, and contents different from those in the first embodiment, the second embodiment and the third embodiment will be mainly described.

In the fourth embodiment, the measurement device 1 calculates, by the least square method, the amplitude coefficients $h_{j1}$ to $h_{jM}$ such that a difference between the sum of the amplitude adjusted deflection waveforms $h_{j1}CP_{j1}(t)$ to $h_{jM}CP_{jM}(t)$ and the displacement waveform $x_j(t)$ at the observation point $R_j$ relating to the M vehicles 6 traveling consecutively on the lane $L_j$ is minimized.

Since an error e(t) which is a difference between the sum of the amplitude adjusted deflection waveforms $h_{j1}CP_{j1}(t)$ to $h_{jM}CP_{jM}(t)$ and the displacement waveform $x_j(t)$ at the observation point $R_j$ is expressed by Equation (56), the measurement device 1 calculates, by the least square method, the amplitude coefficients $h_{j1}$ to $h_{jM}$ such that the error e(t) is minimized.

$$e(t) = x_j(t) - \sum_{i=1}^{M} h_{ji} CP_{ji}(t) \tag{56}$$

As an example, in the case of the arrangement example shown in FIGS. 7 and 9, a procedure of calculating the amplitude coefficients $h_{11}$ and $h_{12}$ when two vehicles 6 move consecutively along the lane $L_1$ will be described.

Since j=1 and M=2, Equation (56) becomes Equation (57).

$$e(t) = x_1(t) - \{h_{11}CP_{11}(t) + h_{12}CP_{12}(t)\} \tag{57}$$

Equation (58) is obtained by squaring both sides of Equation (57).

$$e(t)^2 = \{x_1(t) - h_{11}CP_{11}(t) - h_{12}CP_{12}(t)\}^2 \tag{58}$$

The Equation (58) is partially differentiated by the amplitude coefficients $h_{11}$ and $h_{12}$, respectively, and the obtained differential equations are set into a simultaneous equation as Equation (59).

$$\begin{pmatrix} CP_{11}(t)^2 & CP_{11}(t)CP_{12}(t) \\ CP_{11}(t)CP_{12}(t) & CP_{12}(t)^2 \end{pmatrix} \begin{pmatrix} h_{11} \\ h_{12} \end{pmatrix} = \begin{pmatrix} CP_{11}(t)x_1(t) \\ CP_{12}(t)x_1(t) \end{pmatrix} \tag{59}$$

Equation (60) is obtained by replacing terms of Equation (59) with integrated values at time points $t_1$ to $t_n$.

$$\begin{pmatrix} \sum_{i=1}^{n} CP_{11}(t_i)^2 & \sum_{i=1}^{n} CP_{11}(t_i)CP_{12}(t_i) \\ \sum_{i=1}^{n} CP_{11}(t_i)CP_{12}(t_i) & \sum_{i=1}^{n} CP_{12}(t_i)^2 \end{pmatrix} \begin{pmatrix} h_{11} \\ h_{12} \end{pmatrix} = \begin{pmatrix} \sum_{i=1}^{n} CP_{11}(t_i)x_1(t_i) \\ \sum_{i=1}^{n} CP_{12}(t_i)x_1(t_i) \end{pmatrix} \tag{60}$$

When each term of Equation (60) is replaced as shown in Equation (61), and $a$ and $d$ are obtained by a sweeping method, Equations (62) and (63) are obtained.

$$\begin{pmatrix} A & B \\ B & C \end{pmatrix} \begin{pmatrix} a \\ d \end{pmatrix} = \begin{pmatrix} D \\ E \end{pmatrix} \tag{61}$$

$$a = \frac{\dfrac{D}{B} - \dfrac{E}{C}}{\dfrac{A}{B} - \dfrac{B}{C}} = \frac{CD - BE}{AC - B^2} \tag{62}$$

$$d = \frac{E - Ba}{C} \tag{63}$$

According to Equation (62) and Equation (63), the amplitude coefficients $h_{11}$ and $h_{12}$ are calculated as Equation (64) and Equation (65), respectively.

$$h_{11} = \frac{\sum_{i=1}^{n} CP_{12}(t_i)^2 \sum_{i=1}^{n} CP_{11}(t_i)x_1(t_i) - \sum_{i=1}^{n} CP_{11}(t_i)CP_{12}(t_i) \sum_{i=1}^{n} CP_{12}(t_i)x_1(t_i)}{\sum_{i=1}^{n} CP_{11}(t_i)^2 \sum_{i=1}^{n} CP_{12}(t_i)^2 - \left(\sum_{i=1}^{n} CP_{11}(t_i)CP_{12}(t_i)\right)^2} \tag{64}$$

$$h_{12} = \frac{\sum_{i=1}^{n} CP_{12}(t_i)x_1(t_i) - \sum_{i=1}^{n} CP_{11}(t_i)CP_{12}(t_i)}{\sum_{i=1}^{n} CP_{12}(t_i)^2} \tag{65}$$

Generally, the amplitude coefficients $h_{j1}$ to $h_{jM}$ when the M vehicles 6 travel consecutively on the lane $L_j$ are obtained as shown in Equation (66).

$$\begin{pmatrix} h_{j1} \\ h_{j2} \\ \vdots \\ h_{jM-1} \\ h_{jM} \end{pmatrix} = \begin{pmatrix} \sum_{i=1}^{n} CP_{j1}(t_i)^2 & \sum_{i=1}^{n} CP_{j1}(t_i)CP_{j2}(t_i) & \cdots & \sum_{i=1}^{n} CP_{j1}(t_i)CP_{jM-1}(t_i) & \sum_{i=1}^{n} CP_{j1}(t_i)CP_{jM}(t_i) \\ \sum_{i=1}^{n} CP_{j2}(t_i)CP_{j1}(t_i) & \sum_{i=1}^{n} CP_{j2}(t_i)^2 & \cdots & \sum_{i=1}^{n} CP_{j2}(t_i)CP_{jM-1}(t_i) & \sum_{i=1}^{n} CP_{j2}(t_i)CP_{jM}(t_i) \\ \vdots & & \ddots & & \vdots \\ \sum_{i=1}^{n} CP_{jM-1}(t_i)CP_{j1}(t_i) & \sum_{i=1}^{n} CP_{jM-1}(t_i)CP_{j2}(t_i) & \cdots & \sum_{i=1}^{n} CP_{jM-1}(t_i)^2 & \sum_{i=1}^{n} CP_{jM-1}(t_i)CP_{jM}(t_i) \\ \sum_{i=1}^{n} CP_{jM}(t_i)CP_{j1}(t_i) & \sum_{i=1}^{n} CP_{jM}(t_i)CP_{j2}(t_i) & \cdots & \sum_{i=1}^{n} CP_{jM}(t_i)CP_{jM-1}(t_i) & \sum_{i=1}^{n} CP_{jM}(t_i)^2 \end{pmatrix}^{-1} \begin{pmatrix} \sum_{i=1}^{n} CP_{j1}(t_i)x_j(t_i) \\ \sum_{i=1}^{n} CP_{j2}(t_2)x_j(t_i) \\ \vdots \\ \sum_{i=1}^{n} CP_{jM-1}(t_i)x_j(t_i) \\ \sum_{i=1}^{n} CP_{jM}(t_i)x_j(t_i) \end{pmatrix} \tag{66}$$

Figure 33:
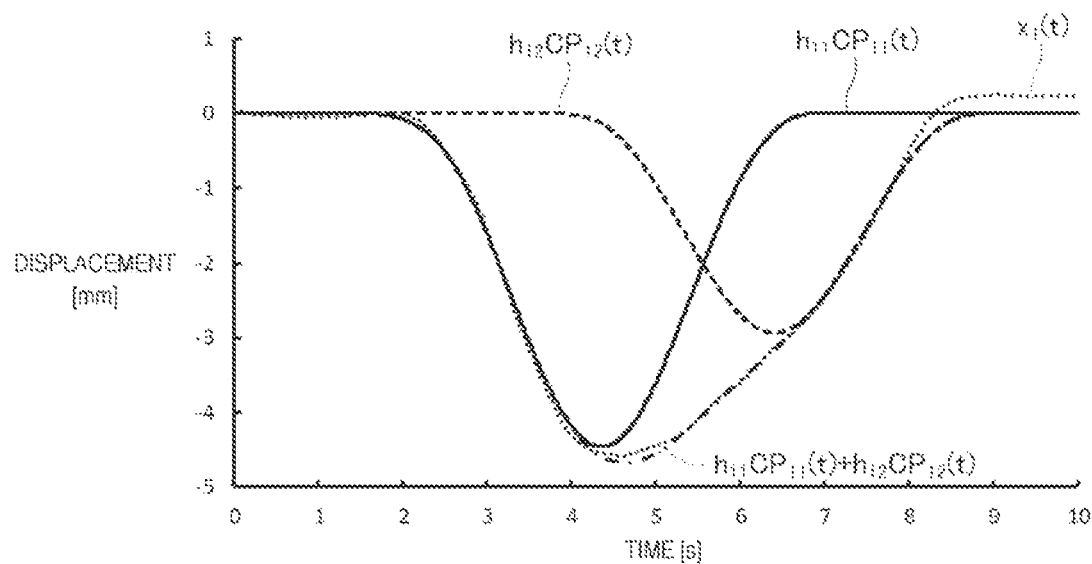
FIG. 33 is a diagram showing an example of an amplitude adjusted deflection waveform calculated according to a fourth embodiment.

In FIG. 33, in the case of the arrangement example shown in FIGS. 7 and 9, an example of the amplitude adjusted deflection waveforms $h_{11}CP_{11}(t)$ and $h_{12}CP_{12}(t)$ calculated when two vehicles 6 move consecutively along the lane $L_1$ are shown by a solid line and a broken line respectively. In FIG. 33, a horizontal axis represents time and a vertical axis represents a displacement. In FIG. 33, a sum of the amplitude adjusted deflection waveforms $h_{11}CP_{11}(t)$ and $h_{12}CP_{12}(t)$ is shown by a one-dot chain line, and the displacement waveform $x_1(t)$ is shown by a dot line.

As shown in FIG. 33, the sum of the amplitude adjusted deflection waveform $h_{11}CP_{11}(t)$ and the amplitude adjusted deflection waveform $h_{12}CP_{12}(t)$ and the displacement waveform $x_1(t)$ are well approximated, and Equation (46) is established. Therefore, it can be said that the displacement waveform at the observation point $R_1$ generated by the vehicle 6 when m=1 is modeled by the amplitude adjusted deflection waveform $h_{11}CP_{11}(t)$, and the displacement waveform at the observation point $R_1$ generated by the vehicle 6 when m=2 is modeled by the amplitude adjusted deflection waveform $h_{12}CP_{12}(t)$. As described above, the measurement device 1 can distinguishably calculate, according to the amplitude adjusted deflection waveforms $h_{11}CP_{11}(t)$ and $h_{12}CP_{12}(t)$, the displacements at the observation point $R_1$ due to traveling of the vehicles 6 along the lane $L_1$.

Figure 34:
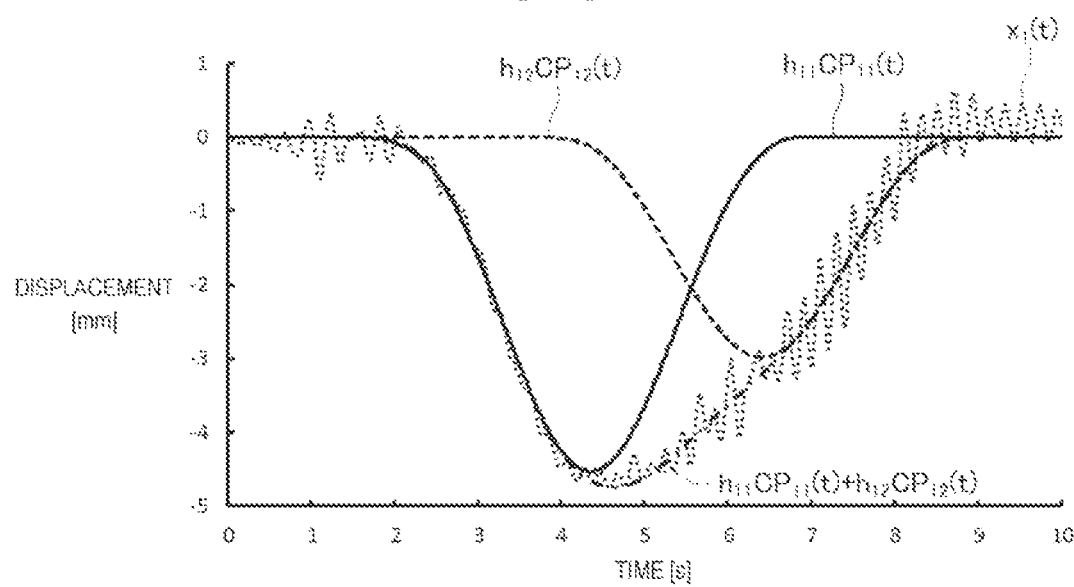
FIG. 34 is a diagram showing an example of an amplitude adjusted deflection waveform calculated according to the fourth embodiment.

In FIG. 33, noise is not superimposed on the displacement waveform $x_1(t)$, but for example, a signal due to natural vibration of the superstructure 7 may be superimposed on the displacement waveform $x_1(t)$ as noise. FIG. 34 shows, by a solid line and a broken line, examples of the amplitude adjusted deflection waveforms $h_{11}CP_{11}(t)$ and $h_{12}CP_{12}(t)$ calculated when the displacement waveform $x_1(t)$ in FIG. 33 is replaced with the noise superimposed displacement waveform $x_1(t)$. In FIG. 34, a horizontal axis represents time and a vertical axis represents a displacement. In FIG. 34, a sum of the amplitude adjusted deflection waveforms $h_{11}CP_{11}(t)$ and $h_{12}CP_{12}(t)$ is shown by a one-dot chain line, and the displacement waveform $x_1(t)$ is shown by a dot line.

As shown in FIG. 34, even when noise is superimposed on the displacement waveform $x_1(t)$, the sum of the amplitude adjusted deflection waveform $h_{11}CP_{11}(t)$ and the amplitude adjusted deflection waveform $h_{12}CP_{12}(t)$ and the displacement waveform $x_1(t)$ are well approximated, and the measurement device 1 can distinguishably calculate, according to the amplitude adjusted deflection waveforms $h_{11}CP_{11}(t)$ and $h_{12}CP_{12}(t)$, the displacements at the observation point $R_1$ due to traveling of the vehicles 6 along the lane $L_1$.

The amplitude coefficient $h_{11}$ in FIG. 33 is 3499.3034, and the amplitude coefficient $h_{11}$ in FIG. 34 is 3498.53076, and a difference between the two is only 1.4272%. Similarly, the amplitude coefficient $h_{12}$ in FIG. 33 is 2342.7991, and the amplitude coefficient $h_{12}$ in FIG. 34 is 2382.22663, and a difference between the two is only 1.6829%. Accordingly, in the present embodiment, the appropriate amplitude coefficients $h_{11}$ and $h_{12}$ can be obtained by the least square method with almost no effect of the noise superimposed on the displacement waveform $x_1(t)$.

Figure 35:
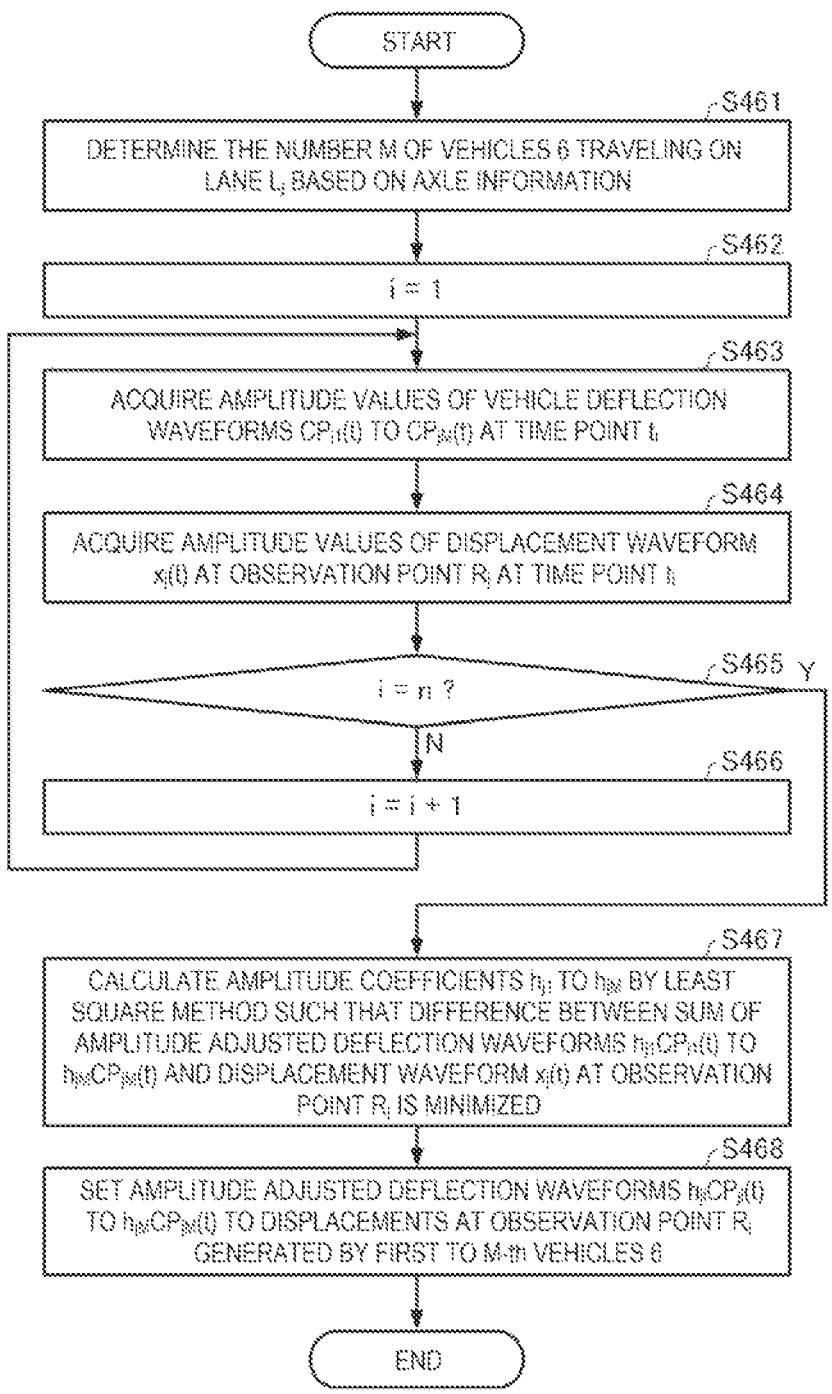
FIG. 35 is a flowchart showing an example of a procedure of an amplitude coefficient calculation step according to the fourth embodiment.

The measurement method according to the fourth embodiment is different from that according to the first embodiment, the second embodiment, or the third embodiment in the procedure of the amplitude coefficient calculation step, which is step S6 in FIG. 24. FIG. 35 is a flowchart showing an example of a procedure of the amplitude coefficient calculation step, which is step S6 in FIG. 24.

As shown in FIG. 35, first, the measurement device 1 determines the number M of the vehicles 6 traveling on the lane $L_j$ based on the axle information (step S461).

Next, the measurement device 1 sets the integer i to 1 (step S462), and acquires amplitude values of the vehicle deflection waveforms $CP_{j1}(t)$ to $CP_{jM}(t)$ at the time point $t_1$ (step S463).

Next, the measurement device 1 acquires the amplitude value of the displacement waveform $x_j(t)$ at the observation point $R_j$ at the time point $t_1$ (step S464).

When the integer i is not n (N in step S465), the measurement device 1 adds 1 to the integer i (step S466), and repeats the processing in steps S463 and S464.

Then, when the integer i is n (Y in step S465), the measurement device 1 calculates the amplitude coefficients $h_{j1}$ to $h_{jM}$ by the least square method such that a difference between the sum of the amplitude adjusted deflection waveforms $h_{j1}CP_{j1}(t)$ to $h_{jM}CP_{jM}(t)$ and the displacement waveform $x_j(t)$ at the observation point $R_j$ is minimized (step S467). Specifically, the measurement device 1 substitutes the amplitude values of the vehicle deflection waveforms $CP_{j1}(t)$ to $CP_{jM}(t)$ at each of the time points $t_i$ to to acquired in step S463 and the amplitude value of the displacement waveform $x_j(t)$ at each of the time points $t_i$ to $t_n$ acquired in step S464 into Equation (66) to calculate the amplitude coefficients $h_{j1}$ to $h_jM$.

Finally, the measurement device 1 sets the amplitude adjusted deflection waveforms $h_{ji}CP_{ji}(t)$ to $h_{jM}CP_{jM}(t)$ to the displacements at the observation point $R_j$ generated by the first to M-th vehicles 6 (step S468), and ends the processing of the amplitude coefficient calculation step.

According to the measurement method of the fourth embodiment described above, as in the first embodiment, the measurement device 1 can separately calculate the displacements of the superstructure 7 generated by the plurality of vehicles 6 moving consecutively on the superstructure 7.

In the measurement method according to the fourth embodiment, according to Equation (66), the measurement device 1 calculates, by the least square method, the amplitude coefficients $h_{j1}$ to $h_{jM}$ such that the difference between the sum of the amplitude adjusted deflection waveforms $h_{j1}CP_{j1}(t)$ to $h_{jM}CP_{jM}(t)$ and the displacement waveform $x_j(t)$ at the observation point $R_j$ is minimized. Therefore, according to the measurement method of the fourth embodiment, the measurement device 1 can accurately calculate the displacement of the superstructure 7 generated by each vehicle 6, since the appropriate amplitude coefficients $h_{j1}$ to $h_jM$ can be calculated without being affected by the traveling interval of the M vehicles 6 and being hardly affected by the noise superimposed on the displacement waveform $x_j(t)$.

5. Fifth Embodiment

A measurement method according to a fifth embodiment is different from the measurement method according to the first embodiment, the second embodiment, the third embodiment or the fourth embodiment in processing of the amplitude coefficient calculation step executed by the measurement device 1. Hereinafter, in the fifth embodiment, the same components as those in the first embodiment, the second embodiment, the third embodiment or the fourth embodiment will be denoted by the same reference numerals, repetitive description as that in the first embodiment, the second embodiment, the third embodiment or the fourth embodiment will be omitted or simplified, and contents different from those in the first embodiment, the second embodiment, the third embodiment and the fourth embodiment will be mainly described.

Figure 36:
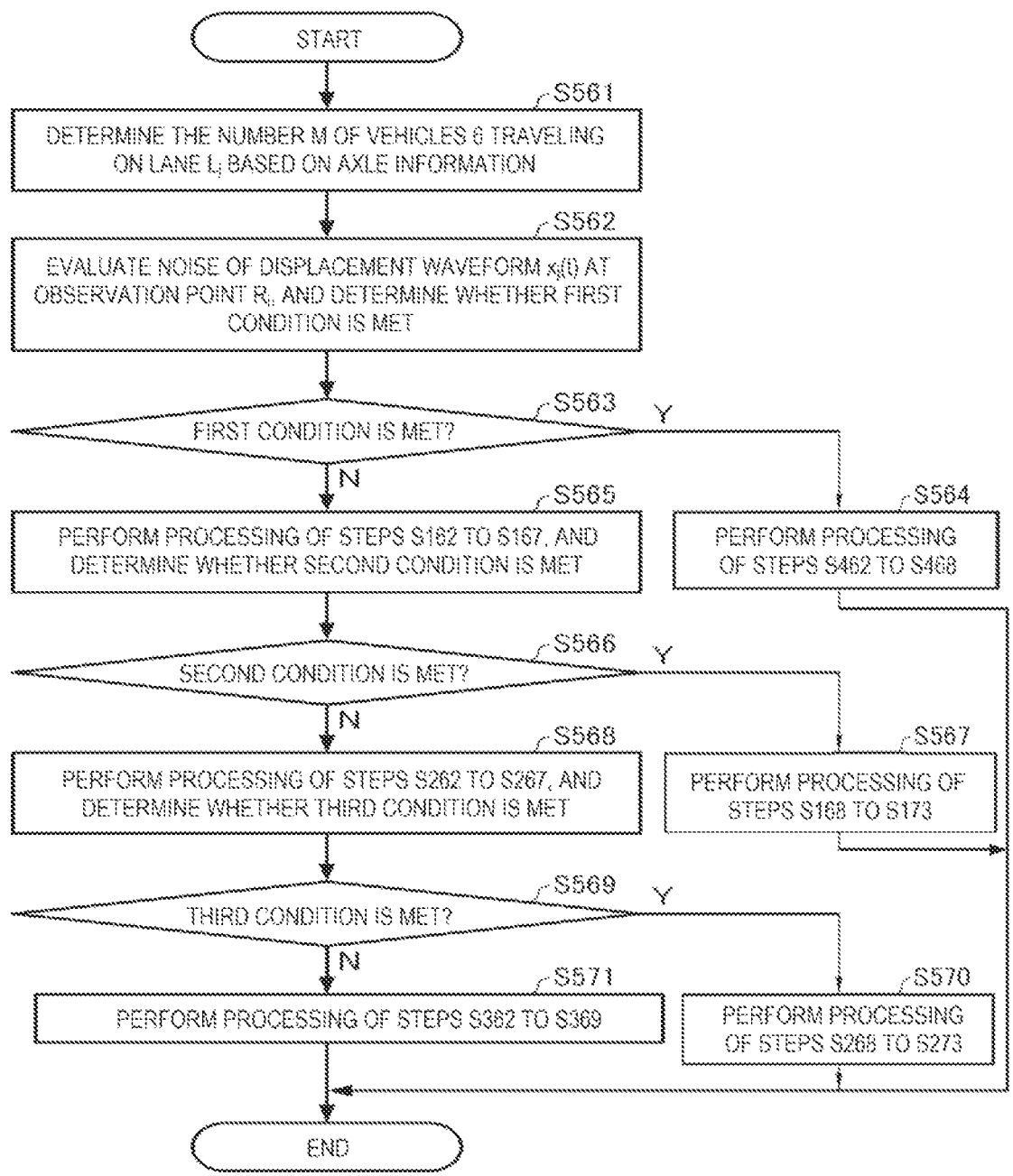
FIG. 36 is a flowchart showing an example of a procedure of an amplitude coefficient calculation step according to a fifth embodiment.

The measurement method according to the fifth embodiment is different from that according to the first embodiment, the second embodiment, the third embodiment or the fourth embodiment in the procedure of the amplitude coefficient calculation step, which is step S6 in FIG. 24. FIG. 36 is a flowchart showing an example of a procedure of the amplitude coefficient calculation step, which is step S6 in FIG. 24.

As shown in FIG. 36, first, the measurement device 1 determines the number M of the vehicles 6 traveling on the lane $L_j$ based on the axle information (step S561).

Next, the measurement device 1 evaluates the noise of the displacement waveform $x_j(t)$ at the observation point $R_j$, and determines whether a first condition that the noise superimposed on the displacement waveform $x_j(t)$ is equal to or more than a threshold value is met (step S562).

Then, when the first condition is met (Y in step S563), the measurement device 1 performs the processing of steps S462 to S468 in FIG. 35 (step S564), and ends the processing of the amplitude coefficient calculation step. That is, the measurement device 1 calculates the amplitude coefficients $h_{j1}$ to $h_{jM}$ by the method shown in the fourth embodiment when the first condition is met.

On the other hand, when the first condition is not met (N in step S563), the measurement device 1 performs the processing of steps S162 to S167 in FIG. 26, and determines whether a second condition is met (step S565). Here, the second condition is a condition that, at a time point $t_{i\_max}$ when the amplitude of the vehicle deflection waveform $CP_{ji}(t)$ is the maximum value for all integers i of 1 or more and M or less, the amplitudes of all vehicle deflection waveforms among the vehicle deflection waveforms $CP_{j1}(t)$ to $CP_{jM}(t)$ excluding the vehicle deflection waveform $CP_{ji}(t)$ is zero. That is, the second condition is the condition described in the first embodiment.

Then, when the second condition is met (Y in step S566), the measurement device 1 performs the processing of steps S168 to S173 in FIG. 26 (step S567), and ends the processing of the amplitude coefficient calculation step. That is, the measurement device 1 calculates the amplitude coefficients $h_{j1}$ to $h_{jM}$ by the method shown in the first embodiment when the first condition is not met and the second condition is met.

On the other hand, when the second condition is not met (N in step S566), the measurement device 1 performs the processing of steps S262 to S267 in FIG. 31, and determines whether a third condition is met (step S568). Here, the third condition is a condition that, at a time point $t_{i\_max}$ when the amplitude of the vehicle deflection waveform $CP_{ji}(t)$ is the maximum value for at least one integer i of 1 or more and M or less, the amplitude of at least one vehicle deflection waveform among the vehicle deflection waveforms $CP_{j1}(t)$ to $CP_{jM}(t)$ excluding the vehicle deflection waveform $CP_{ji}(t)$ is not zero. That is, the third condition is the condition described in the second embodiment.

Then, when the third condition is met (Y in step S569), the measurement device 1 performs the processing of steps S268 to S273 in FIG. 31 (step S570), and ends the processing of the amplitude coefficient calculation step. That is, the measurement device 1 calculates the amplitude coefficients $h_{j1}$ to $h_{jM}$ by the method shown in the second embodiment when the first and second conditions are not met and the third condition is met.

On the other hand, when the third condition is not met (N in step S569), the measurement device 1 performs the processing of steps S362 to S369 in FIG. 32 (step S571), and ends the processing of the amplitude coefficient calculation step. That is, the measurement device 1 calculates the amplitude coefficients $h_{j1}$ to $h_{jM}$ by the method shown in the third embodiment when the first, second and third conditions are not met.

Figure 37:
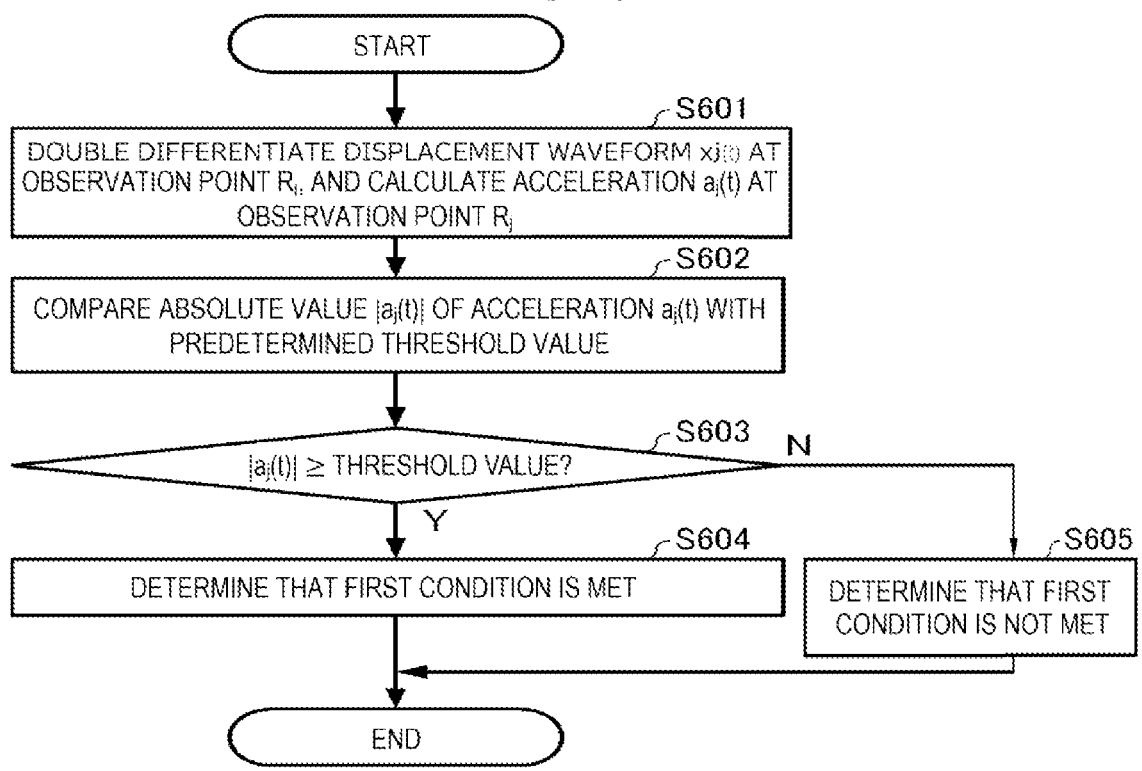
FIG. 37 is a flowchart showing an example of a procedure of a noise determination step.

FIG. 37 is a flowchart showing an example of a procedure of a noise determination step, which is step S562 in FIG. 36.

As shown in FIG. 37, first, the measurement device 1 double-integrates the displacement waveform $x_j(t)$ at the observation point $R_j$, and calculates an acceleration a (t) at the observation point $R_j$ (step S601).

Next, the measurement device 1 compares an absolute value $|a_j(t)|$ of the acceleration $a_j(t)$ calculated in step S601 with a predetermined threshold value (step S602).

Then, when the absolute value $|a_j(t)|$ of the acceleration is equal to or more than the threshold value (Y in step S603), the measurement device 1 determines that the first condition is met (step S604), and ends the processing of the noise determination step.

Then, when the absolute value $|a_j(t)|$ of the acceleration is less than the threshold value (N in step S603), the measurement device 1 determines that the first condition is not met (step S605), and ends the processing of the noise determination step.

Figure 38:
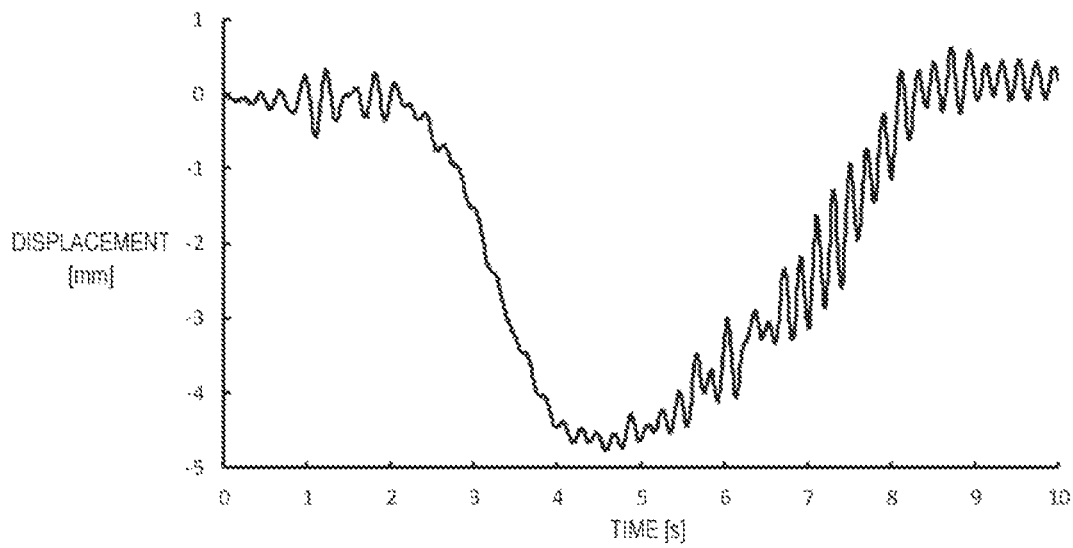
FIG. 38 is a diagram showing an example of a noise superimposed displacement waveform.
Figure 39:
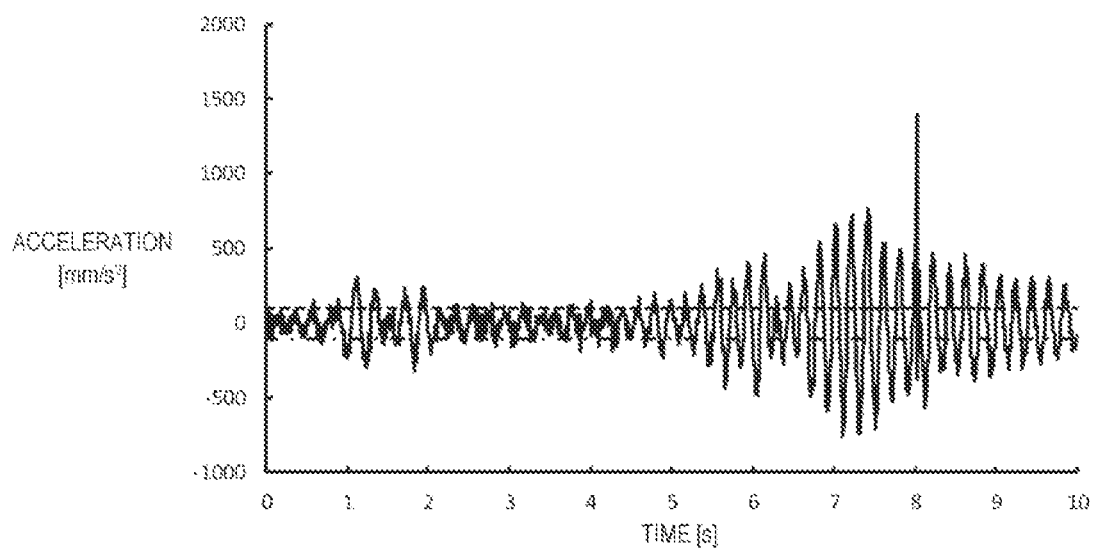
FIG. 39 is a diagram showing an example of an acceleration obtained by double-integrating the displacement waveform.

FIG. 38 shows an example of a noise superimposed displacement waveform $x_j(t)$ by a solid line. In FIG. 38, a horizontal axis represents time and a vertical axis represents a displacement. FIG. 39 shows, by a solid line, an example of the acceleration $a_j(t)$ obtained by double-differentiating the displacement waveform $x_j(t)$ in FIG. 38 in step S601 in FIG. 37. In FIG. 39, a horizontal axis represents time and a vertical axis represents an acceleration. In FIG. 39, the threshold value used in the determination in step S602 in FIG. 37 is shown by a broken line, and a value obtained by inverting a sign of the threshold value is shown by a one-dot chain line. As shown in FIGS. 38 and 39, by double-differentiating the displacement waveform $x_j(t)$, a long-period signal included in the displacement waveform $x_j(t)$ reduces in the acceleration $a_j(t)$, and a signal classified as the noise is emphasized. Therefore, the measurement device 1 determines whether the first condition that the noise superimposed on the displacement waveform $x_j(t)$ is equal to or more than the threshold value is met by comparing the absolute value of the acceleration $a_j(t)$ with the predetermined threshold value.

Then, when the first condition is met, as described above, the measurement device 1 calculates the amplitude coefficients $h_{j1}$ and $h_{12}$ by the method shown in the fourth embodiment in which the amplitude coefficients $h_{j1}$ and $h_{12}$ are hardly affected by the noise. When the first condition is not met, the measurement device 1 calculates the amplitude coefficients $h_{11}$ and $h_{12}$ by the method according to the first embodiment, the second embodiment, or the third embodiment, in accordance with overlapping degrees of the vehicle deflection waveforms $CP_{j1}(t)$ to $CP_{jM}(t)$.

According to the measurement method of the fifth embodiment described above, as in the first embodiment, the measurement device 1 can separately calculate the displacements of the superstructure 7 generated by the plurality of vehicles 6 moving consecutively on the superstructure 7.

According to the measurement method in the fifth embodiment, when the first condition is met, the measurement device 1 can calculate, according to Equation (66), the appropriate amplitude coefficients $h_{j1}$ to $h_{jM}$ without being affected by the traveling interval of the M vehicles 6 and being hardly affected by the noise superimposed on the displacement waveform $x_j(t)$. When the first condition is not met and the second condition is met, the measurement device 1 can calculate, according to Equation (47), the amplitude coefficients $h_{j1}$ to $h_{jM}$ with a relatively small calculation amount. When the first condition and the second condition are not met and the third condition is met, the measurement device 1 can calculate, according to Equation (49), the amplitude coefficients $h_{j1}$ to $h_{jM}$ with a relatively small calculation amount. Further, when the first condition, the second condition and the third condition are not met, the measurement device 1 can calculate, according to Equation (52), the amplitude coefficients $h_{j1}$ to $h_{jM}$ without being affected by the traveling interval of the M vehicles 6 and with a relatively small calculation amount. Therefore, according to the measurement method in the fifth embodiment, the measurement device 1 can calculate the amplitude coefficients $h_{j1}$ to $h_{jM}$ by an appropriate method according to the noise superimposed on the displacement waveform $x_j(t)$ and the traveling interval of the M vehicles 6.

6. Sixth Embodiment

In the measurement methods according to the first to the fifth embodiments, since the approximate expression of the deflection of the superstructure 7 is set to be an equation based on the structural model of the superstructure 7, as shown in Equation (29), the normalized deflection amount $w_{std}$ differs in an interval in which the load position a is smaller than ½ and an interval in which the load position a is larger than ½. In contrast, in a measurement method according to a sixth embodiment, the approximate expression of the deflection of the superstructure 7 is approximated to an expression of a sinusoidal half-wave waveform in order to make the normalized deflection amount $w_{std}$ in the interval in which the load position a is smaller than ½ and the normalized deflection amount $w_{std}$ in the interval in which the load position a is larger than ½ the same. Hereinafter, in the sixth embodiment, the same components as those in the first embodiment to the fifth embodiment will be denoted by the same reference numerals, repetitive description as that in the first embodiment to the fifth embodiment will be omitted or simplified, and contents different from those in the first embodiment to the fifth embodiment will be mainly described.

In the present embodiment, the normalized deflection amount $w_{std}$ is expressed by Equation (67).

$$w_{std} = \frac{w}{w_{max}} = \sin\left(\alpha\frac{\pi}{l}\right) \quad (67)$$

In Equation (67), since the load position a is in a range of $0 \le a \le 1$, the normalized deflection amount $w_{std}$ is approximated to a sine half wave according to Equation (67).

Figure 40:
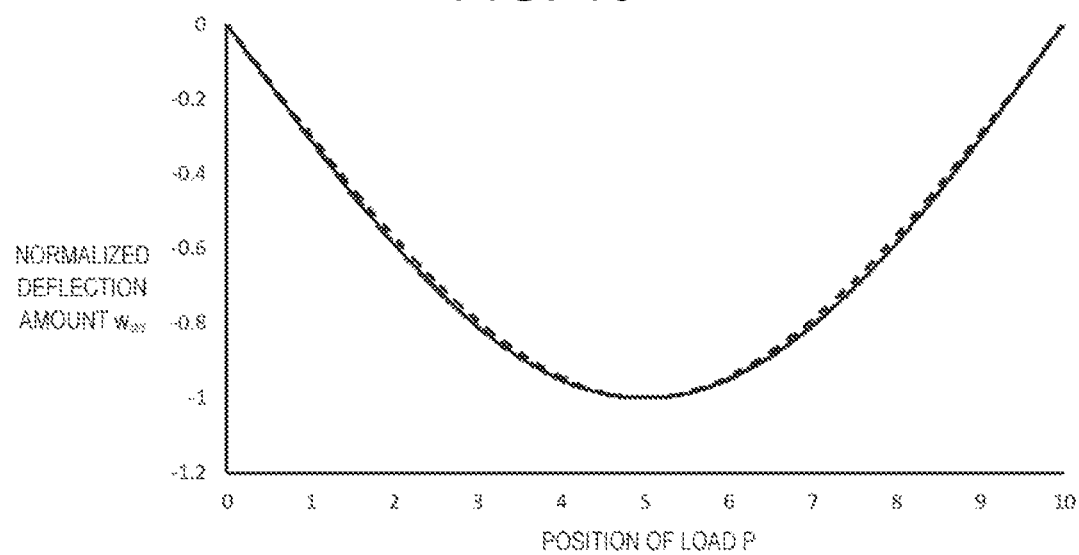
FIG. 40 is a diagram showing an example of a normalized deflection amount waveform according to a sixth embodiment.

FIG. 40 shows, by a solid line, an example of a waveform of the normalized deflection amount $w_{std}$ calculated according to Equation (67) in a case of the observation position x=½. In FIG. 40, the horizontal axis represents the position of the load P, and the vertical axis represents the normalized deflection amount $w_{std}$. In the example in FIG. 40, a distance l between the fulcrums of the simple beam is 10. FIG. 40 shows, by a broken line, a waveform of the normalized deflection amount $w_{std}$ calculated according to Equation (29).

As shown in FIG. 40, the waveform of the normalized deflection amount $w_{std}$ calculated according to Equation (67) is approximated to the waveform of the normalized deflection amount $w_{std}$ calculated according to Equation (29), and Equation (29) can be replaced by Equation (67). According to the replacement, Equation (39) is replaced with Equation (68). Equation (68) is an equation normalized in a manner that the maximum value thereof is 1. Equation (68) is an approximate expression of the deflection of the superstructure 7 which is the structure, and is an expression of a sinusoidal half-wave waveform.

$$w_{std}(t) = \begin{cases} 0 & (\text{if } t < t_i) \\ \sin\left(a\frac{\pi}{l}\right) = \sin\left(\frac{t-t_i}{t_o-t_i}\pi\right) & (\text{if } t_i < t < t_o) \\ 0 & (\text{if } t > t_o) \end{cases} \quad (68)$$

According to Equation (68), Equation (44) can be replaced with Equation (69).

$$H_{jk}(t) = \begin{cases} 0 & (\text{if } t < t_i) \\ pa_{p_{jk}}\sin\left(a\frac{\pi}{l}\right) = pa_{p_{jk}}\sin\left(\frac{t-t_i}{t_o-t_i}\pi\right) & (\text{if } t_i < t < t_o) \\ 0 & (\text{if } t > t_o) \end{cases} \quad (69)$$

The deflection waveform calculation unit 113 calculates, according to Equation (69), the deflection waveform $H_{jk}(t)$ of the superstructure 7 generated by each axle of the vehicle 6 traveling on the lane $L_j$.

According to Equation (45), the moving object deflection waveform calculation unit 114 adds the deflection waveforms $H_{jk}(t)$, which are calculated by the deflection waveform calculation unit 113, to calculate the deflection waveform $CP_{jm}(t)$ of the superstructure 7 generated by the vehicle 6 whose vehicle number is m.

The amplitude coefficient calculation unit 116 calculates the amplitude coefficients $h_{j1}$ to $h_{jM}$ by assuming that the waveform, that is obtained by multiplying the amplitude coefficient $h_{jm}$ by the vehicle deflection waveform $CP_{jm}(t)$ calculated by the moving object deflection waveform calculation unit 114, is the amplitude adjusted deflection waveform $h_{jm}CP_{jm}(t)$, and that the sum of the amplitude adjusted deflection waveforms $h_{j1}CP_{j1}(t)$ to $h_{jM}CP_{jM}(t)$ is approximated to the displacement waveform $x_j(t)$ at the observation point $R_j$ calculated by the displacement waveform calculation unit 115.

According to the sixth embodiment described above, based on the first observation point information, the second observation point information, the predetermined coefficient p, and the approximate expression (68) of the deflection of the superstructure 7 which is the expression of a sinusoidal half-wave waveform, the measurement device 1 calculates, according to Equation (69), the deflection waveform $H_{jk}(t)$ of the superstructure 7 generated by each axle, and calculates the vehicle deflection waveform $CP_{jm}(t)$ by adding the deflection waveforms $H_{jk}(t)$. Then, the measurement device 1 calculates the amplitude coefficients $h_{j1}$ to $h_{jM}$ by assuming that the waveform, that is obtained by multiplying the amplitude coefficient $h_{jm}$ by the vehicle deflection waveform $CP_{jm}(t)$, is the amplitude adjusted deflection waveform $h_{jm}CP_{jm}(t)$, and that the sum of the amplitude adjusted deflection waveforms $h_{j1}CP_{j1}(t)$ to $h_{jM}CP_{jM}(t)$ is approximated to the displacement waveform $x_j(t)$ at the observation point $R_j$. Therefore, according to the measurement method of the sixth embodiment, as in the first embodiment, the measurement device 1 can separately calculate the displacements of the superstructure 7 generated by the plurality of vehicles 6 moving consecutively on the superstructure 7.

7. Modifications

The present disclosure is not limited to the above embodiments, and various modifications can be made within the scope of the gist of the present disclosure.

According to the above embodiments, the measurement device 1 calculates the amplitude coefficients $h_{j1}$ to $h_{jM}$ by assuming that the sum of the amplitude adjusted deflection waveforms $h_{j1}CP_{j1}(t)$ to $h_{jM}CP_{jM}(t)$ is approximated to the displacement waveform $x_j(t)$ at the observation point $R_j$, but the measurement device 1 may calculate the amplitude coefficients $h_{j1}$ to $h_jM$ by assuming that the sum of the amplitude adjusted deflection waveforms $h_{j1}CP_{j1}(t)$ to $h_{jM}CP_{jM}(t)$ is approximated to a load waveform at the observation point $R_j$ generated by the M vehicles 6.

In each of the above embodiments, the observation device that observes observation points $P_1$ to $P_N$ and the observation device that observes observation points $Q_1$ to $Q_N$ are acceleration sensors, but the present disclosure is not limited thereto. For example, the observation device may be an impact sensor, a microphone, a strain gauge, or a load cell. It is not necessary that the observation device and the observation point have a one-to-one correspondence, and one observation device may observe a part or all of the observation points $P_1$ to $P_N$ and $Q_1$ to $Q_N$.

The impact sensor detects an impact acceleration as a response to the action of each axle of the vehicle 6 on the observation points $P_1$ to $P_N$ and $Q_1$ to $Q_N$. The measurement device 1 acquires first observation point information based on the impact acceleration for the observation points $P_1$ to $P_N$, and acquires second observation point information based on the impact acceleration for the observation points $Q_1$ to $Q_N$. The microphone detects sound as a response to the action of each axle of the vehicle 6 on the observation points $P_1$ to $P_N$ and $Q_1$ to $Q_N$. The measurement device 1 acquires first observation point information based on the sound for the observation points $P_1$ to $P_N$, and acquires second observation point information based on the sound for the observation points $Q_1$ to $Q_N$. The strain gauge or the load cell detects a stress change as a response to the action of each axle of the vehicle 6 on the observation points $P_1$ to $P_N$ and $Q_1$ to $Q_N$. The measurement device 1 acquires first observation point information based on the stress change for the observation points $P_1$ to $P_N$, and acquires second observation point information based on the stress change for the observation points $Q_1$ to $Q_N$.

In each of the above embodiments, the observation devices that observe the observation points $R_1$ to $R_N$ are acceleration sensors, but the present disclosure is not limited thereto. For example, the observation device may be a contact type displacement meter, a ring type displacement meter, a laser displacement meter, a pressure sensor, a displacement measurement device by image processing, or a displacement measurement device by an optical fiber. It is not necessary that the observation device and the observation point have a one-to-one correspondence, and one observation device may observe a part or all of the observation points $R_1$ to $R_N$.

The contact type displacement meter, the ring type displacement meter, the laser displacement meter, the displacement measurement device by image processing, and the displacement measurement device by the optical fiber measure a displacement as a response to the action of the vehicle 6 on the observation points $R_1$ to $R_N$. The measurement device 1 calculates, based on the displacements at the observation points $R_1$ to $R_N$, displacement waveforms at the observation points $R_1$ to $R_N$. The pressure sensor detects a stress change as a response to the action of the vehicle 6 on the observation points $R_1$ to $R_N$. The measurement device 1 calculates, based on the stress changes at the observation points $R_1$ to $R_N$, displacement waveforms at the observation points $R_1$ to $R_N$.

In each of the above embodiments, the direction in which the vehicle 6 travels on the lanes $L_1$ to $L_N$ is all the same. Alternatively, the traveling direction of the vehicle 6 may be different from at least one lane of the lanes $L_1$ to $L_N$ and other lanes. For example, the vehicle 6 may travel in a direction from the observation point $P_1$ to the observation point $Q_1$ on the lane $L_1$, and may travel in a direction from the observation point $Q_2$ to the observation point $P_2$ on the lane $L_2$. In this case, the measurement device 1 acquires the entry time of the vehicle 6 to the lane La based on the acceleration data output from the sensor 21 that observes the observation point $P_1$, and acquires the exit time point of the vehicle 6 from the lane $L_1$ based on the acceleration data output from the sensor 22 that observes the observation point $Q_1$. The measurement device 1 acquires the entry time of the vehicle 6 to the lane $L_2$ based on the acceleration data output from the sensor 22 that observes the observation point $Q_2$, and acquires the exit time point of the vehicle 6 from the lane $L_2$ based on the acceleration data output from the sensor 21 that observes the observation point $P_2$.

In each of the above embodiments, the sensors 21, 22, and 23 are provided on the main girder G of the superstructure 7. Alternatively, the sensors may be provided on the surface or inside of the superstructure 7, a lower surface of the floor plate F, the bridge pier 8a, or the like. In each of the above embodiments, the road bridge is taken as an example of the bridge 5, but the present disclosure is not limited thereto. For example, the bridge 5 may be a railway bridge. In each of the above embodiments, the superstructure of the bridge is taken as an example of the structure, but the present disclosure is not limited thereto. The structure may be deformed by the movement of the moving object.

The embodiments and the modifications described above are merely examples, and the present disclosure is not limited thereto. For example, the embodiments and the modifications can be combined as appropriate.

The present disclosure includes a configuration substantially the same as the configuration described in the embodiments, for example, a configuration having the same function, method and result, or a configuration having the same purpose and effect. The present disclosure includes a configuration in which a non-essential portion of the configuration described in the embodiment is replaced. The present disclosure includes a configuration having the same action and effect as the configuration described in the embodiment, or a configuration capable of achieving the same object. The present disclosure includes a configuration in which a known technique is added to the configuration described in the embodiments.

What is claimed is:

1. A measurement method for determining a displacement of a superstructure of a bridge generated by each of a plurality of vehicles consecutively moving on a path of the superstructure along a first direction, each of the plurality of vehicles having a plurality of axles, the measurement method comprising:

providing first, second, and third acceleration sensors at first, second, and third observation points of the superstructure of the bridge, respectively, the superstructure extending along the first direction and having first and second ends opposite to each other along the first direction, the first observation point being located closer to the first end than the second and third observation points along the first direction, the second observation point being located closer to the second end than the first and third observation points along the first direction; and causing a processor to execute a program stored in a memory including the steps of:

acquiring first observation point information, the first observation point information including a first plurality of times at which the plurality of axles of a first vehicle of the plurality of vehicles pass the first observation point and a first plurality of acceleration intensities corresponding to the plurality of axles of the first vehicle at the first observation point, the first plurality of acceleration intensities being obtained via the first acceleration sensor;

acquiring second observation point information, the second observation point information including a second plurality of times at which the plurality of axles of the first vehicle pass the second observation point and a second plurality of acceleration intensities corresponding to the plurality of axles of the first vehicle at the second observation point, the second plurality of acceleration intensities being obtained via the second acceleration sensor;

calculating a plurality of deflection waveforms of the superstructure based on the first observation point information, the second observation point information, a predetermined coefficient, and an approximate expression of deflection of the superstructure, each of the plurality of deflection waveforms corresponding to a state generated by passing each of the plurality of axles of the first vehicle on the path of the superstructure;

adding the plurality of deflection waveforms of the superstructure to obtain a vehicle deflection waveform relating to a deflection waveform generated by passing the plurality of axles of the first vehicle on the path of the superstructure;

calculating a displacement waveform at the third observation point via the third acceleration sensor based on a third plurality of acceleration intensities corresponding to the plurality of axles of the first vehicle at the third observation point, repeating the acquiring of the first observation point information, the acquiring of the second observation point information, the calculating of the plurality of deflection waveforms, the obtaining of the vehicle deflection waveform, and the calculating of the displacement waveform for each of the plurality of axles of each of the plurality of vehicles that consecutively move on the path of the superstructure of the bridge; and calculating a plurality of amplitude coefficients for the plurality of vehicles, respectively, by assuming that a corresponding one of a plurality of waveforms, obtained by multiplying a corresponding one of a plurality of amplitude coefficients by a corresponding one of the plurality of deflection waveformsm is a corresponding one of a plurality of amplitude adjusted deflection waveforms, and that a sum of the plurality of amplitude adjusted deflection waveforms is approximated to the displacement waveform.

2. The measurement method according to claim 1, wherein in the calculating of the plurality of amplitude coefficients, at an i-th time of a plurality of times where i is an integer of 1 or more, an amplitude of an i-th deflection waveform of the plurality of deflection waveforms has a maximum value, when amplitudes of the plurality of deflection waveforms excluding the i-th deflection waveform are zero, the plurality of amplitude coefficients are calculated at which the sum of the plurality of amplitude adjusted deflection waveforms is approximated to the displacement waveform at the i-th time.

3. The measurement method according to claim 1, wherein in the calculating of the plurality of amplitude coefficients, at an i-th time of a plurality of times where i is an integer of 1 or more, an amplitude of an i-th deflection waveform of the plurality of deflection waveforms has a maximum value, when an amplitude of at least one deflection waveform among the plurality of deflection waveforms excluding the i-th deflection waveform is not zero, the plurality of amplitude coefficients are calculated at which the sum of the plurality of amplitude adjusted deflection waveforms is approximated to the displacement waveform at a time when the amplitude of the i-th deflection waveform is not zero, and amplitudes of the plurality of deflection waveforms excluding the i-th deflection waveform are zero.

4. The measurement method according to claim 1, wherein in the calculating of the plurality of amplitude coefficients, the plurality of amplitude coefficients are calculated at which the sum of the plurality of amplitude adjusted deflection waveforms is approximated to the displacement waveform at a plurality of times when at least one of amplitudes of the plurality of deflection waveforms is not zero.

5. The measurement method according to claim 1, wherein in the calculating of the plurality of amplitude coefficients, the plurality of amplitude coefficients are calculated by a least square method such that a difference between the sum of the plurality of amplitude adjusted deflection waveforms and the displacement waveform is minimized.

6. The measurement method according to claim 1, wherein in the calculating of the plurality of amplitude coefficients, when a first condition, in which noise superimposed on the displacement waveform is equal to or greater than a threshold value, is met the plurality of amplitude coefficients are calculated by a least square method such that a difference between the sum of the plurality of amplitude adjusted deflection waveforms and the displacement waveform is minimized, when the first condition is not met, and at an i-th time of a plurality of times where i is an integer of 1 or more, an amplitude of an i-th deflection waveform of the plurality of deflection waveforms has a maximum value, a second condition, in which amplitudes of the plurality of deflection waveforms excluding the i-th deflection waveform are zero, is met, the plurality of amplitude coefficients are calculated at which the sum of the plurality of amplitude adjusted deflection waveforms is equal to the displacement waveform at the i-th time, when the first condition and the second condition are not met, and at the i-th time, a third condition, in which an amplitude of at least one deflection waveform among the plurality of deflection waveforms excluding the i-th deflection waveform is not zero, is met, the plurality of amplitude coefficients are calculated at which the sum of the plurality of amplitude adjusted deflection waveforms is equal to the displacement waveform at a time of the plurality of times when the amplitude of the i-th deflection waveform is not zero, and the amplitudes of the plurality of deflection waveforms excluding the i-th deflection waveform are zero, and when the first condition, the second condition, and the third condition are not met, the plurality of amplitude coefficients are calculated at which the sum of the plurality of amplitude adjusted deflection waveforms is equal to the displacement waveform at the plurality of times when at least one of amplitudes of the plurality of deflection waveforms is not zero.

7. The measurement method according to claim 1, wherein
the approximate expression of deflection of the superstructure is an expression based on a structural model of the superstructure of the bridge.

8. The measurement method according to claim 7, wherein
the structural model is a simple beam whose both ends are supported.

9. The measurement method according to claim 1, wherein
the approximate expression of deflection of the superstructure is an expression normalized by a maximum amplitude of deflection at a central position between the first observation point and the second observation point.

10. The measurement method according to claim 1, wherein
the approximate of deflection of the superstructure is an expression of a sinusoidal half-wave waveform.

11. The measurement method according to claim 1, wherein
the superstructure is a structure across any one of a bridge abutment and a bridge pier adjacent to each other, two adjacent bridge abutments, or two adjacent bridge piers,
the first and second ends of the superstructure are located at positions of the bridge abutment and the bridge pier adjacent to each other, at positions of the two adjacent bridge abutments, or at positions of the two adjacent bridge piers, and
the bridge is a road bridge or a railway bridge.

12. The measurement method according to claim 1, wherein
each of the plurality of vehicles is a railway vehicle, an automobile, a tram, a construction vehicle, or a military vehicle.

13. The measurement method according to claim 1, wherein
the superstructure is a structure in which bridge weigh in motion (BWIM) functions.

14. A measurement device comprising:
first, second, and third acceleration sensors at first, second, and third observation points of a superstructure of a bridge, respectively, a plurality of vehicles consecutively moving on a path of the superstructure along a first direction, each of the plurality of vehicles having a plurality of axles, the superstructure extending along the first direction and having first and second ends opposite to each other along the first direction, the first observation point being located closer to the first end than the second and third observation points along the first direction, the second observation point being located closer to the second end than the first and third observation points along the first direction;
a memory configured to store a program; and
a processor configured to execute the program so as to:
acquire first observation point information, the first observation point information including a first plurality of times at which the plurality of axles of a first vehicle of the plurality of vehicles pass the first observation point and a first plurality of acceleration intensities corresponding to the plurality of axles of the first vehicle at the first observation point, the first plurality of acceleration intensities being obtained via the first acceleration sensor;
acquire second observation point information, the second observation point information including a second plurality of times at which the plurality of axles of the first vehicle pass the second observation point and a second plurality of acceleration intensities corresponding to the plurality of axles of the first vehicle at the second observation point, the second plurality of acceleration intensities being obtained via the second acceleration sensor;
calculate a plurality of deflection waveforms of the superstructure based on the first observation point information, the second observation point information, a predetermined coefficient, and an approximate expression of deflection of the superstructure, each of the plurality of deflection waveforms corresponding to a state generated by passing each of the plurality of axles of the first vehicle on the path of the superstructure;
add the plurality of deflection waveforms of calculate a displacement waveform at the third observation point via the third acceleration sensor based on a third plurality of acceleration intensities corresponding to the plurality of axles of the first vehicle at the third observation point;
repeating the acquisition of the first observation point information, the acquisition of the second observation point information, the calculation of the plurality of deflection waveforms, the obtaining of the vehicle deflection waveform, and the calculation of the displacement waveform for each of the plurality of axles of each of the plurality of vehicles that consecutively move on the path of the superstructure of the bridge; and
calculate a plurality of amplitude coefficients for the plurality of vehicles, respectively by assuming that a corresponding one of a plurality of waveforms, obtained by multiplying a corresponding one of a plurality of amplitude coefficients by a corresponding one of the plurality of deflection waveforms, is a corresponding one of a plurality of amplitude adjusted deflection waveforms, and that a sum of the plurality of amplitude adjusted deflection waveforms is approximated to the displacement waveform.

15. A non-transitory computer-readable storage medium storing a measurement program for determining a displacement of a superstructure of a bridge generated by each of a plurality of vehicles consecutively moving on a path of the superstructure along a first direction, each of the plurality of vehicles having a plurality of axles, wherein first, second, and third acceleration sensors are provided at first, second, and third observation points of the superstructure of the bridge, respectively, the superstructure extending along the first direction and having first and second ends opposite to each other along the first direction, the first observation point being located closer to the first end than the second and third observation points along the first direction, the second observation point being located closer to the second end than the first and third observation points along the first direction, the measurement program for causing a computer to execute a process by a processor so as to perform the steps of:

acquiring first observation point information, the first observation point information including a first plurality of times at which the plurality of axles of a first vehicle of the plurality of vehicles pass the first observation point and a first plurality of acceleration intensities corresponding to the plurality of axles of the first vehicle at the first observation point, the first plurality of acceleration intensities being obtained via the first acceleration sensor;

acquiring second observation point information, the second observation point information including a second plurality of times at which the plurality of axles of the first vehicle pass the second observation point and a second plurality of acceleration intensities corresponding to the plurality of axles of the first vehicle at the second observation point, the second plurality of acceleration intensities being obtained via the second acceleration sensor;

calculating a plurality of deflection waveforms of the superstructure based on the first observation point information, the second observation point information, a predetermined coefficient, and an approximate expression of deflection of the superstructure, each of the plurality of defleciton waveforms corresponding to a state generated by passing each of the plurality of axles of the first vehicle on the path of the superstructure;

adding the plurality of deflection waveforms of the superstructure to obtain a vehicle deflection waveform relating to a deflection waveform generated by passing the plurality of axles of the first vehicle on the path of the superstructure;

calculating a displacement waveform at the third observation point via the third acceleration sensor based on a third plurality of acceleration intensities corresponding to the plurality of axles of the first vehicle at the third observation point;

repeating the acquiring of the first observation point information, the acquiring of the second observation point information, the calculating of the plurality of deflection waveforms, the obtaining of the vehicle deflection waveform, and the calculating of the displacement waveform for each of the plurality of axles of each of the plurality of vehicles that consecutively move on the path of the superstructure of the bridge; and calculating a plurality of amplitude coefficients for the plurality of vehicles, respectively, by assuming that a corresponding one of a plurality of waveforms, obtained by multiplying a corresponding one of a plurality of amplitude coefficients by a corresponding one of the plurality of deflection waveforms, is a corresponding one of a plurality of amplitude adjusted deflection waveforms, and that a sum of the plurality of amplitude adjusted deflection waveforms is approximated to the displacement waveform.

* * * * *